US012662256B2

(12) United States Patent
Mukae

(10) Patent No.: US 12,662,256 B2
(45) Date of Patent: Jun. 23, 2026

(54) MEGA-CONSTELLATION BUSINESS DEVICE

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 427 days.

(21) Appl. No.: 17/798,306

(22) PCT Filed: Mar. 19, 2021

(86) PCT No.: PCT/JP2021/011324
§ 371 (c)(1),
(2) Date: Aug. 9, 2022

(87) PCT Pub. No.: WO2021/193411
PCT Pub. Date: Sep. 30, 2021

(65) Prior Publication Data
US 2023/0080986 A1     Mar. 16, 2023

(30) Foreign Application Priority Data

Mar. 26, 2020     (JP) ................................. 2020-055556

(51) Int. Cl.
B64G 1/10          (2006.01)
B64G 1/24          (2006.01)
H04B 7/185         (2006.01)
(52) U.S. Cl.
CPC ......... B64G 1/1085 (2013.01); B64G 1/2423 (2023.08); B64G 1/2429 (2023.08); B64G 1/244 (2019.05); H04B 7/18519 (2013.01)

(58) Field of Classification Search
CPC .... B64G 1/1085; B64G 1/242; B64G 1/2423; B64G 1/2427; B64G 1/2429; B64G 1/244; B64G 3/00; H04B 7/18519
(Continued)

(56) References Cited

U.S. PATENT DOCUMENTS 8,511,614 B2 * 8/2013 Robinson ............. B64G 1/1085
                                                    244/158.4
11,414,218 B1 * 8/2022 Concha .................... B64G 1/36
(Continued)

FOREIGN PATENT DOCUMENTS

CN          107871047 A  *  4/2018  ............. G06F 30/20
JP          2014-520724 A    8/2014
JP          2017-114159 A    6/2017

OTHER PUBLICATIONS

International Search Report and Written Opinion mailed on Jun. 1, 2021, received for PCT Application PCT/JP2021/011324, filed on Mar. 19, 2021, 11 pages including English Translation.
(Continued)

*Primary Examiner* — Mohamed Abdo Algehaim
(74) *Attorney, Agent, or Firm* — XSENSUS LLP

(57)          ABSTRACT

A satellite constellation forming system (100) forms a satellite constellation which is composed of a satellite group and in which the satellite group cooperatively provides a service. The satellite constellation has a plurality of orbital planes in each of which a plurality of satellites fly at the same nominal orbital altitude. A satellite constellation forming unit (110) continues providing the service while avoiding a collision between satellites by both or one of control of an orbital altitude and control of a passage timing of a satellite group flying in a region where the plurality of orbital planes intersect.

7 Claims, 40 Drawing Sheets

300: SATELLITE GROUP          20: SATELLITE CONSTELLATION

70: EARTH

(58) Field of Classification Search
USPC ........................................................ 701/13
See application file for complete search history.

(56) References Cited

U.S. PATENT DOCUMENTS

| | | | | |
|---|---|---|---|---|
| 11,780,612 | B1 * | 10/2023 | Kopardekar | H04W 4/46 701/13 |
| 2011/0226907 | A1 * | 9/2011 | Robinson | B64G 1/1085 244/158.4 |
| 2014/0158830 | A1 * | 6/2014 | Rossettini | B64G 1/40 244/158.6 |
| 2015/0115107 | A1 * | 4/2015 | Andoh | B64G 1/242 244/171.1 |
| 2016/0207643 | A1 * | 7/2016 | Kimura | G05B 19/042 |
| 2016/0264268 | A1 * | 9/2016 | Aylmer | G21F 5/14 |
| 2017/0081047 | A1 * | 3/2017 | Rossettini | B64G 1/10 |
| 2018/0002247 | A1 | 1/2018 | Mollard et al. | |
| 2018/0022474 | A1 * | 1/2018 | Meek | H04B 7/195 244/158.4 |
| 2018/0222604 | A1 * | 8/2018 | Garus | B64G 1/6462 |
| 2018/0305042 | A1 * | 10/2018 | Vaughan | H04B 7/19 |
| 2018/0346153 | A1 * | 12/2018 | Kaplan | B64G 1/244 |
| 2018/0370658 | A1 * | 12/2018 | Amimoto | B64G 1/2427 |
| 2019/0329914 | A1 * | 10/2019 | Dargin, III | B64G 1/32 |
| 2020/0403692 | A1 * | 12/2020 | Bögl | H01Q 1/288 |
| 2021/0316886 | A1 * | 10/2021 | Kaen | B64G 3/00 |
| 2022/0063843 | A1 * | 3/2022 | Hu | B64G 1/1085 |
| 2022/0294525 | A1 * | 9/2022 | Li | H04W 16/14 |
| 2023/0211896 | A1 * | 7/2023 | Gegout | B64G 1/66 701/301 |

OTHER PUBLICATIONS

Murakami et al., "Space Traffic Management with a NASA UAS Traffic Management (UTM) Inspired Architecture", AIAA SciTech Forum, Jan. 7-11, 2019, pp. 1-27.
Office Action dated May 20, 2025 for corresponding Japanese patent application No. JP2024-052755 (5 pages; with English translation).
Office Action dated Sep. 16, 2025 in corresponding Japanese patent application No. 2024-052755 (3 pages; with English translation).

* cited by examiner

20: SATELLITE CONSTELLATION

300: SATELLITE GROUP

70: EARTH

Fig. 3

20: SATELLITE CONSTELLATION

21: ORBITAL PLANES

70: EARTH

POLAR REGION

Fig. 6

SATELLITE 30

31 SATELLITE CONTROL DEVICE

32 SATELLITE COMMUNICATION DEVICE

33 PROPULSION DEVICE

34 ATTITUDE CONTROL DEVICE

35 POWER SUPPLY DEVICE

20: SATELLITE CONSTELLATION

21: ORBITAL PLANE

POLAR REGION

300: SATELLITE GROUP

Fig. 13

ALWAYS PASS OBSERVATION AREA AT SAME TIME

RELATIONSHIP BETWEEN ORBIT AND SUN

WINTER

FALL

SUN

SUMMER

SPRING

N

START

GENERATE ORBIT CONTROL COMMAND    S101

TRANSMIT ORBIT CONTROL COMMAND    S102

FORM SATELLITE CONSTELLATION    S103

END

20: SATELLITE CONSTELLATION

POLAR REGION

21: ORBITAL PLANE

30: SATELLITE

70: EARTH

210: ORBIT SATELLITE GROUP

Fig. 33

ELEVATION ANGLE

EQUATORIAL PLANE

Fig. 34

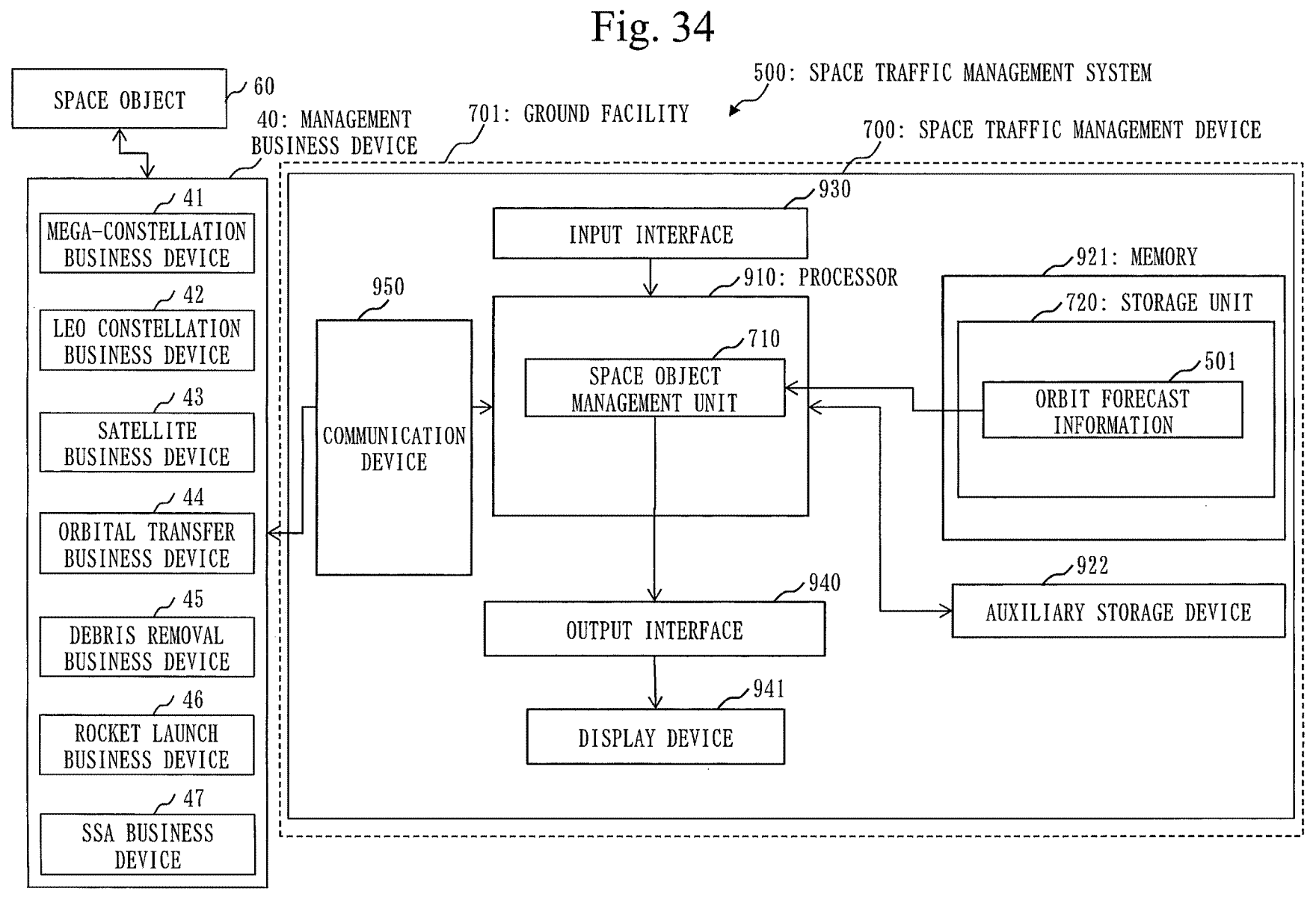

500: SPACE TRAFFIC MANAGEMENT SYSTEM

700: SPACE TRAFFIC MANAGEMENT DEVICE

701: GROUND FACILITY

40: MANAGEMENT BUSINESS DEVICE

60

SPACE OBJECT

921: MEMORY

720: STORAGE UNIT

501

ORBIT FORECAST INFORMATION

922

AUXILIARY STORAGE DEVICE

930

INPUT INTERFACE

910: PROCESSOR

710

SPACE OBJECT MANAGEMENT UNIT

940

OUTPUT INTERFACE

941

DISPLAY DEVICE

950

COMMUNICATION DEVICE

41

MEGA-CONSTELLATION BUSINESS DEVICE

42

LEO CONSTELLATION BUSINESS DEVICE

43

SATELLITE BUSINESS DEVICE

44

ORBITAL TRANSFER BUSINESS DEVICE

45

DEBRIS REMOVAL BUSINESS DEVICE

46

ROCKET LAUNCH BUSINESS DEVICE

47

SSA BUSINESS DEVICE

Fig. 35

501: ORBIT FORECAST INFORMATION
512: FORECAST EPOCH
513: FORECAST ORBITAL ELEMENTS
514: FORECAST ERROR
511: SPACE OBJECT ID
52: SATELLITE ORBIT FORECAST INFORMATION
53: DEBRIS ORBIT FORECAST INFORMATION

| SATELLITE ID / DEBRIS ID | SIX KEPLERIAN ELEMENTS | | | | | | | PREDICTED ERROR | | |
|---|---|---|---|---|---|---|---|---|---|---|
| | EPOCH | MEAN MOTION | ECCENTRICITY | INCLINATION | RAAN | ARGUMENT OF PERIGEE | MEAN ANOMALY | TRAVELING DIRECTION | ORTHOGONAL DIRECTION | BASIS |
| | Year and date | Orbits /day | No unit | deg | deg | deg | deg | km | km | |
| A | a1 | a2 | a3 | a4 | a5 | a6 | a7 | a8 | a9 | IN-ORBIT MEASUREMENT |
| B | b1 | b2 | b3 | b4 | b5 | b6 | b7 | b8 | b9 | IN-ORBIT MEASUREMENT |
| C | c1 | c2 | c3 | c4 | c5 | c6 | c7 | c8 | c9 | ANALYSIS |
| D | d1 | d2 | d3 | d4 | d5 | d6 | d7 | d8 | d9 | GROUND MEASUREMENT |
| E | e1 | e2 | e3 | e4 | e5 | e6 | e7 | e8 | e9 | GROUND MEASUREMENT |
| F | f1 | f2 | f3 | f4 | f5 | f6 | f7 | f8 | f9 | SSA MEASUREMENT |
| A | $\alpha$1 | $\alpha$2 | $\alpha$3 | $\alpha$4 | $\alpha$5 | $\alpha$6 | $\alpha$7 | $\alpha$8 | $\alpha$9 | SSA MEASUREMENT |
| B | $\beta$1 | $\beta$2 | $\beta$3 | $\beta$4 | $\beta$5 | $\beta$6 | $\beta$7 | $\beta$8 | $\beta$9 | SSA MEASUREMENT |
| $\Gamma$ | $\gamma$1 | $\gamma$2 | $\gamma$3 | $\gamma$4 | $\gamma$5 | $\gamma$6 | $\gamma$7 | $\gamma$8 | $\gamma$9 | SSA MEASUREMENT |
| $\Delta$ | $\delta$1 | $\delta$2 | $\delta$3 | $\delta$4 | $\delta$5 | $\delta$6 | $\delta$7 | $\delta$8 | $\delta$9 | SSA MEASUREMENT |

Fig. 36

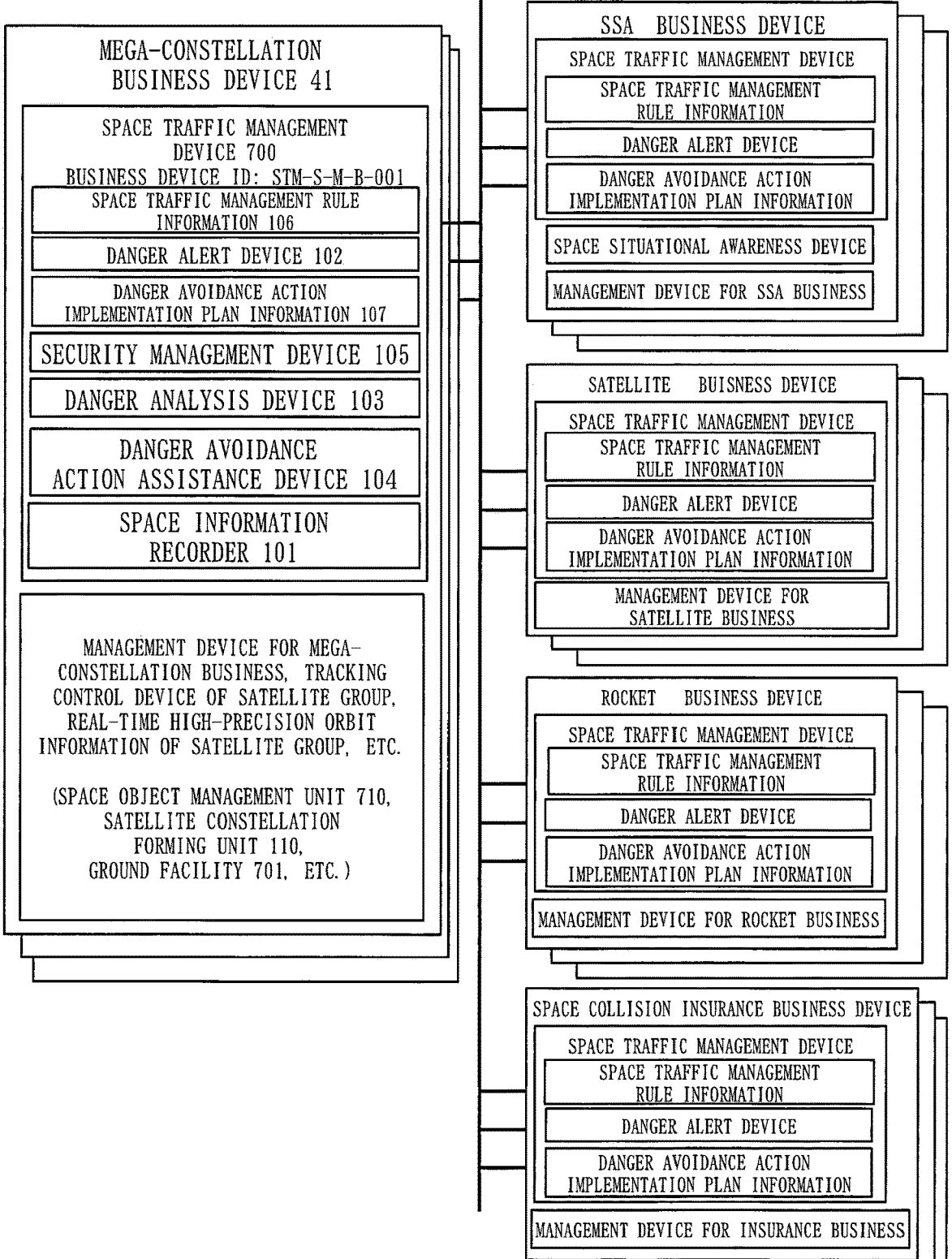

500: SPACE TRAFFIC MANAGEMENT SYSTEM

COMMUNICATION LINE

MEGA-CONSTELLATION
BUSINESS DEVICE 41

SPACE TRAFFIC MANAGEMENT
DEVICE 700
BUSINESS DEVICE ID: STM-S-M-B-001

SPACE TRAFFIC MANAGEMENT RULE
INFORMATION 106

DANGER ALERT DEVICE 102

DANGER AVOIDANCE ACTION
IMPLEMENTATION PLAN INFORMATION 107

SECURITY MANAGEMENT DEVICE 105

DANGER ANALYSIS DEVICE 103

DANGER AVOIDANCE
ACTION ASSISTANCE DEVICE 104

SPACE INFORMATION
RECORDER 101

MANAGEMENT DEVICE FOR MEGA-
CONSTELLATION BUSINESS, TRACKING
CONTROL DEVICE OF SATELLITE GROUP,
REAL-TIME HIGH-PRECISION ORBIT
INFORMATION OF SATELLITE GROUP, ETC.

(SPACE OBJECT MANAGEMENT UNIT 710,
SATELLITE CONSTELLATION
FORMING UNIT 110,
GROUND FACILITY 701, ETC.)

SSA  BUSINESS DEVICE

SPACE TRAFFIC MANAGEMENT DEVICE

SPACE TRAFFIC MANAGEMENT
RULE INFORMATION

DANGER ALERT DEVICE

DANGER AVOIDANCE ACTION
IMPLEMENTATION PLAN INFORMATION

SPACE SITUATIONAL AWARENESS DEVICE

MANAGEMENT DEVICE FOR SSA BUSINESS

SATELLITE  BUISNESS DEVICE

SPACE TRAFFIC MANAGEMENT DEVICE

SPACE TRAFFIC MANAGEMENT
RULE INFORMATION

DANGER ALERT DEVICE

DANGER AVOIDANCE ACTION
IMPLEMENTATION PLAN INFORMATION

MANAGEMENT DEVICE FOR
SATELLITE BUSINESS

ROCKET  BUSINESS DEVICE

SPACE TRAFFIC MANAGEMENT DEVICE

SPACE TRAFFIC MANAGEMENT
RULE INFORMATION

DANGER ALERT DEVICE

DANGER AVOIDANCE ACTION
IMPLEMENTATION PLAN INFORMATION

MANAGEMENT DEVICE FOR ROCKET BUSINESS

SPACE COLLISION INSURANCE BUSINESS DEVICE

SPACE TRAFFIC MANAGEMENT DEVICE

SPACE TRAFFIC MANAGEMENT
RULE INFORMATION

DANGER ALERT DEVICE

DANGER AVOIDANCE ACTION
IMPLEMENTATION PLAN INFORMATION

MANAGEMENT DEVICE FOR INSURANCE BUSINESS

Figure 38:
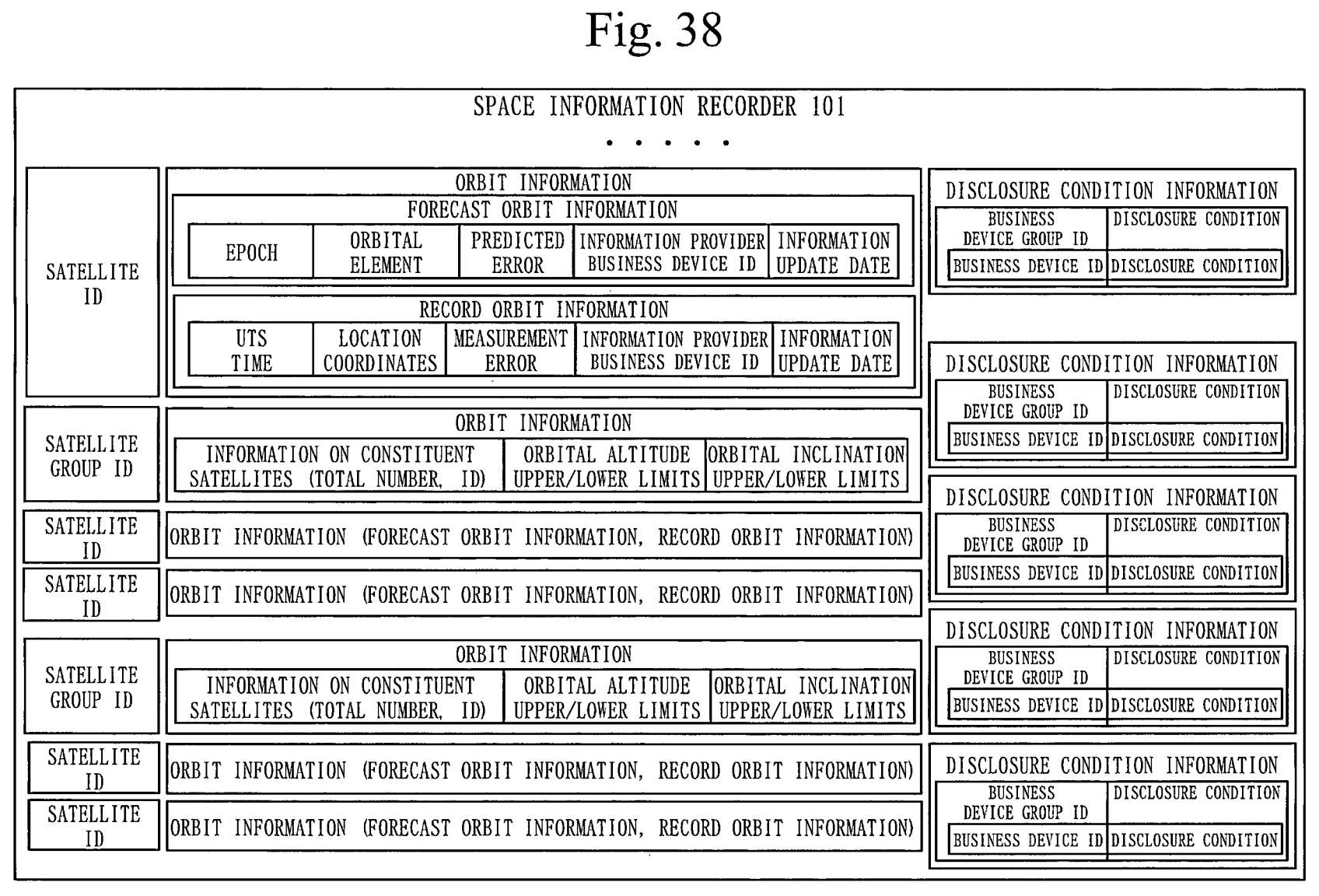

SPACE INFORMATION RECORDER 101

| SATELLITE ID | ORBIT INFORMATION | | | DISCLOSURE CONDITION INFORMATION | |

ORBIT INFORMATION
- FORECAST ORBIT INFORMATION: EPOCH | ORBITAL ELEMENT | PREDICTED ERROR | INFORMATION PROVIDER (BUSINESS DEVICE ID) | INFORMATION UPDATE DATE
- RECORD ORBIT INFORMATION: UTS TIME | LOCATION COORDINATES | MEASUREMENT ERROR | INFORMATION PROVIDER (BUSINESS DEVICE ID) | INFORMATION UPDATE DATE

DISCLOSURE CONDITION INFORMATION: BUSINESS DEVICE GROUP ID | DISCLOSURE CONDITION | BUSINESS DEVICE ID | DISCLOSURE CONDITION

SATELLITE GROUP ID — ORBIT INFORMATION: INFORMATION ON CONSTITUENT SATELLITES (TOTAL NUMBER, ID) | ORBITAL ALTITUDE | ORBITAL INCLINATION | UPPER/LOWER LIMITS | UPPER/LOWER LIMITS

SATELLITE ID — ORBIT INFORMATION (FORECAST ORBIT INFORMATION, RECORD ORBIT INFORMATION)

SATELLITE ID — ORBIT INFORMATION (FORECAST ORBIT INFORMATION, RECORD ORBIT INFORMATION)

SATELLITE GROUP ID — ORBIT INFORMATION: INFORMATION ON CONSTITUENT SATELLITES (TOTAL NUMBER, ID) | ORBITAL ALTITUDE | ORBITAL INCLINATION | UPPER/LOWER LIMITS | UPPER/LOWER LIMITS

SATELLITE ID — ORBIT INFORMATION (FORECAST ORBIT INFORMATION, RECORD ORBIT INFORMATION)

SATELLITE ID — ORBIT INFORMATION (FORECAST ORBIT INFORMATION, RECORD ORBIT INFORMATION)

Fig. 41

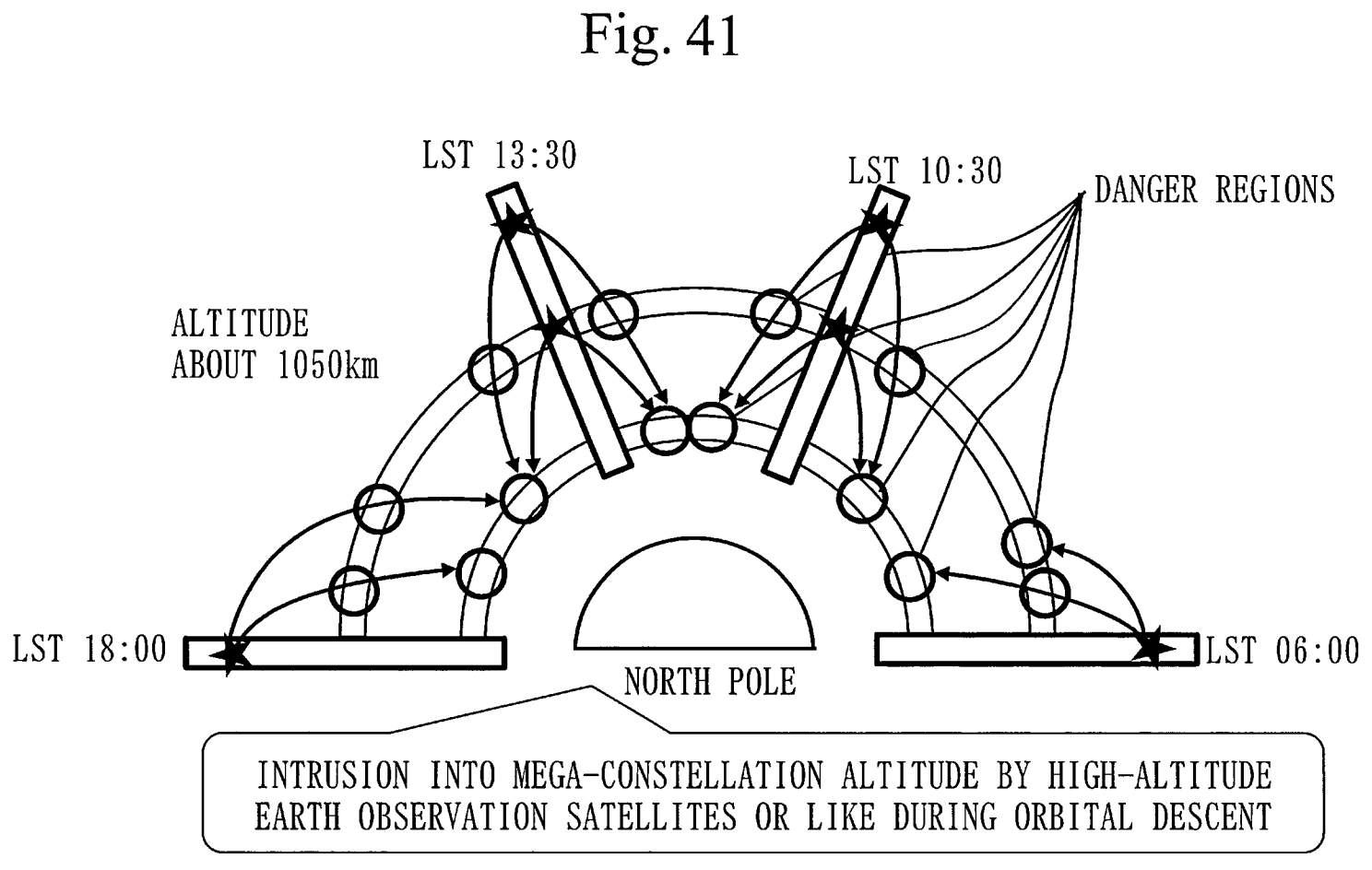

DANGER REGIONS

LST 10:30

LST 13:30

LST 06:00

ALTITUDE
ABOUT 1050km

NORTH POLE

LST 18:00

INTRUSION INTO MEGA-CONSTELLATION ALTITUDE BY HIGH-ALTITUDE
EARTH OBSERVATION SATELLITES OR LIKE DURING ORBITAL DESCENT

Fig. 42

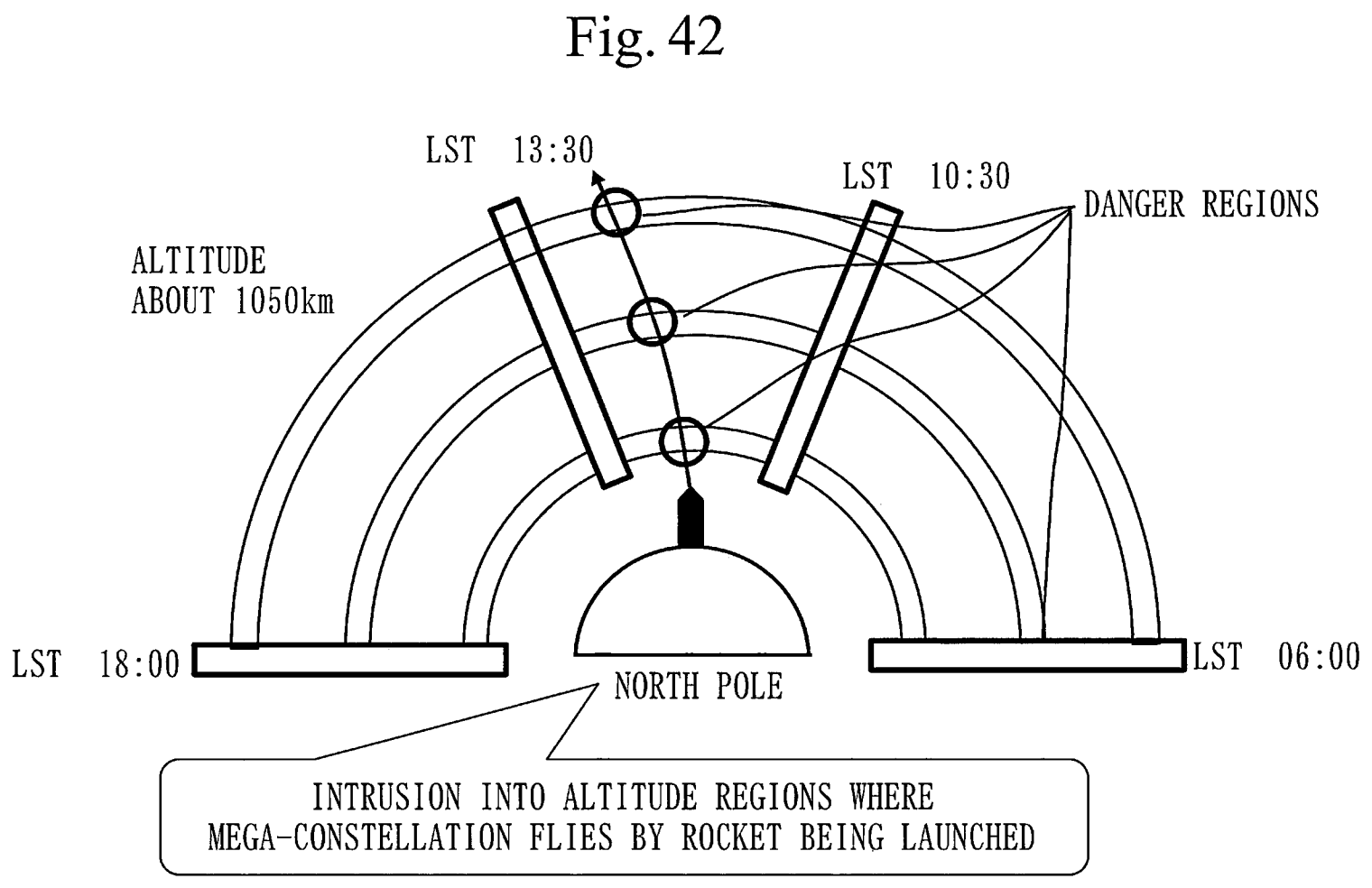

DANGER REGIONS

LST 10:30

LST 13:30

ALTITUDE
ABOUT 1050km

NORTH POLE

LST 06:00

LST 18:00

INTRUSION INTO ALTITUDE REGIONS WHERE
MEGA-CONSTELLATION FLIES BY ROCKET BEING LAUNCHED

Fig. 43

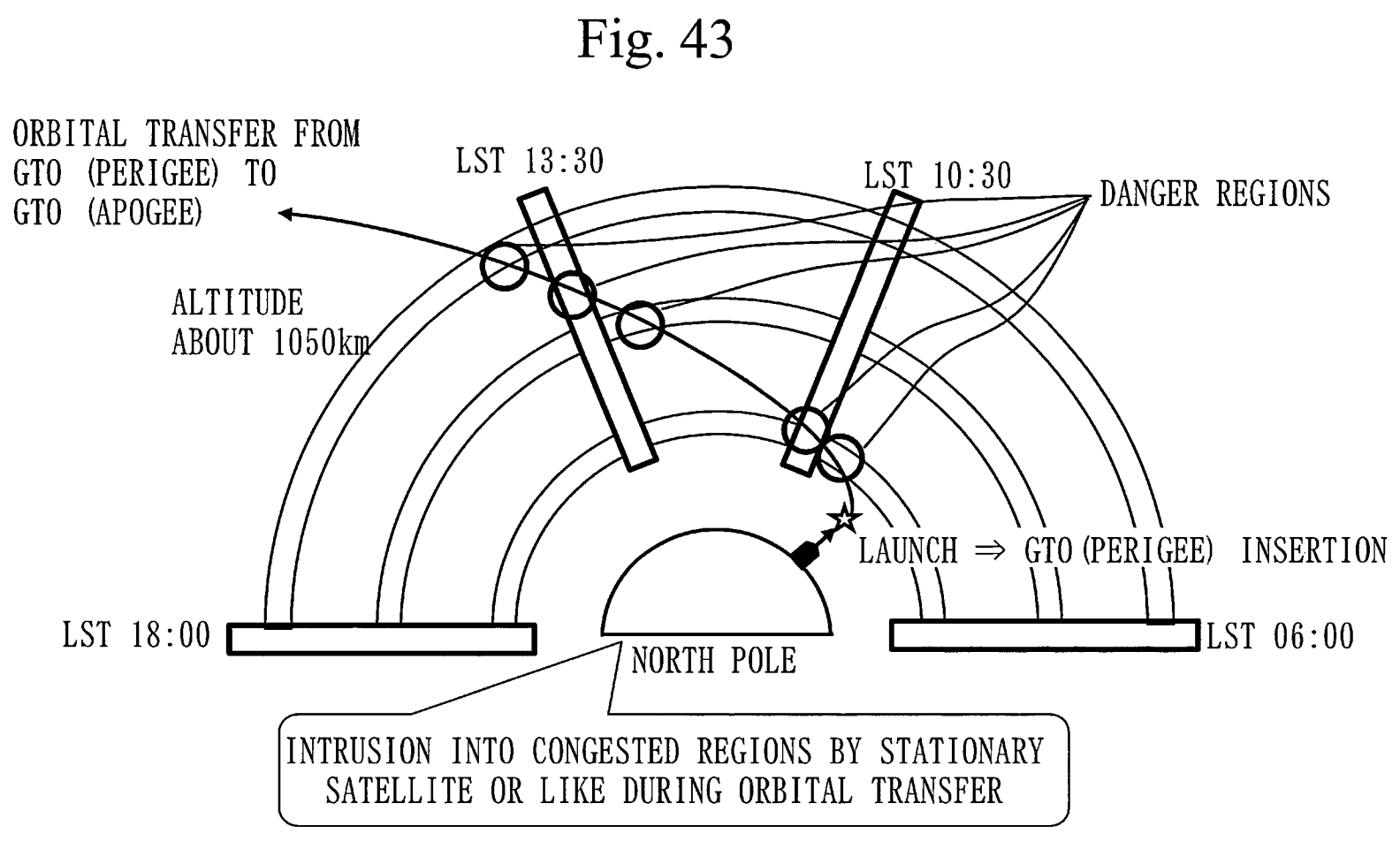

ORBITAL TRANSFER FROM
GTO (PERIGEE) TO
GTO (APOGEE)

ALTITUDE
ABOUT 1050km

DANGER REGIONS

LST 10:30

LST 13:30

LAUNCH ⇒ GTO (PERIGEE) INSERTION

LST 06:00

LST 18:00

NORTH POLE

INTRUSION INTO CONGESTED REGIONS BY STATIONARY
SATELLITE OR LIKE DURING ORBITAL TRANSFER

Fig. 44

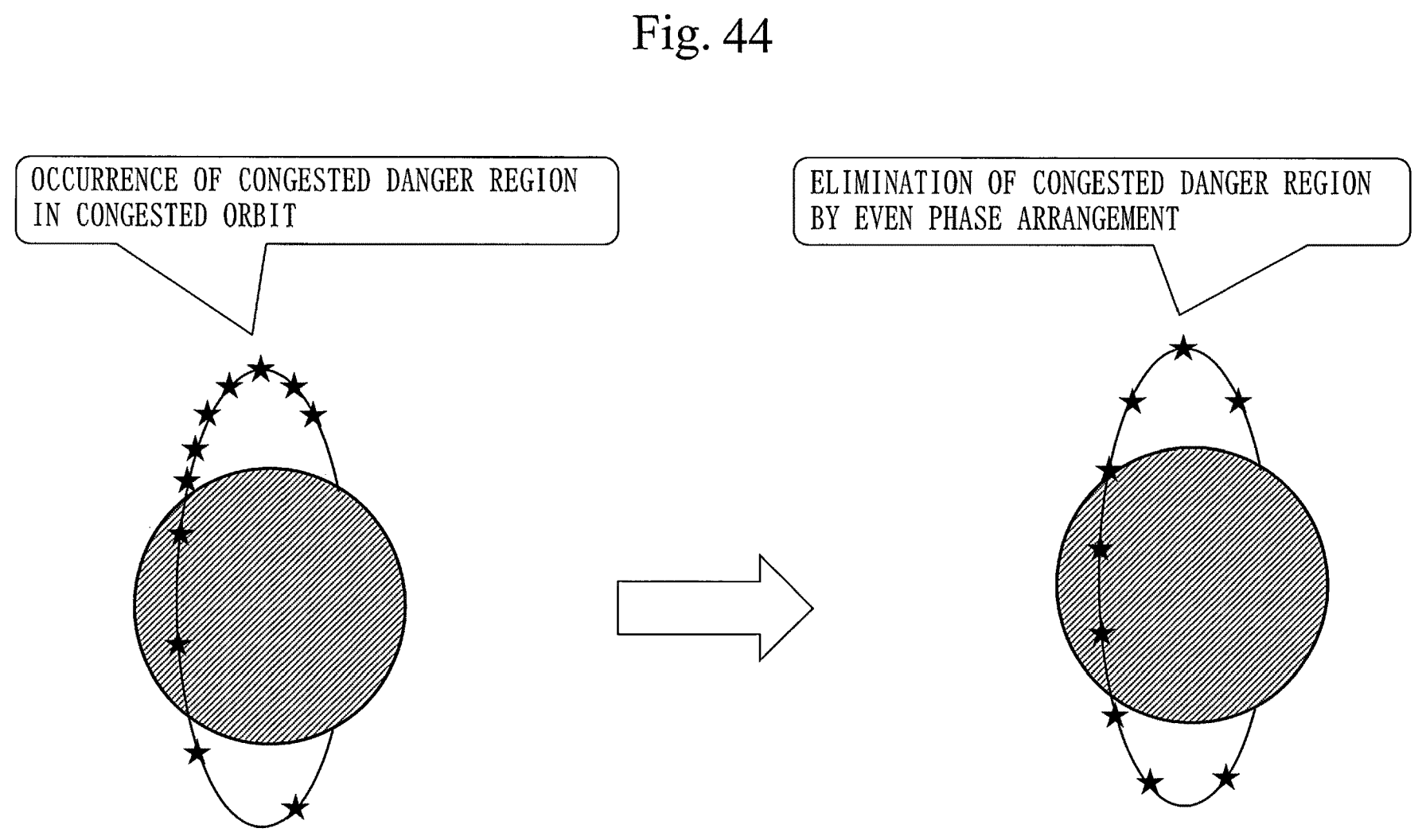

ELIMINATION OF CONGESTED DANGER REGION BY EVEN PHASE ARRANGEMENT

OCCURRENCE OF CONGESTED DANGER REGION IN CONGESTED ORBIT

MEGA-CONSTELLATION BUSINESS DEVICE

CROSS-REFERENCE TO RELATED APPLICATIONS

The present application is based on PCT filing PCT/JP2021/011324, filed Mar. 19, 2021, which claims priority to JP 2020-055556, filed Mar. 26, 2020, the entire contents of each are incorporated herein by its reference.

TECHNICAL FIELD

The present disclosure relates to a satellite constellation forming system, a mega-constellation business device, a satellite constellation, a satellite, and a ground facility.

BACKGROUND ART

In recent years, a large-scale satellite constellation including several hundred to several thousand satellites has been proposed. In space traffic management (STM), there is an increasing need to create international rules for avoiding a risk of collision between space objects due to coexistence of a plurality of satellite constellations.

Patent Literature 1 discloses a technology for forming a satellite constellation composed of a plurality of satellites in the same circular orbit.

CITATION LIST

Patent Literature

Patent Literature 1: JP 2017-114159 A

SUMMARY OF INVENTION

Technical Problem

In a satellite constellation which has a large number of orbital planes with mutually different normal angles and in which a large number of satellites fly in a single orbital plane, it is very difficult to construct the satellite constellation while avoiding a collision between satellites at an intersection of orbital planes. In a case where an orbital altitude of a satellite is changed, there is a risk of collision at an intersection of orbital planes when a satellite altitude of a different orbital plane is passed.

An object of the present disclosure is to continue providing a service while avoiding a risk of collision at an intersection of different orbital planes.

Solution to Problem

A satellite constellation forming system according to the present disclosure forms a satellite constellation which is composed of a satellite group and in which the satellite group cooperatively provides a service, and the satellite constellation has a plurality of orbital planes in each of which a plurality of satellites fly at a same nominal orbital altitude, and the satellite constellation forming system includes a satellite constellation forming unit to continue providing the service while avoiding a collision between satellites by both or one of control of an orbital altitude and control of a passage timing of a satellite group flying in a region where the plurality of orbital planes intersect.

Advantageous Effects of Invention

In a satellite constellation forming system according the present disclosure, a satellite constellation forming unit continues providing a service while avoiding a collision between satellites by both or one of control of an orbital altitude and control of a passage timing of a satellite group flying in a region where a plurality of orbital planes intersect. Therefore, with the satellite constellation forming system according to the present disclosure, there is an effect that it is possible to continue providing a service while avoiding a risk of collision at an intersection of different orbital planes.

BRIEF DESCRIPTION OF DRAWINGS

FIG. 3 is a schematic diagram illustrating an example of a satellite constellation according to Embodiment 1;

FIG. 6 is a configuration diagram of a satellite constellation forming system according to Embodiment 1;

FIG. 13 is a diagram illustrating an orbital plane that satisfies conditions for a sun-synchronous orbit;

Figure 19:
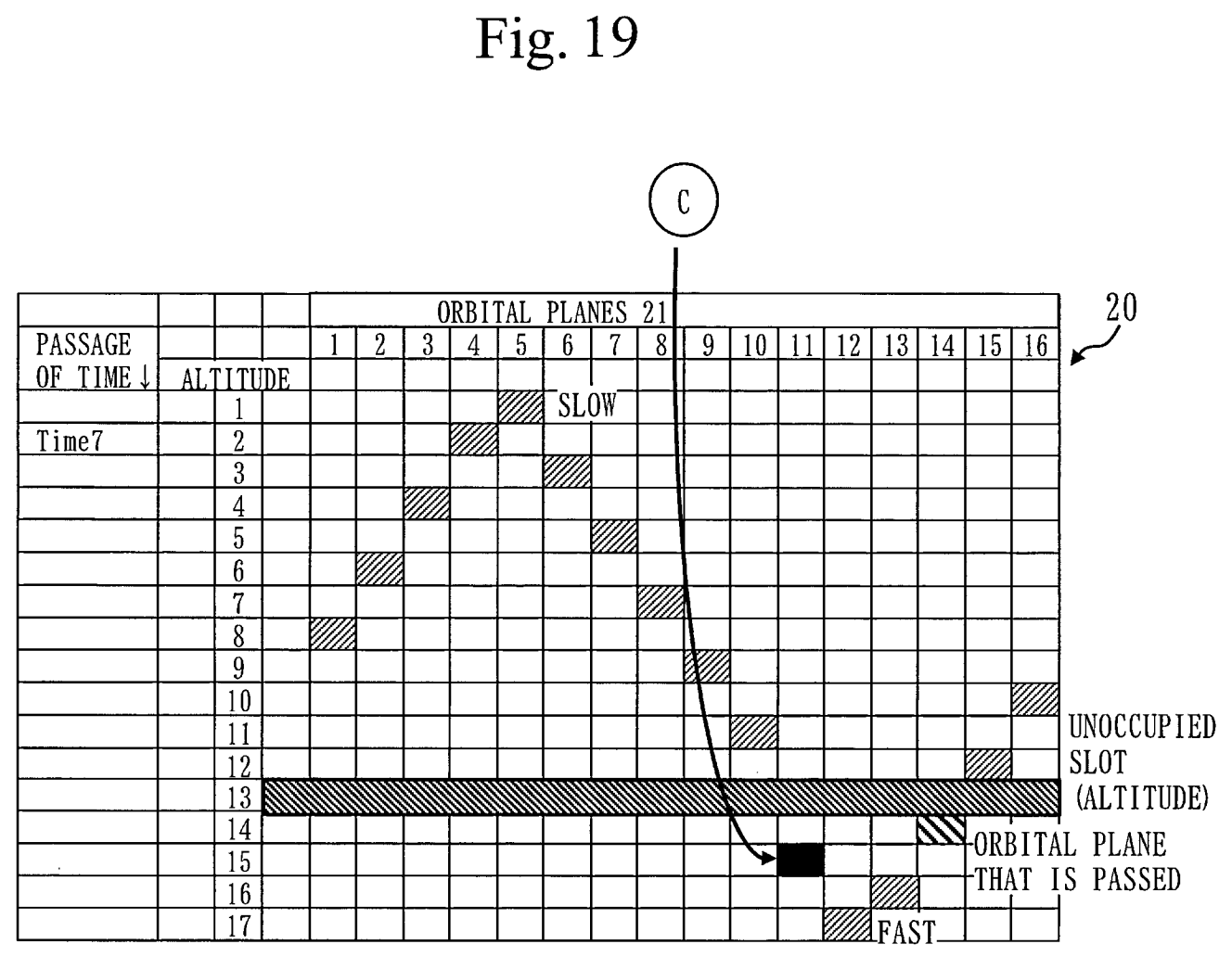

FIG. 19 is a diagram illustrating changing of orbital altitudes of orbital planes according to Embodiment 1;

FIG. 24 is a diagram illustrating an example of a satellite constellation according to Embodiment 3;

FIG. 33 is a diagram illustrating an example of eight orbital planes that are arranged by sequentially arranging adjacent major axes in a satellite constellation according to Embodiment 5;

FIG. 34 is a configuration diagram illustrating an example of a space traffic management system and an example of a space traffic management device according to Embodiment 6;

FIG. 35 is a diagram illustrating an example of orbit forecast information according to Embodiment 6;

FIG. 36 is a diagram illustrating an example of the space traffic management system according to Embodiment 6;

FIG. 37 is a diagram illustrating a detailed example of the space traffic management device according to Embodiment 6;

FIG. 38 is a diagram illustrating a detailed example of a space information recorder of the space traffic management device according to Embodiment 6;

FIG. 41 is a diagram illustrating an example of danger region identification information according to Embodiment 6;

FIG. 42 is a diagram illustrating an example of danger region identification information according to Embodiment 6;

FIG. 43 is a diagram illustrating an example of danger region identification information according to Embodiment 6; and FIG. 44 is a diagram representing elimination of a congested danger region by even phase arrangement according to Embodiment 6.

DESCRIPTION OF EMBODIMENTS

Figure 1:
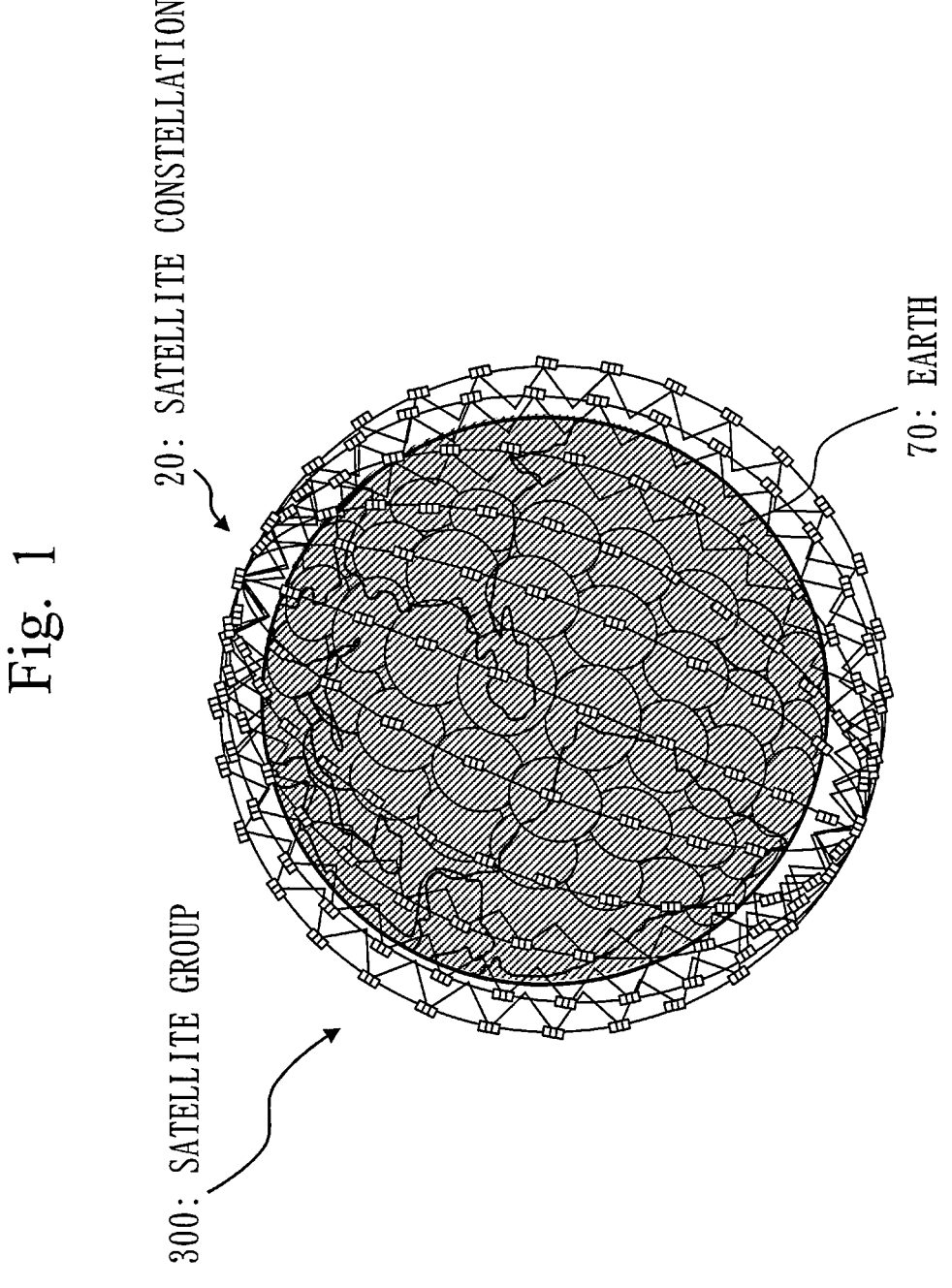
FIG. 1 is an example in which a plurality of satellites cooperatively realize a communication service to the ground over the entire globe of Earth.

Embodiments of the present disclosure will be described hereinafter with reference to the drawings. Throughout the drawings, the same or corresponding parts are denoted by the same reference signs. In the description of the embodiments, description of the same or corresponding parts will be suitably omitted or simplified. In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

FIG. 1 is a diagram illustrating an example in which a plurality of satellites cooperatively realize a communication service to the ground over the entire globe of Earth 70.

FIG. 1 illustrates a satellite constellation 20 that realizes a communication service over the entire globe.

The ground communication service range of each satellite of a plurality of satellites flying at the same altitude in the same orbital plane overlaps the communication service range of a following satellite. Therefore, with such satellites, the satellites in the same orbital plane can provide a communication service to a specific point on the ground in turn in a time-division manner.

However, a communication service can be provided with a single orbital plane only to an area directly below the orbit of satellites. Thus, another orbital plane rotated in the east-west direction with respect to Earth is placed adjacently, and a communication service is concurrently provided by a plurality of satellites in this orbital plane. By providing adjacent orbital planes in this way, communication services can be provided to the ground with widespread coverage across the adjacent orbits.

Similarly, by placing a large number of orbital planes at approximately equal intervals around Earth, a communication service to the ground can be provided over the entire globe. When seen from a specific point on the ground, each satellite flies away in a short period of time. However, if satellites in orbit provide a communication service in turn in a time-division manner, a communication service can be provided continuously to any point on the ground. In this case, in order to share the communication service with a following satellite, each satellite provides and accepts necessary signals and information, using an inter-satellite communication method.

When a communication service is realized by a satellite constellation orbiting in low Earth orbit, the service areas of all satellites cover the entire globe, and a communication service for any given ground user is shared and continued by satellites flying above the user in turn while passing on signals and information. As a result, the communication service can be provided continuously to the ground user. By providing each satellite with the communication function between the satellite and the ground and also the inter-satellite communication function, signals and information can be transferred between satellites orbiting in proximity to each other. The transfer of signals and information that contributes to cooperation in a communication service mission will hereinafter be referred to as handover.

In a satellite constellation, it is generally arranged that different orbital planes all have the same orbital altitude. Since the ground speeds of satellites flying at the same orbital altitude are similar, the ground service ranges move according to the ground speeds of the satellites with the relative positional relationship of the service ranges of the individual satellites being maintained. If the service ranges of successive satellites in the same orbital plane or the service ranges of satellites in adjacent orbital planes exhaustively cover the ground surface, the service range will always be maintained when seen from any given point on the ground.

Figure 2:
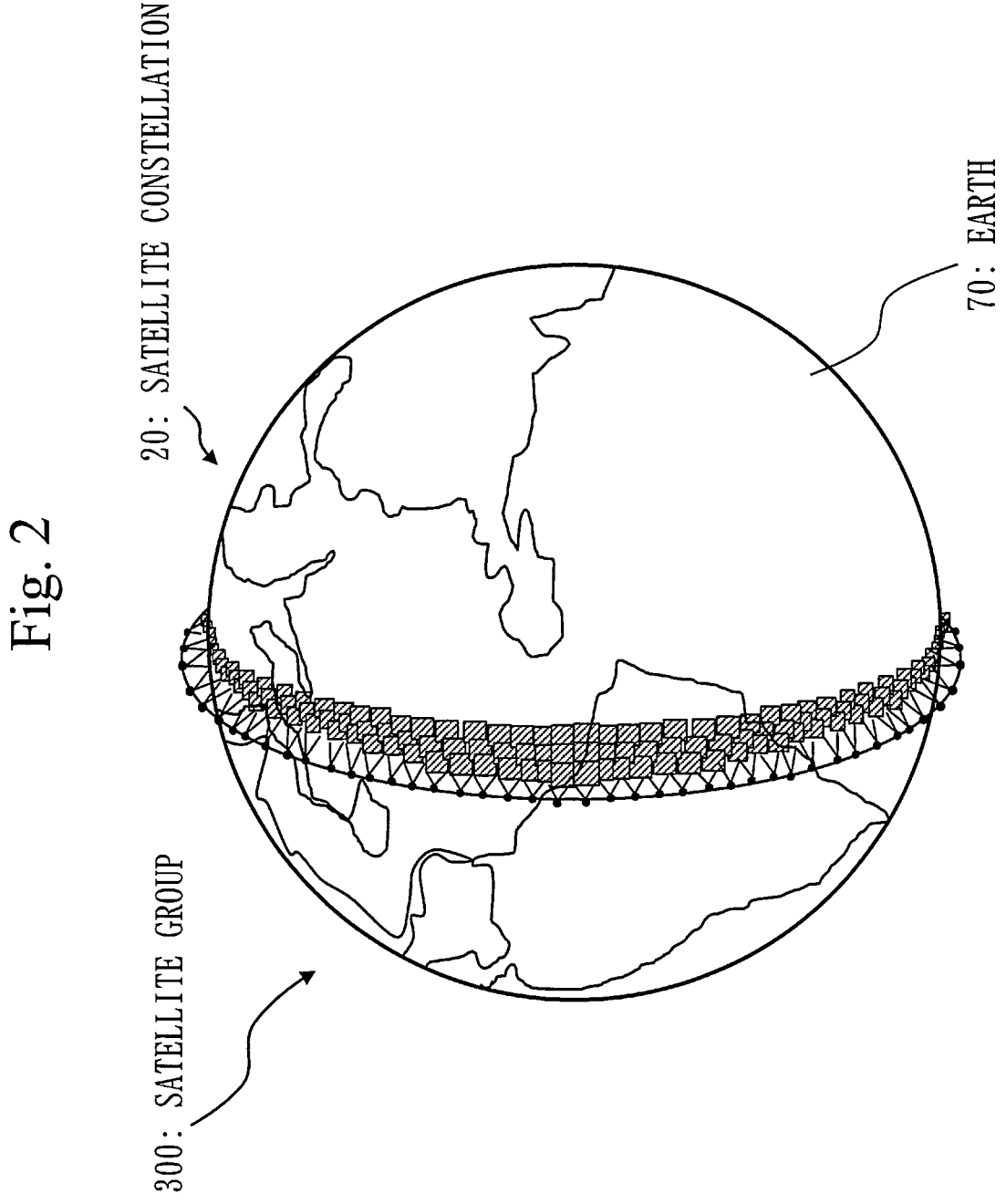
FIG. 2 is an example in which a plurality of satellites in a single orbital plane realize an Earth observation service.

FIG. 2 is a diagram illustrating an example in which an Earth observation service is realized by a plurality of satellites in a single orbital plane.

FIG. 2 illustrates a satellite constellation 20 that realizes an Earth observation service. In the satellite constellation of FIG. 2, satellites each equipped with an Earth observation device, which is an optical sensor or a radio sensor such as synthetic-aperture radar, fly at the same altitude in the same orbital plane. In this way, in a satellite group in which the ground imaging ranges of successive satellites overlap in a time-delay manner, a plurality of satellites in orbit provide an Earth observation service by capturing ground images in turn in a time-division manner. However, with the single orbital plane, a service can be provided only to the vicinity of an area directly below the orbit of the satellites. In contrast to this, if another orbital plane rotated in the east-west direction with respect to Earth is placed adjacently and a service by a plurality of satellites is similarly conducted concurrently, a ground service with widespread coverage between the adjacent orbits is possible. Similarly, by placing a large number of orbital planes at approximately equal intervals around Earth, an Earth observation service can be provided exhaustively over the entire globe. When seen from a specific point on the ground, each satellite flies away in a short period of time. However, if a plurality of satellites in orbit provide a service in turn in a time-division manner, an Earth observation service can always be provided to any given point on the ground.

*Description of Configuration*

A satellite constellation forming system 100 according to this embodiment forms a satellite constellation 20 having a plurality of orbital planes 21. In each orbital plane 21 of the plurality of orbital planes 21, a plurality of satellites 30 fly at the same orbital altitude.

The satellite constellation 20 formed by the satellite constellation forming system 100 according to this embodiment will be briefly described.

The satellite constellation 20 according to this embodiment is composed of a satellite group 300 made up of a plurality of satellites 30 in each orbital plane 21. In the satellite constellation 20 according to this embodiment, the satellite group 300 provides a service cooperatively. Specifically, the satellite constellation 20 refers to a satellite constellation composed of one satellite group provided by a communications business service company as illustrated in FIG. 1. Specifically, the satellite constellation 20 refers to a satellite constellation composed of one satellite group provided by an observation business service company as illustrated in FIG. 2.

Figure 3:
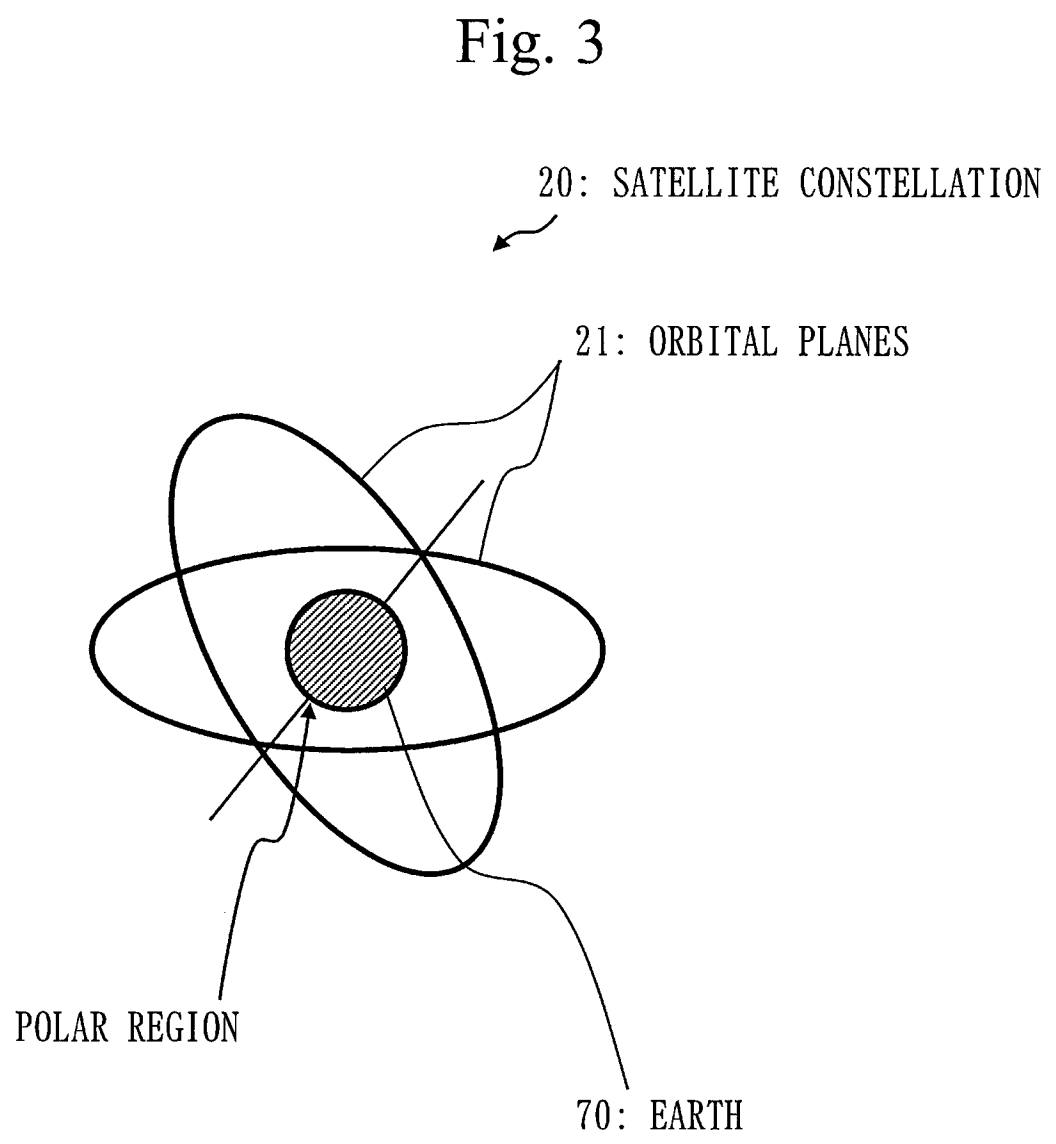
Figure 4:
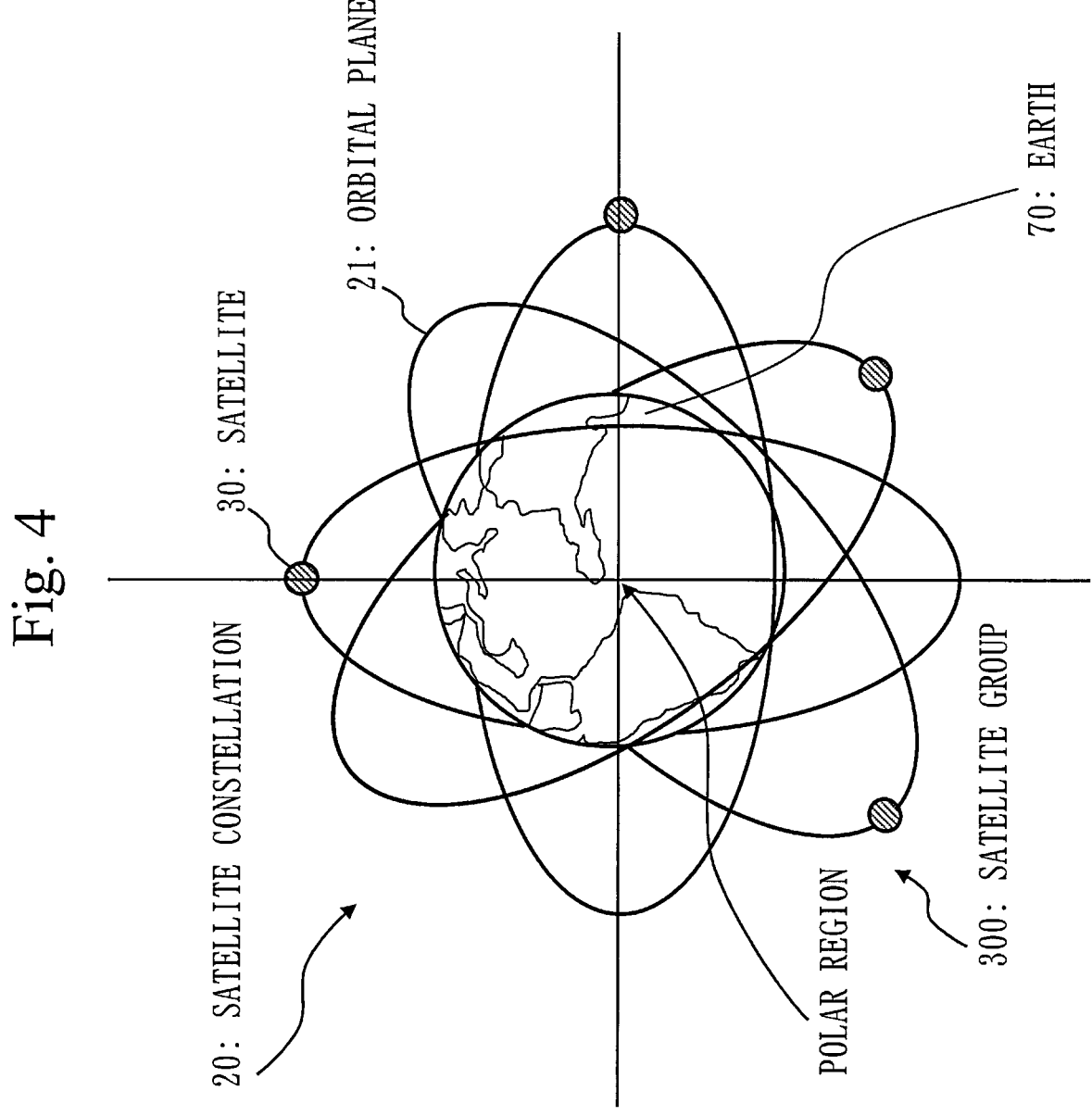
FIG. 4 is a schematic diagram illustrating an example of a satellite constellation according to Embodiment 1.

FIGS. 3 and 4 are schematic diagrams illustrating examples of the satellite constellation 20 according to this embodiment.

In FIG. 3, the orbital planes 21 in the satellite constellation 20 exist on mutually different planes. FIG. 3 illustrates an example in which the orbital inclination of each of the orbital planes 21 is approximately 90 degrees, but the orbital planes do not coincide with each other. That is, the orbital planes 21 intersect with each other. In FIG. 3, the orbital planes intersect with each other mainly in the vicinity of the polar regions. As an example, 20 or more satellites may fly as a plurality of satellites in each of the orbital planes 21. As an example, the satellite constellation 20 of FIG. 3 may have 20 or more orbital planes 21.

The satellite constellation 20 illustrated in FIG. 4 indicates an example in which the orbital inclination of each of the orbital plane 21 is not about 90 degrees, and the orbital planes 21 exist on mutually different planes. In FIG. 4, the orbital planes intersect with each other mainly outside the polar regions.

In the satellite constellation 20 according to this embodiment, the orbital planes 21 have mutually different orbital altitudes. Furthermore, in the satellite constellation 20 according to this embodiment, each of the orbital planes 21 may have an orbital inclination such that the orbital periods of the orbital planes 21 are equal to each other.

In the satellite constellation 20 according to this embodiment, relative altitude differences between adjacent orbital planes in a plurality of orbital planes are sequentially arranged to be sinusoidal. Furthermore, in the satellite constellation 20 according to this embodiment, the orbital altitude of each orbital plane 21 of the plurality of orbital planes is sequentially changed while maintaining a sinusoidal arrangement of the relative altitude differences between adjacent orbital planes in the plurality of orbital planes.

The configuration of the satellite constellation 20 according to this embodiment will be described in detail later.

Figure 5:
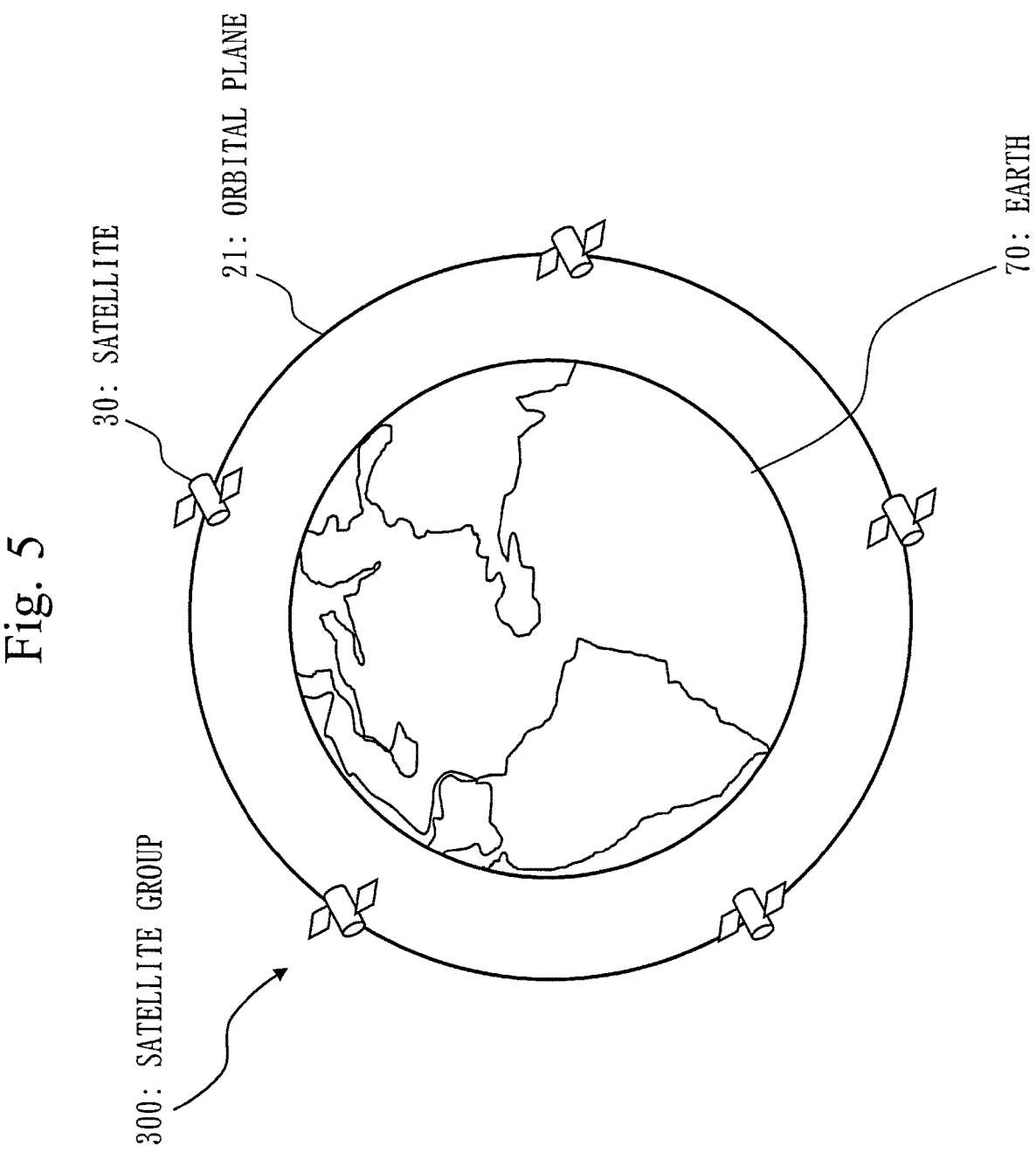
FIG. 5 is an example of a plurality of satellites flying in one of orbital planes of a satellite constellation according to Embodiment 1.

FIG. 5 is an example of the satellites 30 flying in one of the orbital planes 21 of the satellite constellation 20 according to this embodiment.

The satellites 30 flying at the same altitude in the same orbital plane fly at relatively the same speeds while maintaining the relative phases in the orbital plane. Therefore, the satellites 30 flying at the same altitude in the same orbital plane will not collide with each other.

Figure 6:
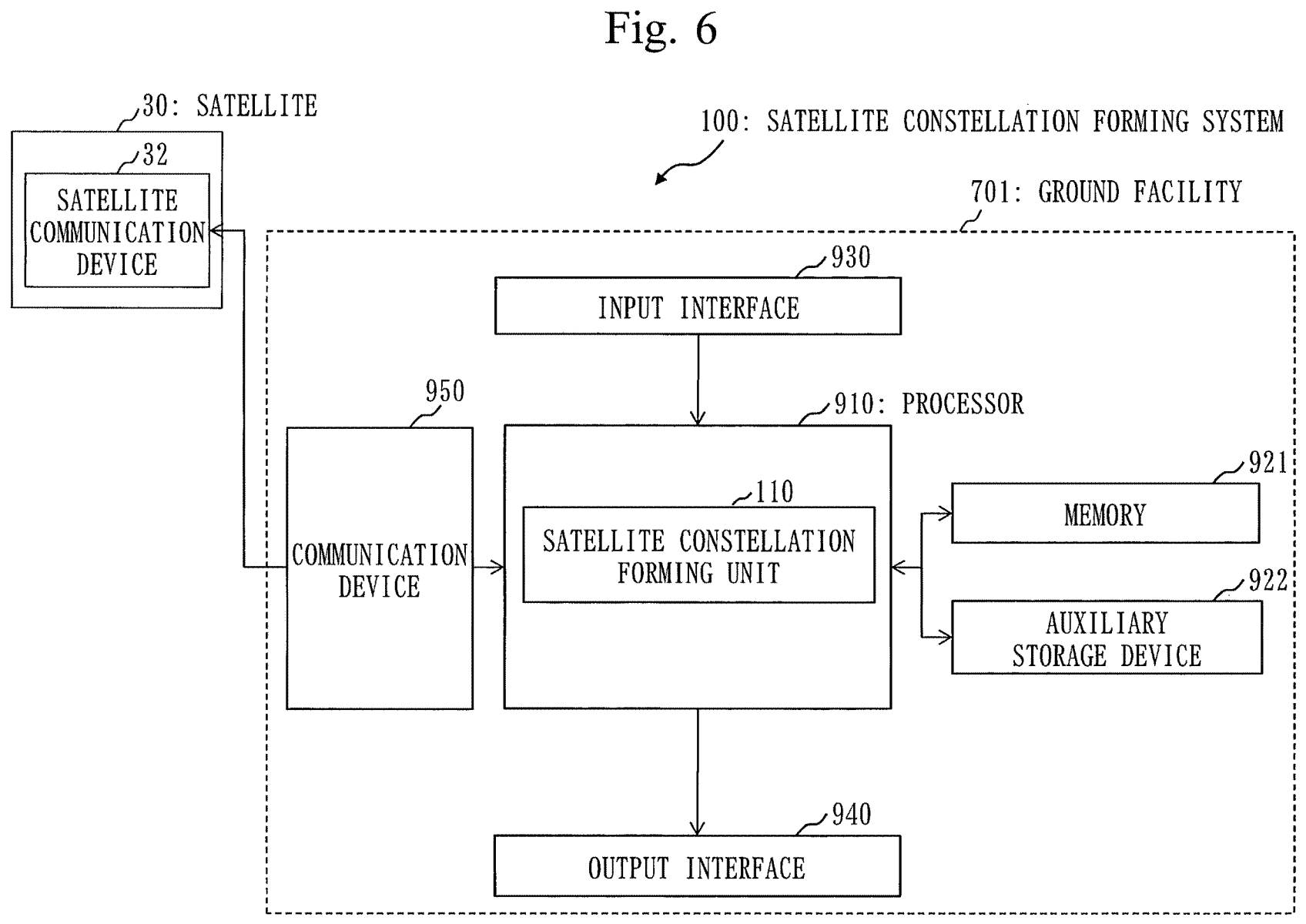

FIG. 6 is a configuration diagram of the satellite constellation forming system 100 according to this embodiment.

The satellite constellation forming system 100 includes a computer. FIG. 6 illustrates the configuration with one computer. In practice, a computer is included in each of the satellites 30 constituting the satellite constellation 20 and a ground facility 701 that communicates with the satellites 30. The computers provided in each of the satellites 30 and the ground facility 701 that communicates with the satellites 30 cooperatively realize the functions of the satellite constellation forming system 100 according to this embodiment. An example of a configuration of the computer that realizes the functions of the satellite constellation forming system 100 will be described below.

The satellite constellation forming system 100 includes the satellite 30 and the ground facility 701. The satellite 30 includes a satellite communication device 32 that communicates with a communication device 950 of the ground facility 701. FIG. 6 illustrates the satellite communication device 32 out of components included in the satellite 30.

The satellite constellation forming system 100 includes a processor 910, and also includes other hardware components such as a memory 921, an auxiliary storage device 922, an input interface 930, an output interface 940, and a communication device 950. The processor 910 is connected with other hardware components via signal lines and controls these other hardware components.

The satellite constellation forming system 100 includes a satellite constellation forming unit 110 as a functional element. The functions of the satellite constellation forming unit 110 are realized by hardware or software.

In the satellite constellation forming unit 110, the orbital altitudes of a plurality of orbital planes 21 are mutually different. Furthermore, in this satellite constellation 20, relative altitude differences between adjacent orbital planes in the plurality of orbital planes are sequentially arranged to be sinusoidal. The satellite constellation forming unit 110 sequentially changes the orbital altitude of each orbital plane 21 of the plurality of orbital planes while maintaining a sinusoidal arrangement of the relative altitude differences between adjacent orbital planes in the plurality of orbital planes. Furthermore, in the satellite constellation 20, each orbital plane 21 may have an orbital inclination such that the orbital periods of the plurality of orbital planes 21 are equal to each other.

Specifically, the satellite constellation forming unit 110 sets orbital altitudes, the number of which is a number larger by one than the number of orbital planes of the plurality of orbital planes. Then, the satellite constellation forming unit 110 changes the orbital altitude of each orbital plane 21 of the plurality of orbital planes so that an unoccupied orbital altitude, at which no satellite is flying, is sequentially filled. With this function, the satellite constellation forming unit 110 sequentially changes the orbital altitude of each orbital plane 21 of the plurality of orbital planes.

The processor 910 is a device that executes a satellite constellation forming program. The satellite constellation forming program is a program that realizes the functions of the satellite constellation forming unit 110.

The processor 910 is an integrated circuit (IC) that performs operational processing. Specific examples of the processor 910 are a CPU, a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of an output device, such as a display, is to be connected. Specifically, the output interface 940 is a USB terminal or a High Definition Multimedia Interface (HDMI, registered trademark) terminal. Specifically, the display is a liquid crystal display (LCD).

The communication device 950 has a receiver and a transmitter. Specifically, the communication device 950 is a communication chip or a network interface card (NIC). In the satellite constellation forming system 100, communication between the ground facility 701 and the satellite 30 is performed via the communication device 950.

The satellite constellation forming program is read into the processor 910 and executed by the processor 910. The memory 921 stores not only the satellite constellation forming program but also an operating system (OS). The processor 910 executes the satellite constellation forming program while executing the OS. The satellite constellation forming program and the OS may be stored in the auxiliary storage device. The satellite constellation forming program and the OS that are stored in the auxiliary storage device are loaded into the memory 921 and executed by the processor 910. Part or the entirety of the satellite constellation forming program may be embedded in the OS.

The satellite constellation forming system 100 may include a plurality of processors as an alternative to the processor 910. These processors share the execution of the satellite constellation forming program. Each of the processors is, like the processor 910, a device that executes the satellite constellation forming program.

Data, information, signal values, and variable values that are used, processed, or output by the satellite constellation forming program are stored in the memory 921 or the auxiliary storage device 922, or stored in a register or a cache memory in the processor 910.

"Unit" of the satellite constellation forming unit 110 may be interpreted as "process", "procedure", or "step". "Process" of the satellite constellation formation process may be interpreted as "program", "program product", or "computer readable storage medium recording a program".

The satellite constellation forming program causes a computer to execute each process, each procedure, or each step, where "unit" of the above satellite constellation forming unit is interpreted as "process", "procedure", or "step". A satellite constellation forming method is a method performed by execution of the satellite constellation forming program by the satellite constellation forming system 100.

The satellite constellation forming program may be stored and provided in a computer readable recording medium or storage medium. Alternatively, the satellite constellation forming program may be provided as a program product.

Figure 7:
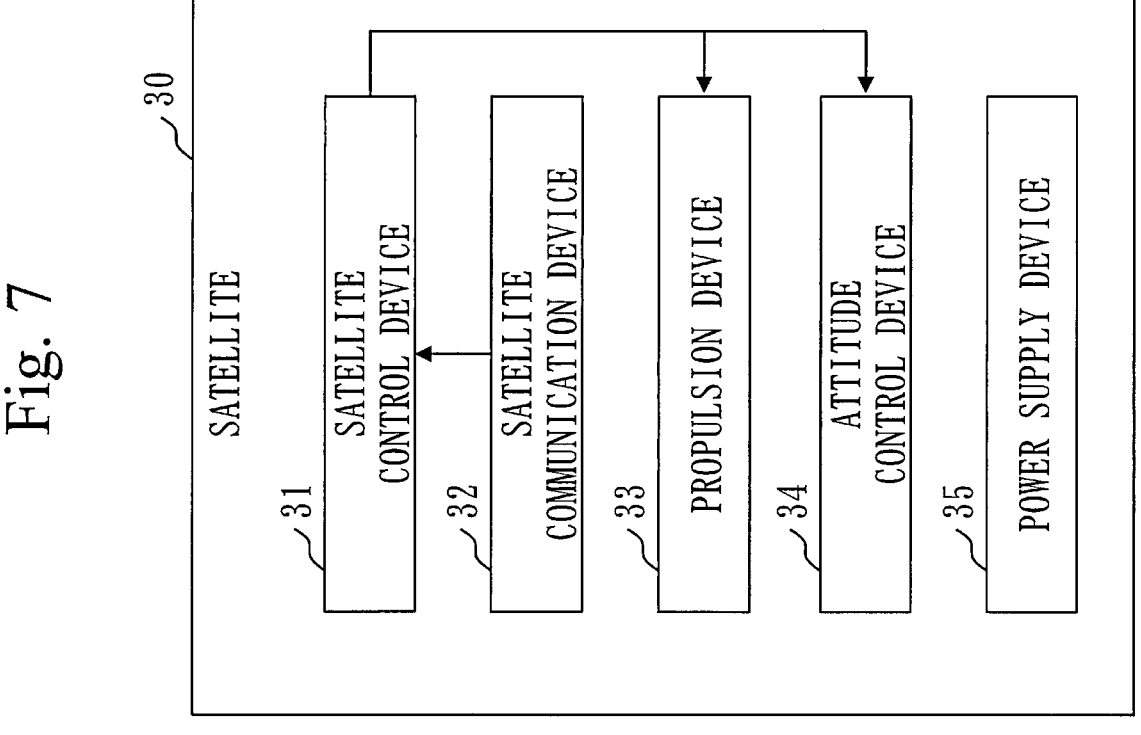
FIG. 7 is a configuration diagram of a satellite according to Embodiment 1.

FIG. 7 is a configuration diagram of the satellite 30 according to this embodiment.

The satellite 30 includes a satellite control device 31, the satellite communication device 32, a propulsion device 33, an attitude control device 34, and a power supply device 35. In addition, constituent elements that realize various functions are included. In FIG. 7, the satellite control device 31, the satellite communication device 32, the propulsion device 33, the attitude control device 34, and the power supply device 35 will be described.

The satellite control device 31 is a computer that controls the propulsion device 33 and the attitude control device 34, and includes a processing circuit. Specifically, the satellite control device 31 controls the propulsion device 33 and the attitude control device 34 in accordance with various commands transmitted from the ground facility 701.

The satellite communication device 32 is a device that communicates with the ground facility 701. Specifically, the satellite communication device 32 transmits various types of data regarding the satellite itself to the ground facility 701. The satellite communication device 32 receives various commands transmitted from the ground facility 701.

The propulsion device 33 is a device that provides thrust to the satellite 30 and changes the velocity of the satellite 30. Specifically, the propulsion device 33 is an electric propulsion device. Specifically, the propulsion device 33 is an ion engine or a Hall thruster.

The attitude control device 34 is a device to control attitude elements such as the attitude of the satellite 30 and the angular velocity and line of sight of the satellite 30. The attitude control device 34 changes the orientation of each attitude element to a desired orientation. Alternatively, the attitude control device 34 maintains each attitude element in a desired orientation. The attitude control device 34 includes an attitude sensor, an actuator, and a controller. The attitude sensor is a device such as a gyroscope, an Earth sensor, a sun sensor, a star tracker, a thruster, or a magnetic sensor. The actuator is a device such as an attitude control thruster, a momentum wheel, a reaction wheel, or a control moment gyroscope. The controller controls the actuator according to measurement data of the attitude sensor or various commands from the ground facility 701.

The power supply device 35 includes equipment such as a solar cell, a battery, and an electric control device, and provides electric power to each piece of equipment installed in the satellite 30.

The processing circuit included in the satellite control device 31 will be described.

The processing circuit may be dedicated hardware, or may be a processor that executes programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit.

FPGA is an abbreviation for Field Programmable Gate Array.

Figure 8:
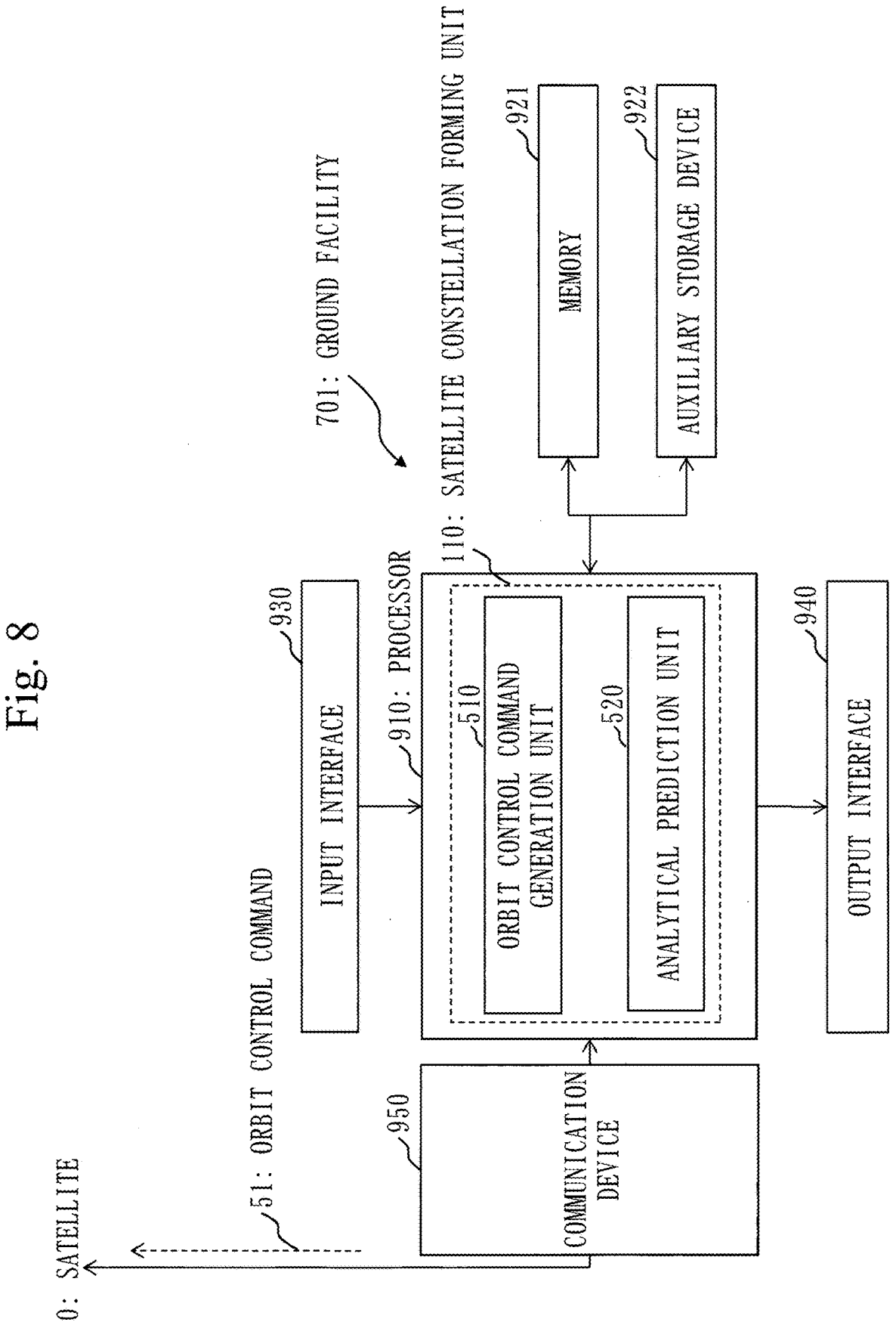
FIG. 8 is a configuration diagram of a ground facility according to Embodiment 1.

FIG. 8 is a configuration diagram of the ground facility 701 according to this embodiment.

The ground facility 701 controls a large number of satellites in all orbital planes by programs. The ground facility 701 is an example of a ground device. The ground device is composed of a ground station, such as a ground antenna device, a communication device connected with a ground antenna device, or an electronic computer, and a ground facility as a server or terminal connected with the ground station via a network. The ground device may include a communication device installed on a mobile object such as an airplane, a self-driving vehicle, or a mobile terminal.

The ground facility 701 forms a satellite constellation 20 by communicating with each satellite 30. The ground facility 701 is provided in the satellite constellation forming system 100. The ground facility 701 includes a processor 910, and also includes other hardware components such as a memory 921, an auxiliary storage device 922, an input interface 930, an output interface 940, and a communication device 950. The processor 910 is connected with other hardware components via signal lines, and controls these other hardware components. The hardware components of the ground facility 701 are substantially the same as those described for the satellite constellation forming system 100 in FIG. 6. In FIGS. 6 and 7, the hardware components included in the ground facility 701 have been described. However, hardware components having substantially the same functions may be included in a system, a satellite, a device, or a facility other than the satellite 30 and the ground facility.

The ground facility 701 includes an orbit control command generation unit 510 and an analytical prediction unit 520 as functional elements. The functions of the orbit control command generation unit 510 and the analytical prediction unit 520 are realized by hardware or software.

The communication device 950 transmits and receives signals for tracking and controlling each satellite 30 in the satellite group 300 constituting the satellite constellation 20. The communication device 950 transmits an orbit control command 51 to each satellite 30.

The analytical prediction unit 520 analytically predicts the orbit of the satellite 30.

The orbit control command generation unit 510 generates an orbit control command 51 to be transmitted to the satellite 30. Specifically, the orbit control command generation unit 510 generates the orbit control command 51 for forming a satellite constellation 20 in which the orbital altitudes of a plurality of orbital planes 21 are mutually different and relative altitude differences between adjacent orbital planes in the plurality of orbital planes are sequentially arranged to be sinusoidal. The orbit control command 51 further causes the orbital altitude of each of the orbital planes 21 to be sequentially changed while maintaining a sinusoidal arrangement of the relative altitude differences between adjacent orbital planes in the plurality of orbital planes. The orbit control command 51 may generate the orbit control command 51 for forming the satellite constellation 20 in which each orbital plane further has an orbital inclination such that the orbital periods of the plurality of orbital planes 21 are equal to each other.

As described above, the orbit control command generation unit 510 and the analytical prediction unit 520 realize the functions of the satellite constellation forming unit 110. That is, the orbit control command generation unit 510 and the analytical prediction unit 520 are examples of the satellite constellation forming unit 110.

Figure 9:
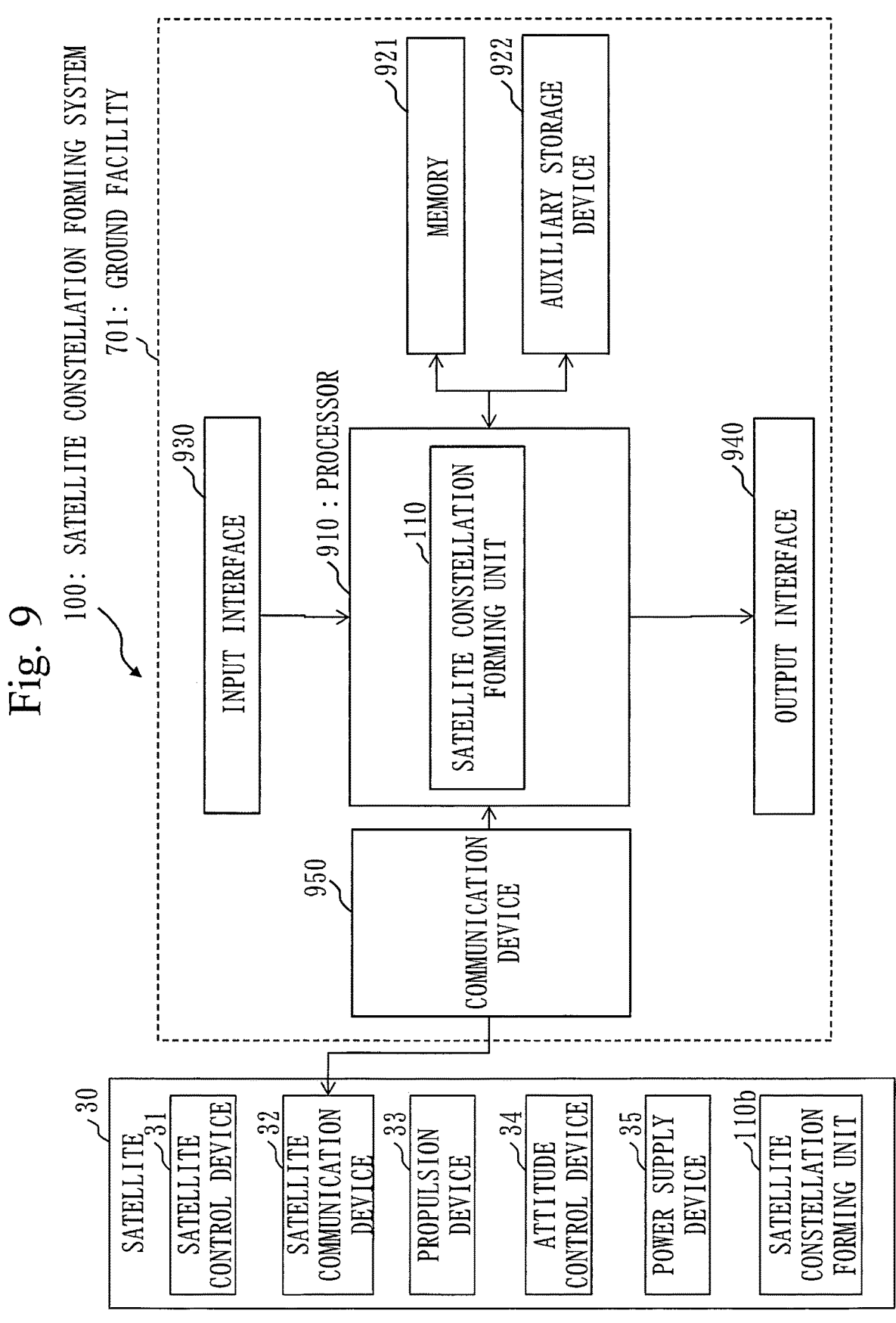
FIG. 9 is an example of a functional configuration of the satellite constellation forming system according to Embodiment 1.

FIG. 9 is a diagram illustrating an example of a functional configuration of the satellite constellation forming system 100 according to this embodiment.

The satellite 30 further includes a satellite constellation forming unit 110b to form a satellite constellation 20. The satellite constellation forming unit 110b included in each satellite 30 of a plurality of satellites and the satellite constellation forming unit 110 included in each ground facility 701 cooperatively realize the functions of the satellite constellation forming system 100 according to this embodiment. The satellite constellation forming unit 110b of the satellite 30 may be provided in the satellite control device 31.

*Description of Satellite Constellation 20 according to This Embodiment*

Figure 10:
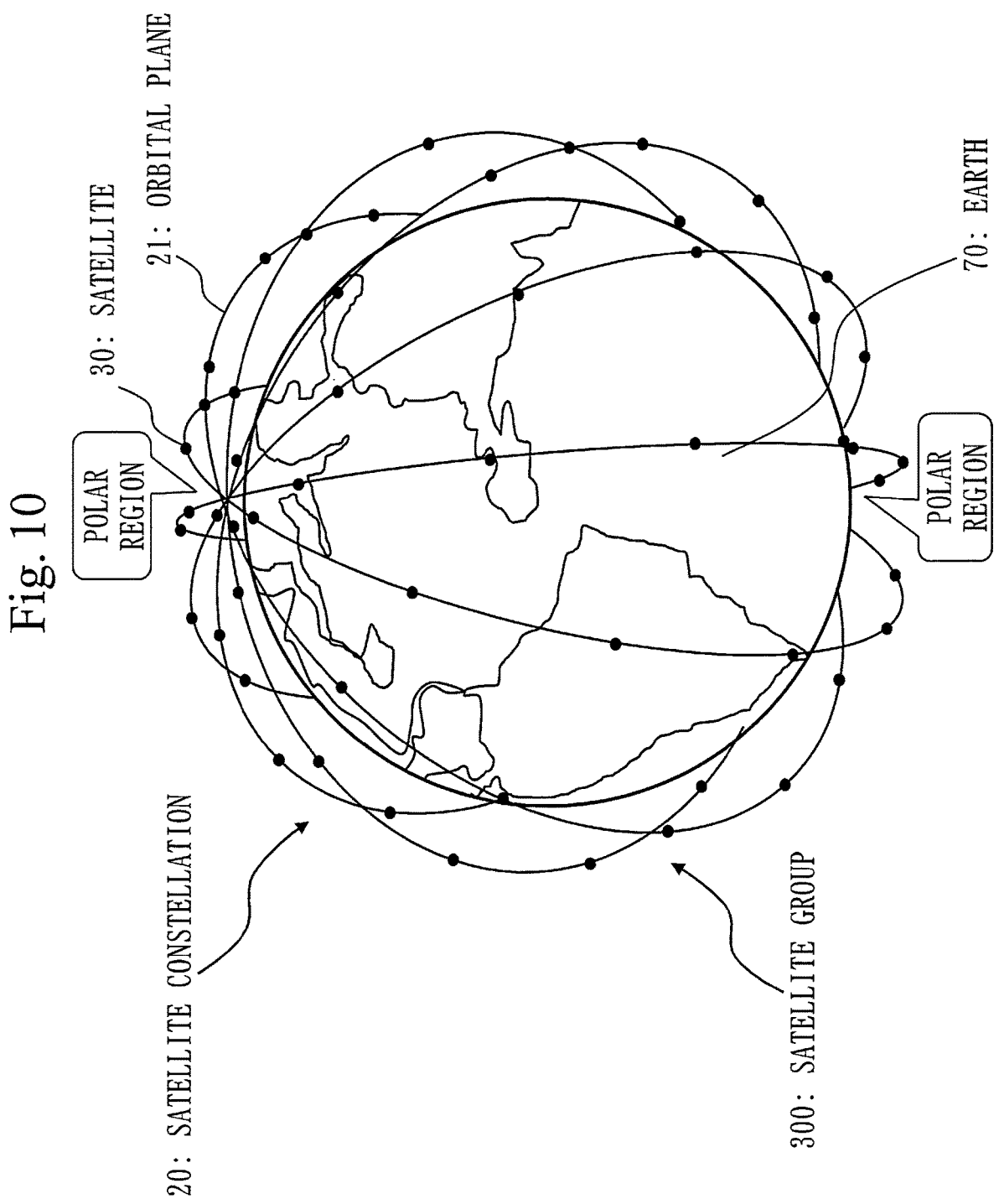
FIG. 10 is an example of a satellite constellation that is formed by the satellite constellation forming system according to Embodiment 1.
Figure 11:
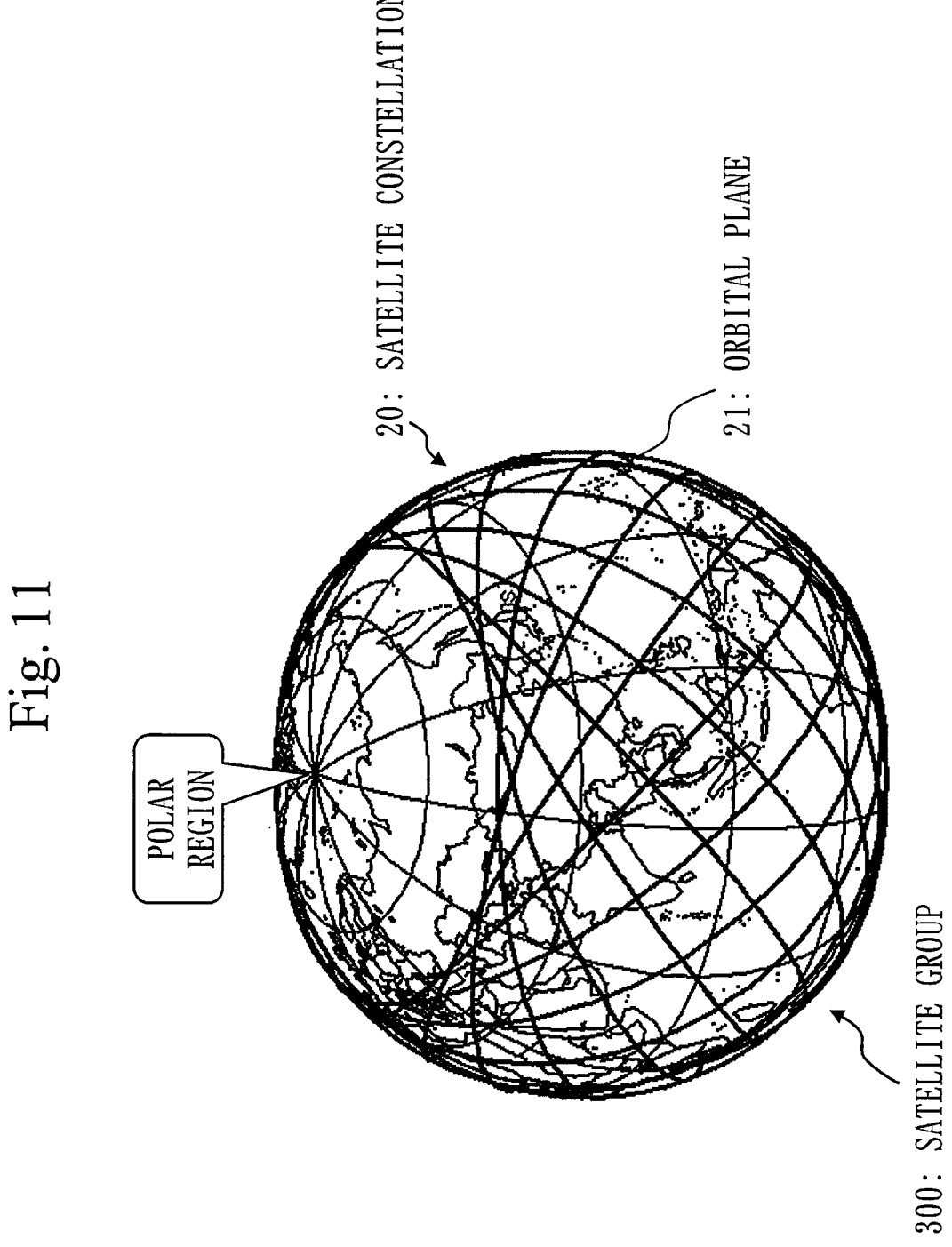
FIG. 11 is an example of a satellite constellation that is formed by the satellite constellation forming system according to Embodiment 1.

FIG. 10 is a diagram illustrating an example of the satellite constellation 20 formed by the satellite constellation forming system 100 according to this embodiment. FIG. 11 is a diagram illustrating an example of the satellite constellation 20 formed by the satellite constellation forming system 100 according to this embodiment.

In the satellite constellation 20 illustrated in FIG. 10, the orbital inclination of each of a plurality of orbital planes 21 is about 90 degrees, and the orbital planes 21 exist on mutually different planes.

In the satellite constellation 20 illustrated in FIG. 11, the orbital inclination of each of a plurality of orbital planes 21 is not about 90 degrees, and the orbital planes 21 exist on mutually different planes.

In the satellite constellation 20 according to this embodiment, the orbital altitudes of the orbital planes 21 are mutually different. Furthermore, in the satellite constellation 20 according to this embodiment, relative altitude differences between adjacent orbital planes in the plurality of orbital planes are sequentially arranged to be sinusoidal. In the satellite constellation 20, each of the orbital planes 21 has an orbital inclination such that the orbital periods of the orbital planes 21 are equal to each other.

In the satellite constellation 20 of FIG. 10, any given two orbital planes intersect at a point in the vicinity of the polar region. In the satellite constellation 20 of FIG. 11, any given two orbital planes intersect at a point not in the polar region. As illustrated in FIG. 11, the intersections of the orbital planes each with an orbital inclination greater than 90 degrees move away from the polar region according to the orbital inclination. Depending on the combinations of orbital planes, orbital planes may intersect at various locations including the vicinity of the equator. For this reason, places where collisions may occur are diversified.

In this embodiment, the satellite constellation forming unit 110 forms a satellite constellation 20 in which relative altitude differences between adjacent orbital planes in a plurality of orbital planes are arranged to be sinusoidal.

Figure 12:
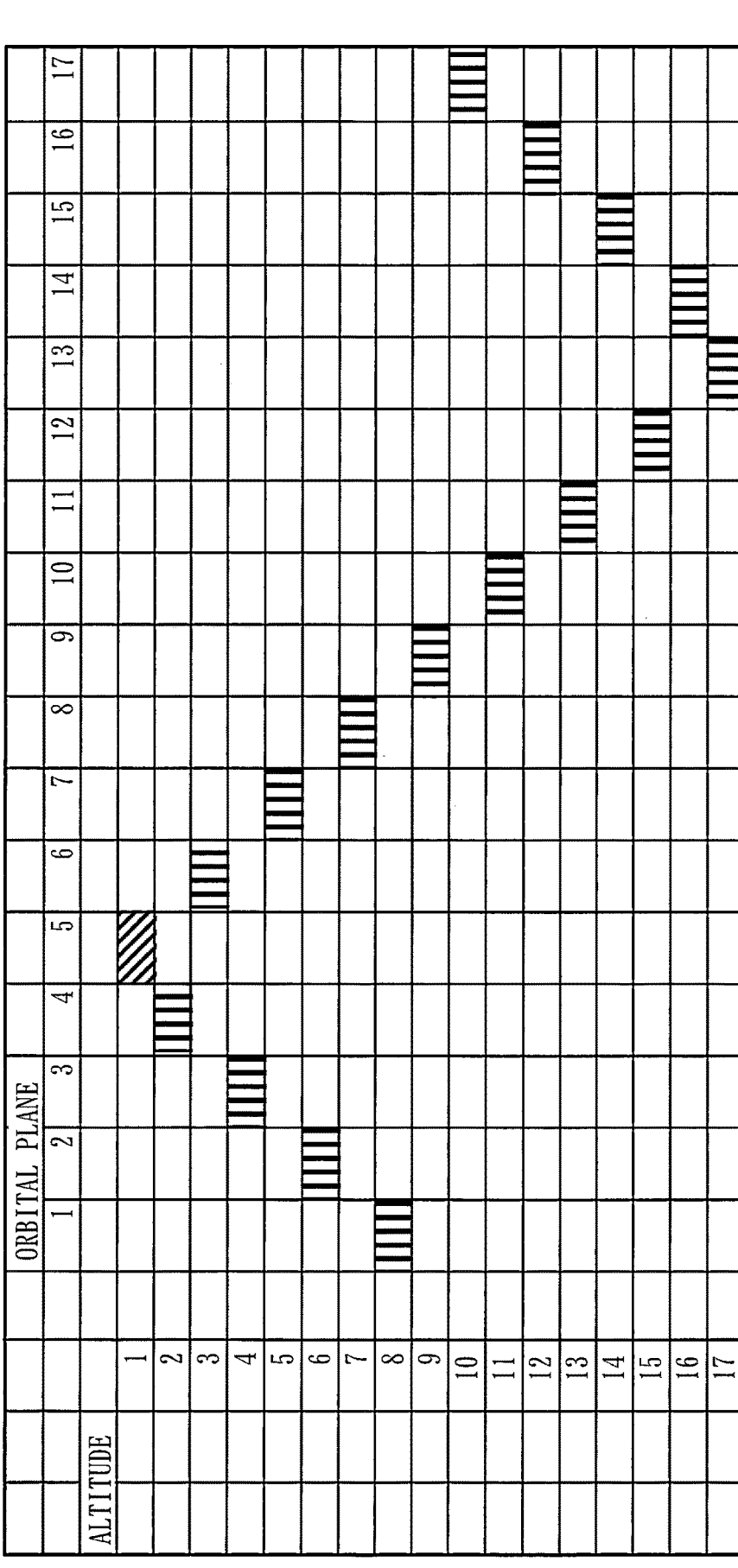
FIG. 12 is a diagram representing an example of relative altitude differences of a plurality of orbital planes according to Embodiment 1.

FIG. 12 is a diagram illustrating an example of relative altitude differences in a plurality of orbital planes according to this embodiment.

FIG. 12 illustrates relative altitude differences in orbital planes in a satellite constellation 20 having 17 orbital planes. The vertical axis indicates that the altitude of orbital plane 1 is highest, and the altitude becomes lower in descending order, and does not indicate the distance. FIG. 12 indicates that when orbital plane 1 is used as a reference plane and differences between adjacent planes are plotted, such as a difference in orbital altitude between orbital plane 1 and orbital plane 2 and a difference in orbital altitude between orbital plane 2 and orbital plane 3, this results in a sinusoidal arrangement.

If the altitudes of adjacent orbital planes are significantly different, the distance of handover by inter-satellite communication will be long and the drive angle range for mutually matching communication antennas will be wide, which are disadvantages. In contrast to this, in the satellite constellation 20 according to this embodiment, the altitude differences between adjacent orbits are constrained, so that the relative differences change gradually. Therefore, handover that contributes to mission cooperation with a nearby satellite is facilitated.

In an Earth observation satellite, the image quality of an optical sensor depends on the satellite altitude. Thus, by arranging the altitude difference between adjacent orbits to be small, there is an effect that high-quality images with no inconsistency between image scenes can be obtained.

With a satellite constellation equipped with optical sensors that capture images of the ground surface and are capable of imaging in an area wider than the distance between adjacent orbits above the equator, images of the entire globe can be captured exhaustively. Since the resolution and observation width of an optical sensor depend on the orbital altitude, in the case of a satellite constellation employing optical sensors of the same specifications, the resolution is highest and the observation width is smallest when images are captured under the lowest orbital altitude condition. Therefore, if the observation width of an optical sensor under the lowest orbital altitude condition is greater than the distance between adjacent orbits above the equator, images of the ground surface can be captured exhaustively, including above the equator.

If the altitudes of adjacent orbits are significantly different, discontinuities involving different resolutions are likely to appear at joints of images. However, in the satellite constellation forming system according to this embodiment, the altitude differences between adjacent orbits are constrained, so that there is an effect that image data of the entire globe with good image quality without noticeable joints of images can be obtained. Also note that the greater the difference in satellite altitude, the faster the relative movement speeds of the ground service ranges. Thus, in the satellite constellation forming system according to this embodiment, the relative movement amounts of adjacent service areas can be minimized, so that there is an effect that the transfer of data to a following satellite, called handover, in communication is facilitated and errors can be readily reduced.

Figure 13:
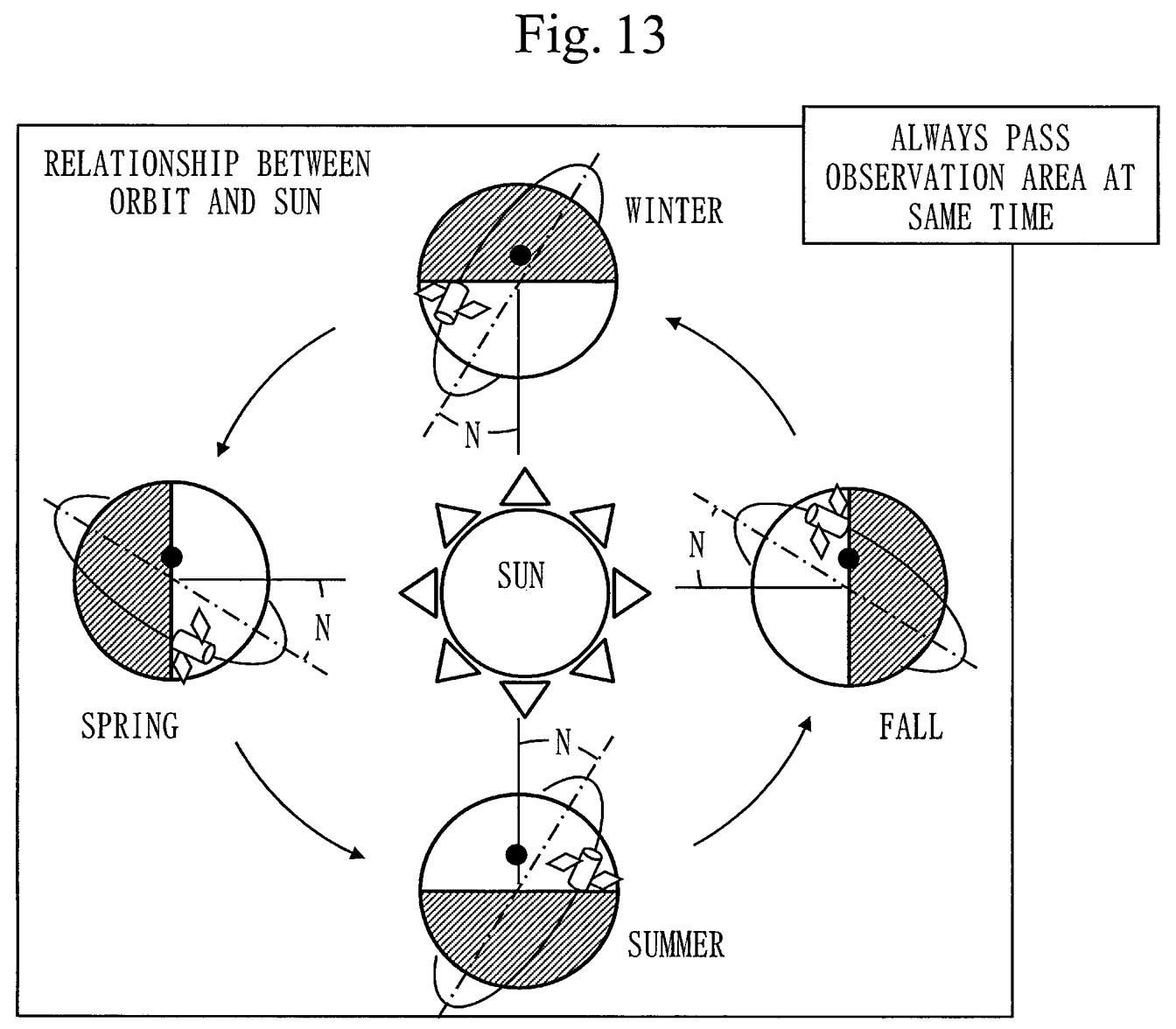

FIG. 13 is a diagram illustrating an orbital plane that satisfies conditions for a sun-synchronous orbit.

The satellite constellation forming unit 110 according to this embodiment forms a satellite constellation 20 in which the orbital altitudes of a plurality of orbital planes 21 are mutually different, and each of the orbital planes has an orbital inclination such that the orbital periods of the orbital planes 21 are equal to each other. Specifically, each of the orbital planes is a sun-synchronous orbit as illustrated in FIG. 13.

The satellite constellation forming system 100 sets parameters so that the orbital altitudes of the orbital planes 21 of the satellite constellation 20 are mutually different, and each orbital plane has an orbital inclination such that the orbital periods of the orbital planes 21 are equal to each other.

Then, using the parameters, the satellite constellation forming unit 110 forms the satellite constellation 20 in which the orbital altitudes of the orbital planes 21 are mutually different, and each orbital plane has an orbital inclination such that the orbital periods of the orbital planes 21 are equal to each other.

Figure 14:
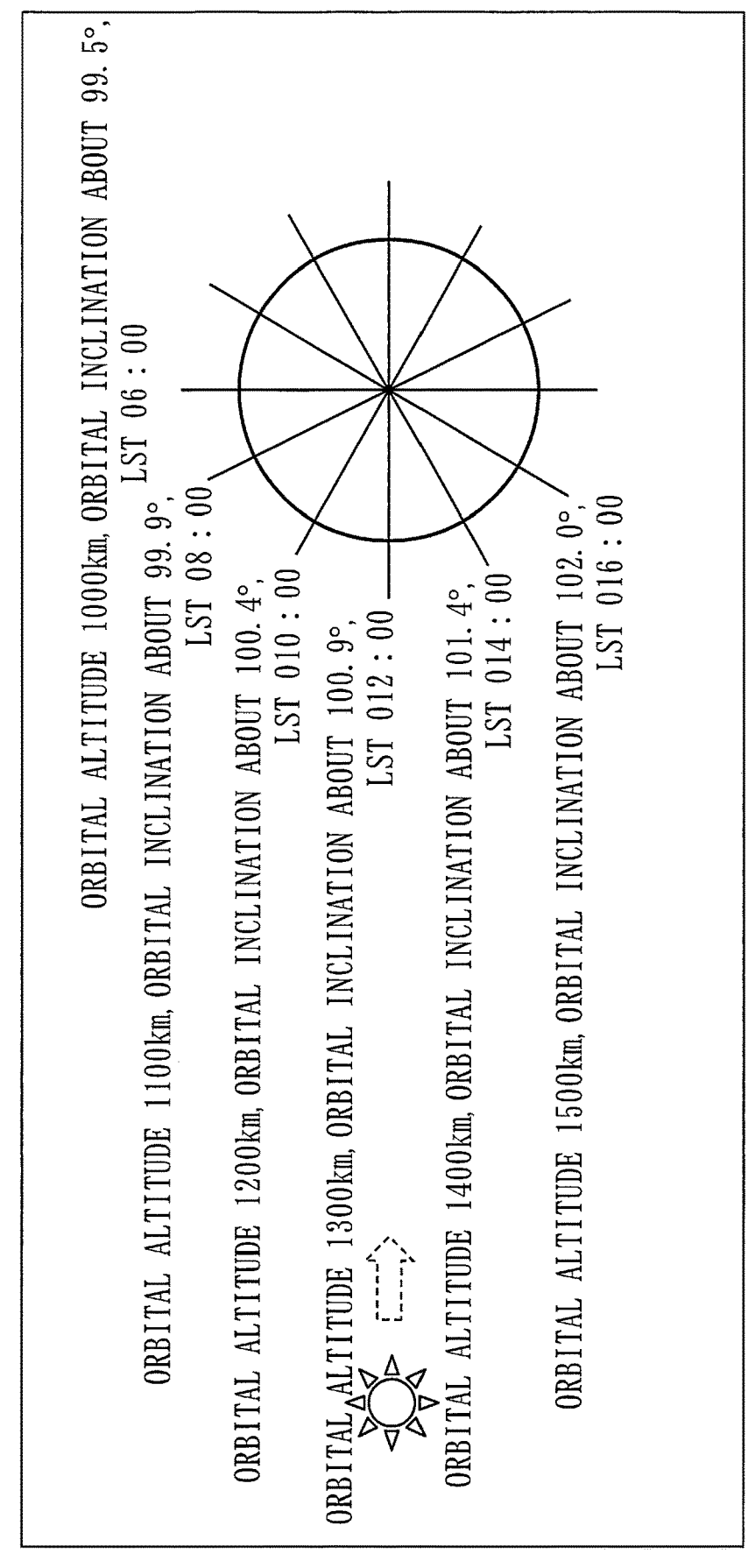
FIG. 14 is a schematic diagram illustrating a specific example of a satellite constellation according to Embodiment 1.

FIG. 14 is a schematic diagram illustrating a specific example of the satellite constellation 20 according to this embodiment.

Sun-synchronous orbital planes have equal orbital periods even when their orbital altitudes are different. An example of orbital planes that have different orbital altitudes and are sun-synchronous orbits is indicated below. The constraints for sun-synchronization are generally determined by the correlation between the orbital altitude and the orbital inclination, so that a sun-synchronous orbit can be formed by appropriately setting the orbital inclination depending on the orbital altitude.

Orbital altitude 1000 km: orbital inclination about 99.5°
Orbital altitude 1100 km: orbital inclination about 99.9°
Orbital altitude 1200 km: orbital inclination about 100.4°
Orbital altitude 1300 km: orbital inclination about 100.9°
Orbital altitude 1400 km: orbital inclination about 101.4°
Orbital altitude 1500 km: orbital inclination about 102.0°

For example, by setting orbital planes of the above six types of orbital altitudes with LSTs as indicated below, a group of orbital planes having angles mutually different by approximately 30 degrees each in the latitude direction is formed, and the relative angles between the orbital planes are always maintained. That is, six orbital planes whose orbital periods are equal are formed.

Sun-synchronous orbital plane at orbital altitude 1000 km: LST 06:00

Sun-synchronous orbital plane at orbital altitude 1100 km: LST 08:00

Sun-synchronous orbital plane at orbital altitude 1200 km: LST 10:00

Sun-synchronous orbital plane at orbital altitude 1300 km: LST 12:00

Sun-synchronous orbital plane at orbital altitude 1400 km: LST 14:00

Sun-synchronous orbital plane at orbital altitude 1500 km: LST 16:00

Sun-synchronous orbits are presented here as a typical example of achieving equal orbital periods. However, a plurality of orbital altitudes with equal orbital periods can also be similarly selected from orbits that are not sun-synchronous. That is, the satellite constellation forming unit 110 forms a satellite constellation 20 in which the orbital altitudes of a plurality of orbital planes 21 are mutually different, and each orbital plane has an orbital inclination such that the revolutions of the orbital planes 21 are in synchronization with each other.

In FIG. 14, for ease of description, an example in which the orbital altitudes are 1000 km, 1100 km, 1200 km, 1300 km, 1400 km, and 1500 km has been described. However, in this embodiment, it is assumed that in the satellite constellation 20 including the orbital planes having these orbital altitudes, relative altitude differences between adjacent orbital planes are sequentially arranged to be sinusoidal.

*Description of Operation*

Figure 15:
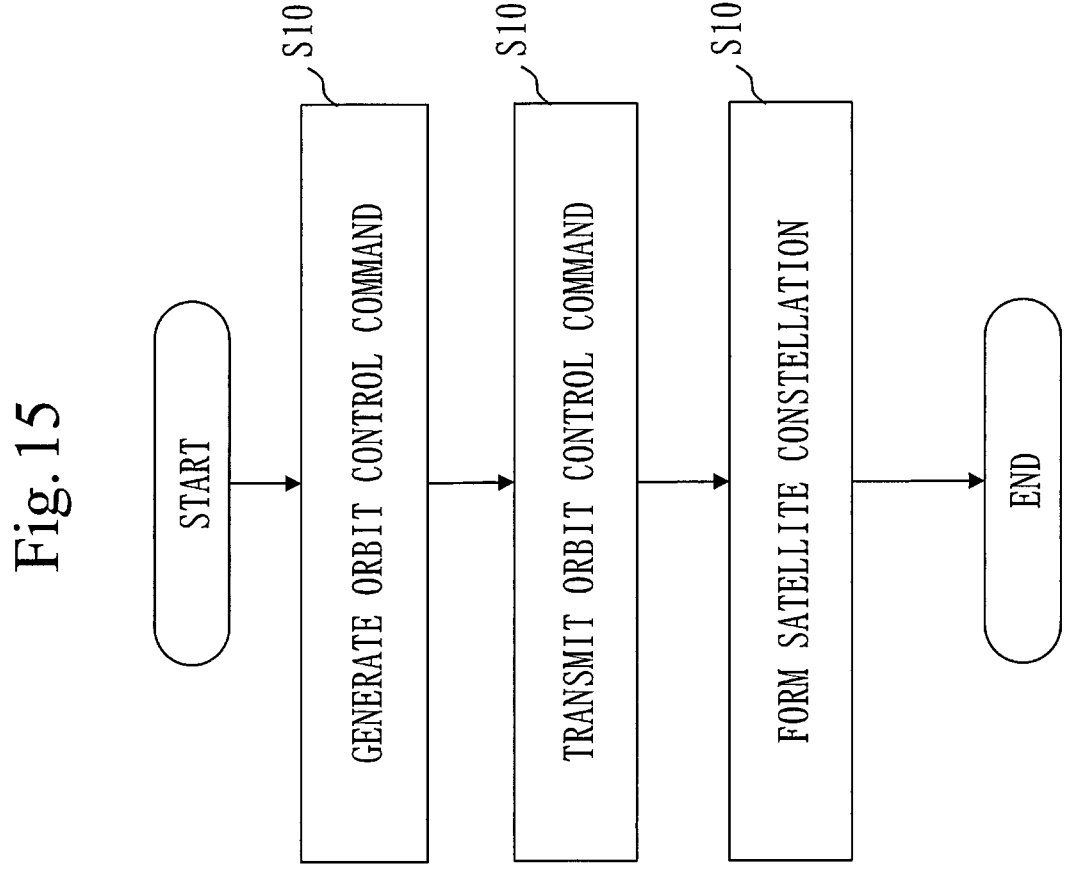
FIG. 15 is a flowchart illustrating operation of the satellite constellation forming system according to Embodiment 1.

Referring to FIG. 15, operation of the satellite constellation forming system 100 according to this embodiment will be described. A procedure for the operation of the satellite constellation forming system 100 is equivalent to a satellite constellation forming method. A program that realizes the operation of the satellite constellation forming system 100 is equivalent to a satellite constellation forming program.

In step S101, the satellite constellation forming unit 110 generates parameters for forming a satellite constellation 20. In the satellite constellation 20, the orbital altitudes of orbital planes 21 are mutually different, and relative altitude differences between adjacent orbital planes in a plurality of orbital planes are sequentially arranged to be sinusoidal. The satellite constellation forming unit 110 generates parameters for causing the orbital altitude of each orbital plane 21 of the plurality of orbital planes to be changed sequentially while maintaining a sinusoidal arrangement of the relative altitude differences between adjacent orbital planes in the plurality of orbital planes. Specifically, the satellite constellation forming unit 110 sets orbital altitudes, the number of which is larger by one than the number of orbital planes of the plurality of orbital planes. The satellite constellation forming unit 110 sequentially changes the orbital altitude of each of the orbital planes 21 by changing the orbital altitude of each of the orbital planes 21 so that an unoccupied orbital altitude, at which no satellite is flying, is filled sequentially.

More specifically, the orbit control command generation unit 510 of the ground facility 701 generates an orbit control command 51 to be transmitted to each satellite 30 in order to form the satellite constellation 20 described above. The orbit control command generation unit 510 generates the orbit control command 51 to set orbital altitudes, the number of which is a number larger by one than the number of orbital planes of the plurality of orbital planes, and to change the orbital altitude of each of the orbital planes 21 so that an unoccupied orbital altitude, at which no satellite is flying, is filled sequentially.

In step S102, the satellite constellation forming unit 110 delivers the parameters for forming the satellite constellation 20 to each satellite 30.

Specifically, the communication device 950 of the ground facility 701 transmits the orbit control command 51 generated in order to form the above-described satellite constellation 20 to each satellite 30.

In step S103, each satellite 30 controls the orbit and attitude in accordance with the parameters delivered from the satellite constellation forming unit 110. Specifically, the satellite communication device 32 of the satellite 30 receives the orbit control command 51 transmitted from the ground facility 701, and transmits it to the satellite control device 31. The satellite control device 31 of the satellite 30 controls the propulsion device 33 and the attitude control device 34 based on the orbit control command 51. Each satellite 30 controls the orbit in accordance with the orbit control command 51, thereby forming the satellite constellation 20.

By the above process, in the satellite constellation 20 according to this embodiment, each of the orbital planes 21 has an orbital inclination such that the orbital periods of the orbital planes 21 are equal to each other. That is, in the satellite constellation 20 according to this embodiment, orbital inclination of each of the orbital planes 21 is maintained on average as a result so that the orbital periods of the orbital planes 21 are equal to each other.

FIGS. 16 to 19 are diagrams illustrating changing of orbital altitudes of the orbital planes 21 according to this embodiment.

Referring to FIGS. 16 to 19, a scheme will be described, by which an orbital altitude 23 of each orbital plane 21 is sequentially changed while maintaining a sinusoidal arrangement of relative altitude differences between adjacent orbital planes in a plurality of orbital planes.

In the satellite constellation forming system 100, N+1 different altitudes are pre-planned for the number of orbital planes, N, (N is a natural number), and the orbital altitude of each orbital plane 21 is changed so that an unoccupied altitude is filled sequentially. In this case, the altitude of only one orbital plane is passed. However, since a risk of a collision exists only at the intersections of two orbital planes, it is easy to safely change the altitude by making sure that the timing is right.

FIGS. 16 to 19 are an example in which the number of orbital planes is N=16. Therefore, N+1 (=17) different orbital altitudes are set. Among the 17 altitudes, one altitude is an unoccupied slot. The altitudes are assigned sequentially to the orbital planes so that the altitude of the unoccupied slot and the other 16 altitudes are arranged to be sinusoidal. That is, in the satellite constellation 20, the relative altitude differences in the 17 altitudes are set to be sinusoidal.

Figure 16:
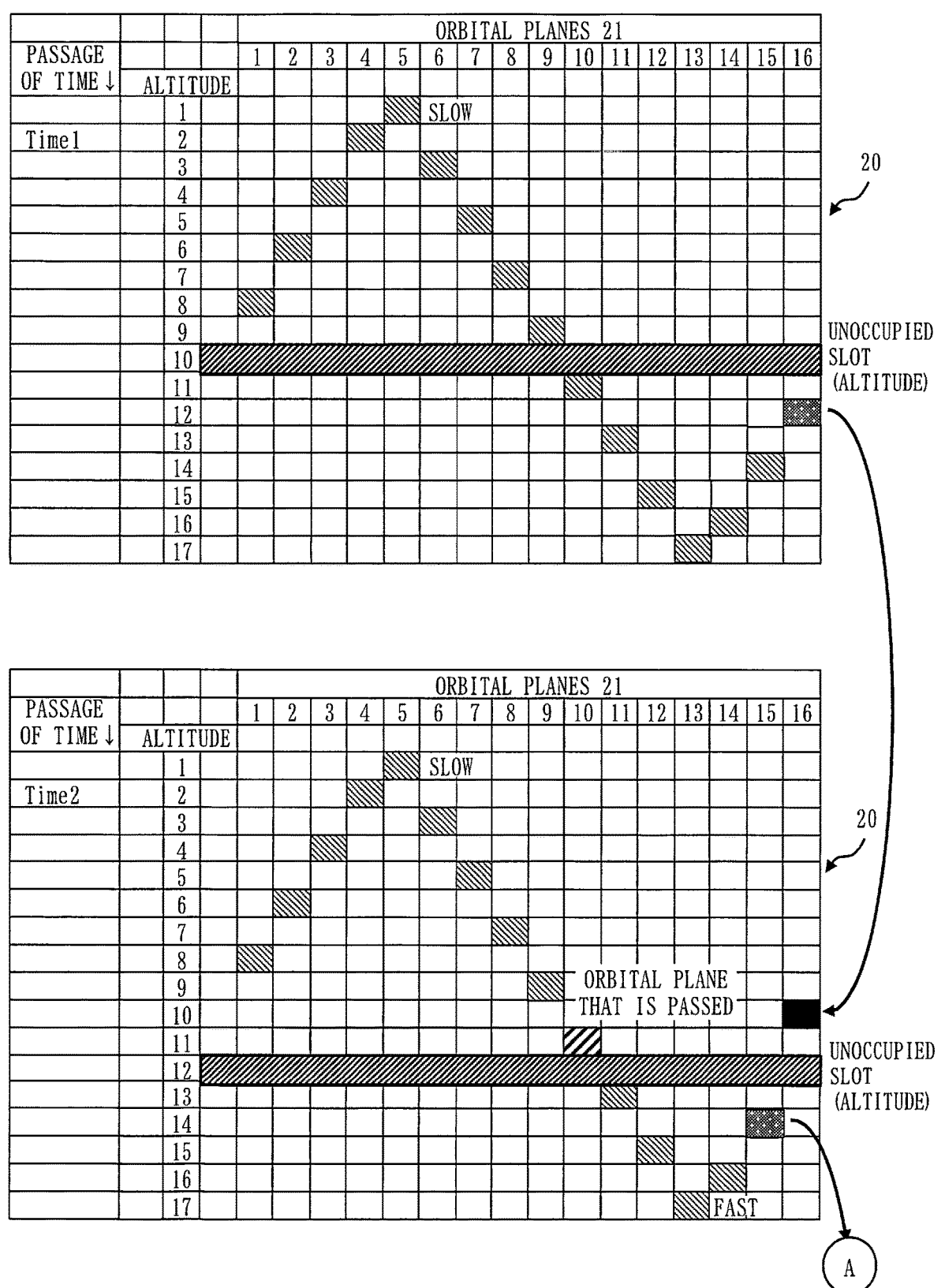
FIG. 16 is a diagram illustrating changing of orbital altitudes of orbital planes according to Embodiment 1.

In the upper table of FIG. 16, the unoccupied slot is altitude 10. The lower table of FIG. 16 indicates a state in which the satellites at altitude 12 have changed the satellite altitude to altitude 10, which has been the unoccupied slot. Then, altitude 12 becomes the unoccupied slot, and the satellites at altitude 14 will change the satellite altitude to altitude 12, which is the unoccupied slot.

Figure 17:
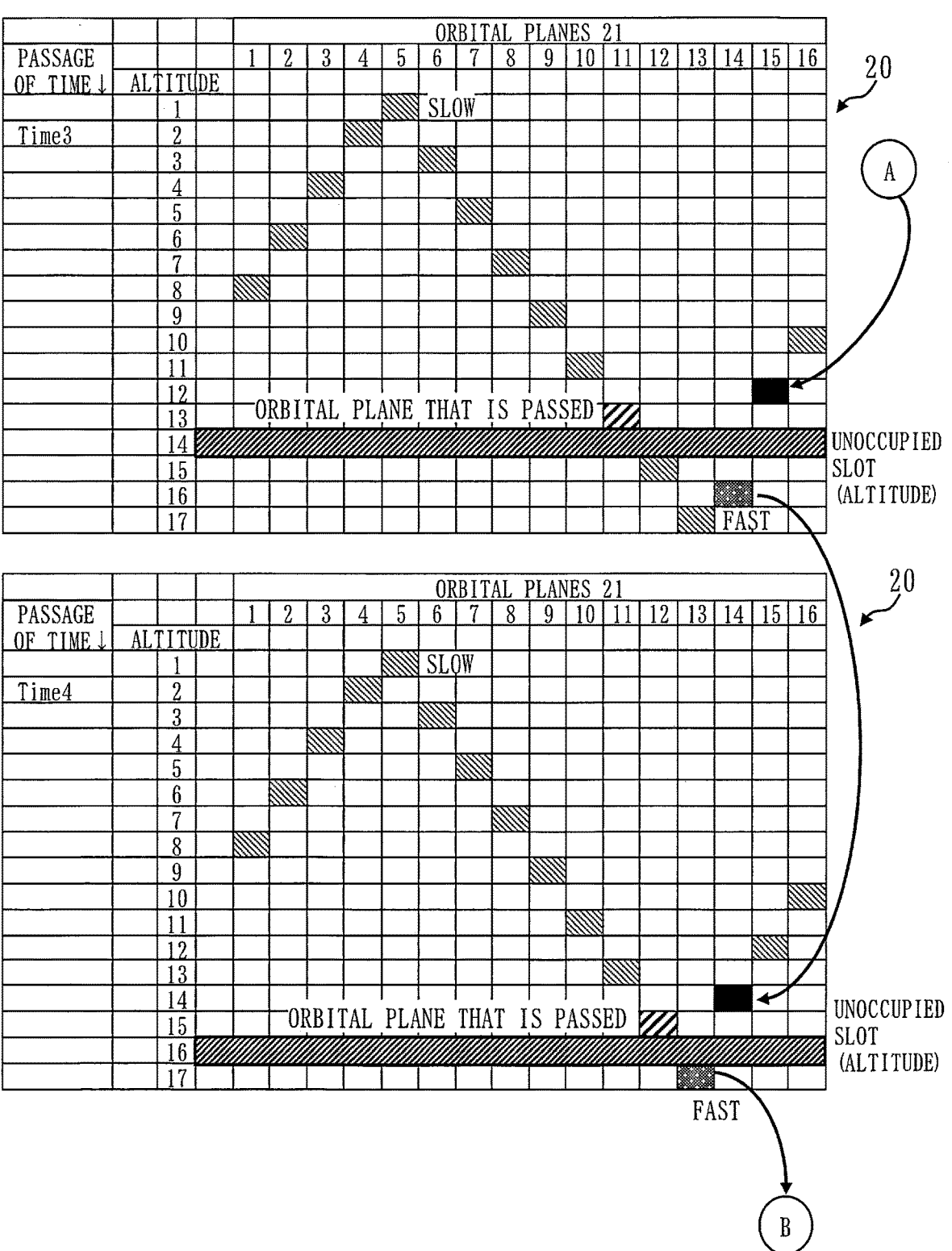
FIG. 17 is a diagram illustrating changing of orbital altitudes of orbital planes according to Embodiment 1.

In the upper table of FIG. 17, the unoccupied slot is altitude 14. The lower table of FIG. 17 indicates a state in which the satellites at altitude 16 have changed the satellite altitude to altitude 14, which has been the unoccupied slot. Then, altitude 16 becomes the unoccupied slot, and the satellites at altitude 17 will change the satellite altitude to altitude 16, which is the unoccupied slot. In this case, no orbital plane is passed.

Figure 18:
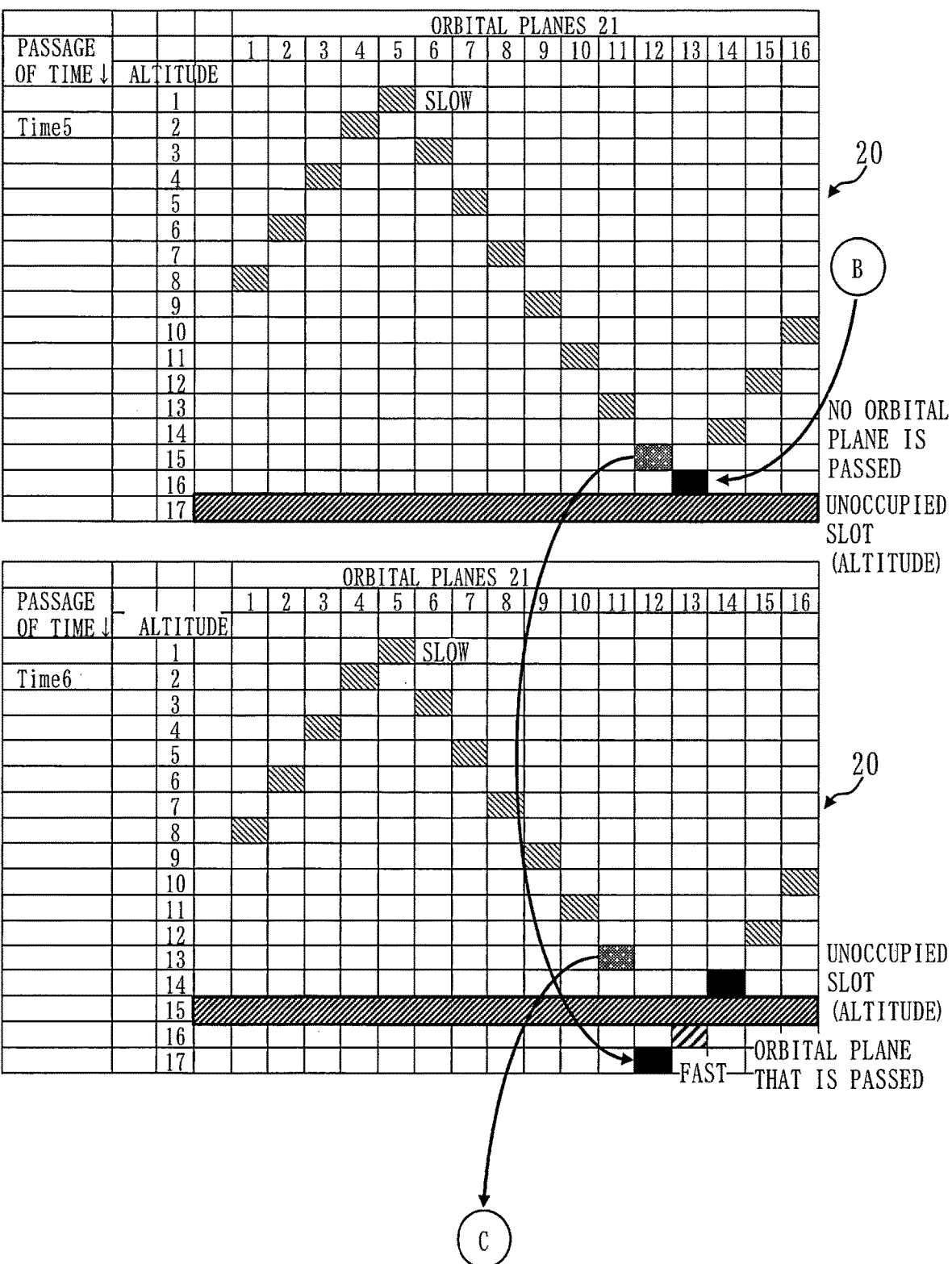
FIG. 18 is a diagram illustrating changing of orbital altitudes of orbital planes according to Embodiment 1.

In the upper table of FIG. 18, the unoccupied slot is altitude 17. The lower table of FIG. 18 indicates a state in which the satellites at altitude 15 have changed the satellite altitude to altitude 15, which has been the unoccupied slot. Then, altitude 15 becomes the unoccupied slot, and the satellites at altitude 13 will change the satellite altitude to altitude 15, which is the unoccupied slot.

In changing of altitudes, the satellites flying in an orbital plane at an altitude adjacent to the unoccupied slot move to the altitude of the unoccupied slot.

In this case, there is only one orbital plane whose orbital altitude is passed. However, the intersections between two orbital planes are limited to two points, so that it is easy to achieve an altitude change by making sure that the passage timings of satellites are right to avoid an accidental collision at these two intersections during the altitude change. The side that is going to change the orbital altitude performs a predictive analysis in advance so as to check that no collision will occur at the intersections if the orbital altitude is changed by acceleration or deceleration, and then changes the orbit. If a risk of a collision is predicted as a result of the predictive analysis, it is possible to make sure that the passage timings of satellites are right by adjusting the spacing between adjacent satellites in advance. Specific details of timing adjustment will be described later in Embodiments 2 to 4.

In a mega-constellation in which a large number of satellites fly in each orbital plane, the satellites in each orbital plane fly at approximately equal intervals. Thus, even if the altitudes of the large number of satellites are changed simultaneously, it is easy for all the satellites to pass an orbital altitude while avoiding collisions. As a matter of course, the altitude of each satellite may be changed sequentially one by one, and after the change of the altitude is completed, a minor adjustment may be made to the relative intervals among the satellites in the same orbital plane.

It is easy to continue exchanging of information between satellites while the altitude is being changed. Specifically, in the case of a communication service, the altitude can be changed without interrupting a communication mission.

A specific example of changing of altitudes sinusoidally in the satellite constellation forming system 100 according to this embodiment will now be described.

Since the satellite ground speed is faster as the orbital altitude is lower, the time until the satellites in the same orbital plane are shifted by one satellite is shorter as the orbital altitude is lower. Specifically, a satellite at an altitude of 550 km completes 15 orbits per day, and a satellite at an altitude of 880 km completes 14 orbits per day. At a rough estimate, a difference of 0.003 orbits per altitude difference of 1 km occurs per day. That is, 0.003 orbits=1 orbit/(880-550) km. This is converted into an angle as follows: 0.003×360=1.1 degrees/km.

When 50 satellites are operated in one orbital plane, the angle formed by two consecutive satellites is 360/50=7.2 degrees, and a positional shift of one satellite occurs in about 6.6 (=7.2/1.1) days. For example, if the satellites can be operated with an altitude difference of 100 m between adjacent altitudes, a positional shift of one satellite occurs in about 66 days. Therefore, if the altitudes are changed sinusoidally over a period of about 4 mouths, a positional shift between adjacent orbits due to a difference in satellite ground speed will cancel out, and the satellites can be operated permanently.

If it is decided to change the altitudes sinusoidally over a period of about 2 months, taking into consideration also other factors such as a time lag, it is sufficient that the orbital altitudes are changed once every two days in the satellite constellation forming system 100 involving about 30 orbital planes. If the altitude of one plane is to be changed at a time, the altitudes may be changed one by one every 1.5 hours on average.

The altitude of the satellite 30 is changed such that operating the propulsion device 33 for acceleration raises the altitude and operating it for deceleration lowers the altitude. However, in reality, it is difficult to realize an altitude change of 100 m in 1.5 hours. Therefore, the timing to start an altitude change arrives every 1.5 hours, and the change to a predetermined orbit will be completed with a delay. However, the ground speeds of satellites flying in altitudes that are close to each another are almost the same, so that satellites flying out of phase in two orbital planes so as to avoid a collision at the intersections will not collide.

*Description of Effects of this Embodiment*

There may be a case in which for the purpose of providing a service by a plurality of satellites in cooperation, each satellite exchanges information with a satellite in an adjacent orbit. In orbital planes with mutually different orbital altitudes, satellites have different ground speeds, and the ground speed is faster as the orbital altitude is lower, making it difficult to exchange information between adjacent orbits with passage of time. Each satellite can be operated such that a partner for exchanging information is switched to a following satellite in the adjacent orbit. However, in order to avoid a loss of information during this switching, each satellite needs to stop exchanging information during the switching and resume exchanging information after the switching to the following satellite. Therefore, in a mega-constellation in which a large number of satellites require the switching, the suspension of a service has a great impact.

The switching also involves the trouble of establishing an information transmission environment for exchanging information with the following satellite. Specifically, in the case of inter-satellite optical communication, information cannot be transmitted until the directivity directions of transmission devices installed in both satellites are matched with extremely high directivity accuracy.

In a satellite constellation according to this embodiment, relative altitude differences between adjacent orbital planes in a plurality of orbital planes are sequentially arranged to be sinusoidal, and the satellite altitude of each orbital plane is sequentially changed sinusoidally with passage of time. Therefore, with the satellite constellation according to this embodiment, a service can be continued while avoiding a collision, without interrupting exchanging of information between orbits at different altitudes.

In the satellite constellation forming system according to this embodiment, different orbital planes have different orbital altitudes, so that there is no risk of a collision in a regular operation state. The altitudes are changed while maintaining a sinusoidal arrangement by making a minor adjustment to the orbital inclinations, so that there is no risk of occurrence of a shift in relative angles between orbital planes due to a difference in altitude. Even if an error occurs in a transient state, a minor adjustment can be easily made.

When information is exchanged between satellites in adjacent orbits, the positions relative to each other move due to a difference in satellite ground speed caused by a difference in orbital altitude. However, in the satellite constellation forming system according to this embodiment, by setting the orbital altitudes sinusoidally to minimize a difference between adjacent orbits, the amount of a shift is small and the time until a shift occurs is sufficiently long.

Since the relative orbital altitudes are changed sinusoidally, even if a shift widens at one time, the relative relationship will eventually change to reduce the shift, so that the shift will cancel out in the long term. Therefore, with the satellite constellation forming system according to this embodiment, it is not necessary to switch the satellites between which information is to be exchanged, so that a service can be continued permanently.

A shift occurs at a slower pace as a difference in satellite altitude is smaller. Thus, in the satellite constellation according to this embodiment, by setting the relative altitude differences to be small, the frequency of changing the altitudes can be reduced.

In the satellite constellation forming system according to this embodiment, the altitude of one orbital plane at most may be passed in changing of altitudes. However, the intersections points between two orbital planes are limited to two points, so that it is easy to make sure that the altitude is changed at the right timing so that no collision will accidentally occur at these two points. Thus, there is an effect that the altitudes can be changed safely while avoiding a collision.

*Other Configurations*

In this embodiment, the functions of the satellite constellation forming unit 110 are realized by software. As a variation, the functions of the satellite constellation forming unit 110 may be realized by hardware.

The satellite constellation forming system 100 includes an electronic circuit in place of the processor 910.

The electronic circuit is a dedicated electronic circuit that realizes the functions of the satellite constellation forming unit 110.

Specifically, the electronic circuit is a single circuit, a composite circuit, a programmed processor, a parallel-programmed processor, a logic IC, a GA, an ASIC, or an FPGA. GA is an abbreviation for Gate Array.

The functions of the satellite constellation forming unit 110 may be realized by one electronic circuit, or may be distributed among and realized by a plurality of electronic circuits.

As another variation, some of the functions of the satellite constellation forming unit 110 may be realized by the electronic circuit, and the rest of the functions may be realized by software.

Each of the processor and the electronic circuit is referred to also as processing circuitry. That is, in the satellite constellation forming system 100, the functions of the satellite constellation forming unit 110 are realized by the processing circuitry.

Embodiment 2

In this embodiment, additions to Embodiment 1 will be mainly described. Components that are substantially the same as those in Embodiment 1 are denoted by the same reference signs, and description thereof may be omitted.

*Description of Configurations*

In this embodiment, a scheme by which the satellite constellation forming system 100 changes the orbital altitudes of orbital planes 21 while avoiding a collision will be described.

The configurations of the satellite constellation forming system 100, the satellite constellation 20, the ground facility 701, and the satellite 30 are substantially the same as those in Embodiment 1.

*Description of Operation*

A procedure for operation of the satellite constellation forming system 100 is equivalent to a satellite constellation forming method. A program that realizes the operation of the satellite constellation forming system 100 is equivalent to a satellite constellation forming program.

The satellite constellation 20 according to this embodiment includes two orbital planes 21 each having a different normal direction and in each of which the same number of satellites are flying. A point in the neighborhood of the intersection between the two orbital planes in each of the two orbital planes 21 will be referred to as an intersection neighborhood point Pc. The intersection neighborhood point Pc between the two orbital planes is a point in the neighborhood of a point at which the two orbital planes intersect with each other.

The satellite constellation forming unit 110 forms the satellite constellation 20 in which satellite passage timings of satellites 30 flying in the two orbital planes 21 do not coincide with each other at the intersection neighborhood point Pc in each of the two orbital planes 21. From this state in which the satellite passage timings do not coincide with each other, the satellite constellation forming unit 110 gradually changes the orbital altitude of at least one of the two orbital planes 21 while maintaining the state in which the satellite passage timings do not coincide with each other.

Specifically, the orbit control command generation unit 510 of the ground facility 701 generates an orbit control command 51 to form the satellite constellation 20 in which the satellite passage timings of the satellites 30 flying in the two orbital planes 21 do not coincide with each other at the intersection neighborhood point Pc of each of the two orbital planes 21. The orbit control command generation unit 510 generates the orbit control command 51 to gradually change the orbital altitude of at least one of the two orbital planes 21 from the state in which the satellite passage timings do not coincide with each other, while maintaining the state in which the satellite passage timings do not coincide with each other. The communication device 950 of the ground facility 701 transmits the orbit control command 51 to each satellite 30.

Figure 20:
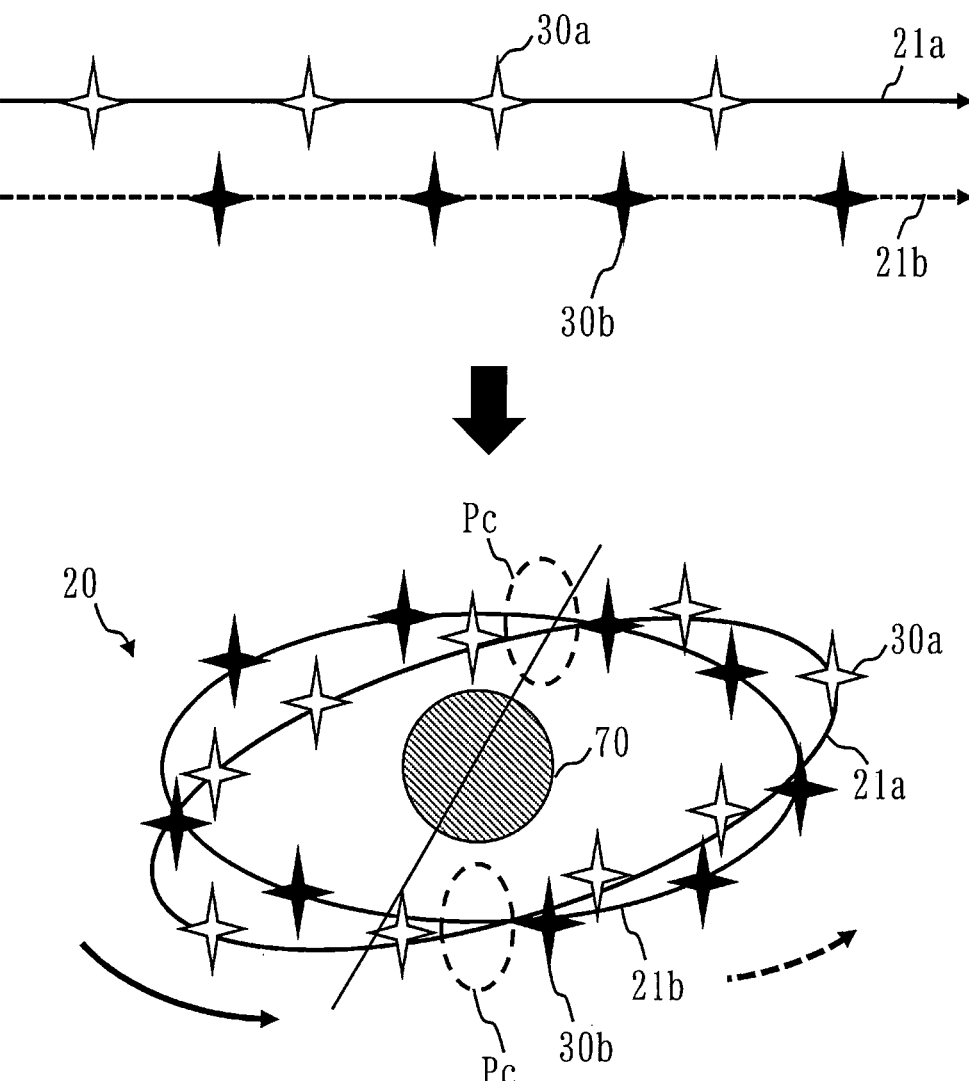
FIG. 20 is a diagram illustrating an example of a satellite constellation forming method according to Embodiment 2.

FIG. 20 is a diagram illustrating an example of the satellite constellation forming scheme according to this embodiment.

FIG. 20 indicates a state in which the orbital altitudes of two orbital planes 21a and 21b are mutually different and the satellite passage timings of satellites 30a and 30b do not coincide with each other at the intersection neighborhood point Pc in each of the orbital planes 21a and 21b. The satellite constellation forming unit 110 gradually matches the orbital altitudes of the two orbital planes 21a and 21b while maintaining the state in which the satellite passage timings do not coincide with each other.

If satellites are made to fly at the same altitude in orbital planes with different normal angles, there is a risk of a collision at an intersection. If an additional satellite is to be launched into orbit after a large number of satellites are placed in their respective orbital planes, the risk of a collision is high.

Therefore, in this embodiment, the same number of satellites are first made to fly in formation at approximately equal intervals in each group, and then the orbital altitudes are gradually brought closer to each other. By gradually bringing the orbital altitudes closer to each other, the satellite groups at altitudes close to each other have approximately equal ground speeds. Therefore, the satellite groups that are already flying in formation out of phase with each other can change the orbital altitudes without a collision.

The satellite constellation forming unit 110 causes the orbital altitude of one orbital plane of the two orbital planes to pass the orbital altitude of the other orbital plane from a state in which satellite passage timings do not coincide with each other at the intersection neighborhood point Pc in each of the orbital planes, while maintaining the state in which the satellite passage timings do not coincide with each other. The satellite constellation forming unit 110 causes the satellites in one of the orbital planes to pass the orbital altitude of the other one of the orbital planes in a space between the intersection neighborhood point Pc and the next intersection neighborhood point Pc in each of the orbital planes 21.

Figure 21:
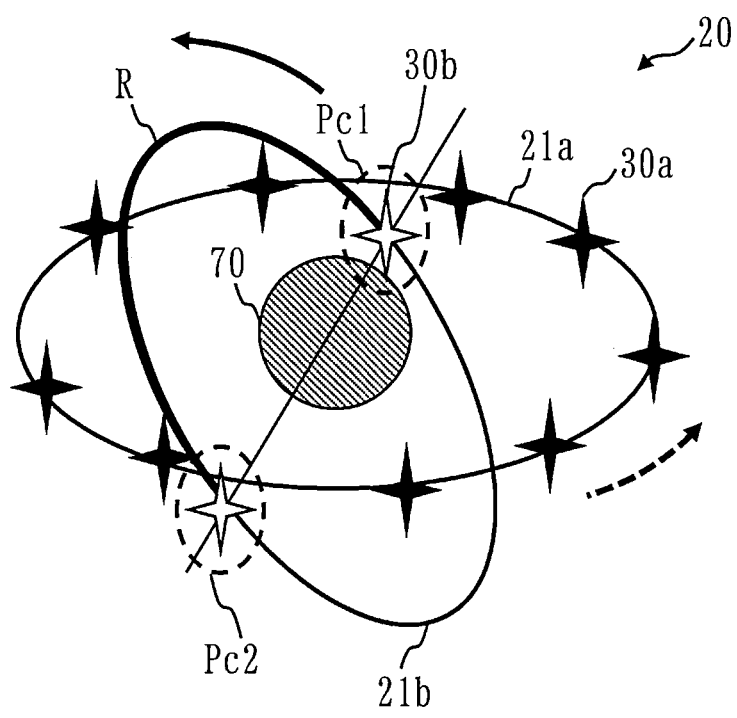
FIG. 21 is a diagram illustrating passing of an adjacent orbital plane by a satellite according to Embodiment 2.

FIG. 21 is a diagram illustrating passing of an adjacent orbital plane by the satellite 30$b$ according to this embodiment.

FIG. 21 illustrates a state in which the satellite 30$b$ in the orbital plane 21$b$ passes the orbital plane 21$a$. The satellite 30$b$ in the orbital plane 21$b$ passes the orbital plane 21$a$ in a space R between an intersection neighborhood point Pc1 and a next intersection neighborhood point Pc2.

When passing of a satellite altitude is changed in a plurality of orbital planes with different normal angles, there is a risk of a collision at two intersection neighborhood points in each of two orbital planes. Since there is no risk of a collision except at these two points, if the orbital altitude is passed after passage of one intersection neighborhood point and before the next intersection neighborhood point, the orbital altitude can be changed without a collision.

*Description of Effects of this Embodiment*

The satellite constellation forming method of the satellite constellation forming system according to this embodiment forms a satellite constellation which has a plurality of orbital planes in which a satellite group of a large number of satellites is flying, and in which the same number of satellites are placed in each of the orbital planes with mutually different normal angles and the same altitude. In the satellite constellation forming method, the satellite groups in the orbital planes having a relative angle with respect to each other are first formed with different orbital altitudes, and then the satellite altitudes are gradually matched while maintaining a state in which satellite passage timings do not coincide with each other at two intersection neighborhood points in each of the two orbital planes. Therefore, with the satellite constellation forming method according to this embodiment, there is an effect that satellite groups flying at the same orbital altitude in a plurality of orbital planes can be formed without a risk of a collision.

The satellite constellation forming method of the satellite constellation forming system according to this embodiment forms a satellite constellation having a plurality of orbital planes in which a group of a large number of satellites is flying, and the same number of satellites are placed in each of the orbital planes with mutually different normal angles and different altitudes. In the satellite constellation forming method, satellite groups in the orbital planes having a relative angle with respect to each other are first formed with different orbital altitudes, and then while maintaining a state in which satellite passage timings do not coincide with each other at two intersections between two orbital planes, the satellite altitude of one orbital plane is gradually passed by the satellites in the other orbital plane. Therefore, with the satellite constellation forming method according to this embodiment, there is an effect that a risk of a collision can be avoided in an intermediate stage of forming a satellite constellation with different orbital altitudes. With the satellite constellation forming method according to this embodiment, there is also an effect that orbital altitudes can be changed while continuing a service provided by a plurality of satellites in cooperation.

*Other Configurations*

<Deorbit Method>

A deorbit method in which one satellite deorbits in a satellite constellation according this embodiment will be described. The satellite constellation forming system 100 according to this embodiment uses the satellite constellation forming method according to this embodiment so as to control a deorbiting satellite so that the deorbiting satellite falls to the ground by passing a satellite flying at the orbital altitude of an adjacent orbital plane. Therefore, with the deorbit method by the satellite constellation forming system according to this embodiment, there is an effect that a satellite can be deorbited without fail while avoiding a collision.

<Debris Retrieval Method>

A debris retrieval method will be described, by which in a satellite constellation according to this embodiment, a debris retrieval satellite captures a satellite that cannot deorbit independently with external capture means, and then falls to the ground by passing a satellite flying at the orbital altitude of an adjacent orbital plane. The satellite constellation forming system 100 according to this embodiment uses the satellite constellation forming method according to this embodiment so as to control a debris retrieval satellite, that has captured a satellite that cannot deorbit independently with external capture means, so that the debris retrieval satellite falls to the ground by passing a satellite flying at the orbital altitude of an adjacent orbital plane. Therefore, with the debris retrieval method by the satellite constellation forming system according to this embodiment, there is an effect that a debris retrieval satellite can be made to retrieve and remove debris without fail while avoiding a collision.

Embodiment 3

In this embodiment, additions to Embodiments 1 and 2 will be mainly described. Components that are substantially the same as those in Embodiments 1 and 2 are denoted by the same reference signs, and description thereof may be omitted.

*Description of Configurations*

In this embodiment, a specific scheme by which the satellite constellation forming system 100 changes the orbital altitudes of orbital planes 21 while avoiding a collision will be described.

The configurations of the satellite constellation forming system 100, the satellite constellation 20, the ground facility 701, and the satellite 30 are substantially the same as those in Embodiment 1.

Figure 22:
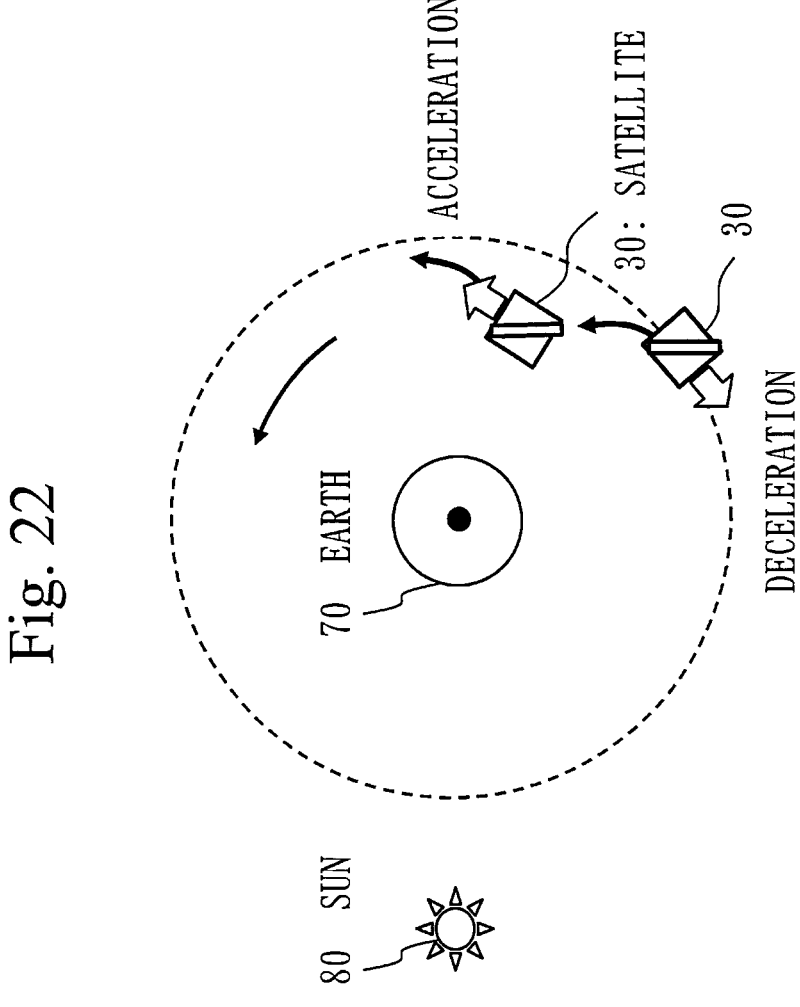
FIG. 22 is a diagram describing adjustment of satellite altitudes according to Embodiment 3.

FIG. 22 is a diagram describing adjustment of satellite altitudes.

Figure 23:
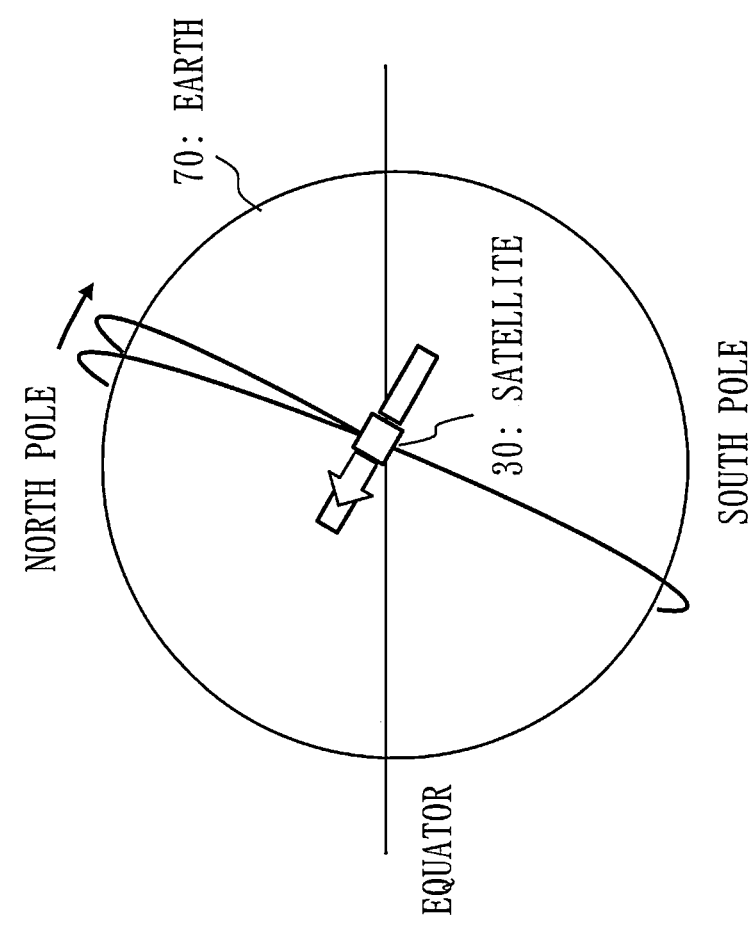
FIG. 23 is a diagram describing adjustment of orbital inclinations according to Embodiment 3.

FIG. 23 is a diagram describing adjustment of orbital inclinations.

The orbit control command generation unit 510 generates an orbit control command 51 for adjusting the altitude of each satellite 30. The orbit control command generation unit 510 generates the orbit control command 51 for adjusting the orbital inclination of each satellite 30. Then, the communication device 950 of the ground facility 701 transmits the orbit control command 51 to each satellite 30.

In each satellite 30, the satellite control device 31 receives the orbit control command 51 via the satellite communication device 32. The satellite control device 31 adjusts the satellite altitude and the orbital inclination in accordance with the orbit control command 51. Specifically, the satellite control device 31 controls the propulsion device 33 in accordance with the orbit control command 51. The satellite altitude and the orbital inclination can be adjusted by changing the satellite velocity by the propulsion device 33. As described above, the orbit control command generation unit 510 is an example of the satellite constellation forming unit 110. The orbit control command 51 is an example of parameters generated by the satellite constellation forming unit 110.

In FIG. 22, a filled circle inside the Earth 70 represents the north pole.

As the flying speed of the satellite 30 increases, the altitude of the satellite 30 increases. Then, as the altitude of the satellite 30 increases, the ground speed of the satellite 30 decreases.

As the flying speed of the satellite 30 decreases, the altitude of the satellite 30 decreases. Then, as the altitude of the satellite 30 decreases, the ground speed of the satellite 30 increases.

As indicated in FIG. 23, if the propulsion device 33 generates thrust in a direction orthogonal to the orbital plane at a point where the satellite 30 crosses the equator (dividing point), a minor adjustment can be effectively made to the orbital inclination.

*Description of Functions*

Figure 24:
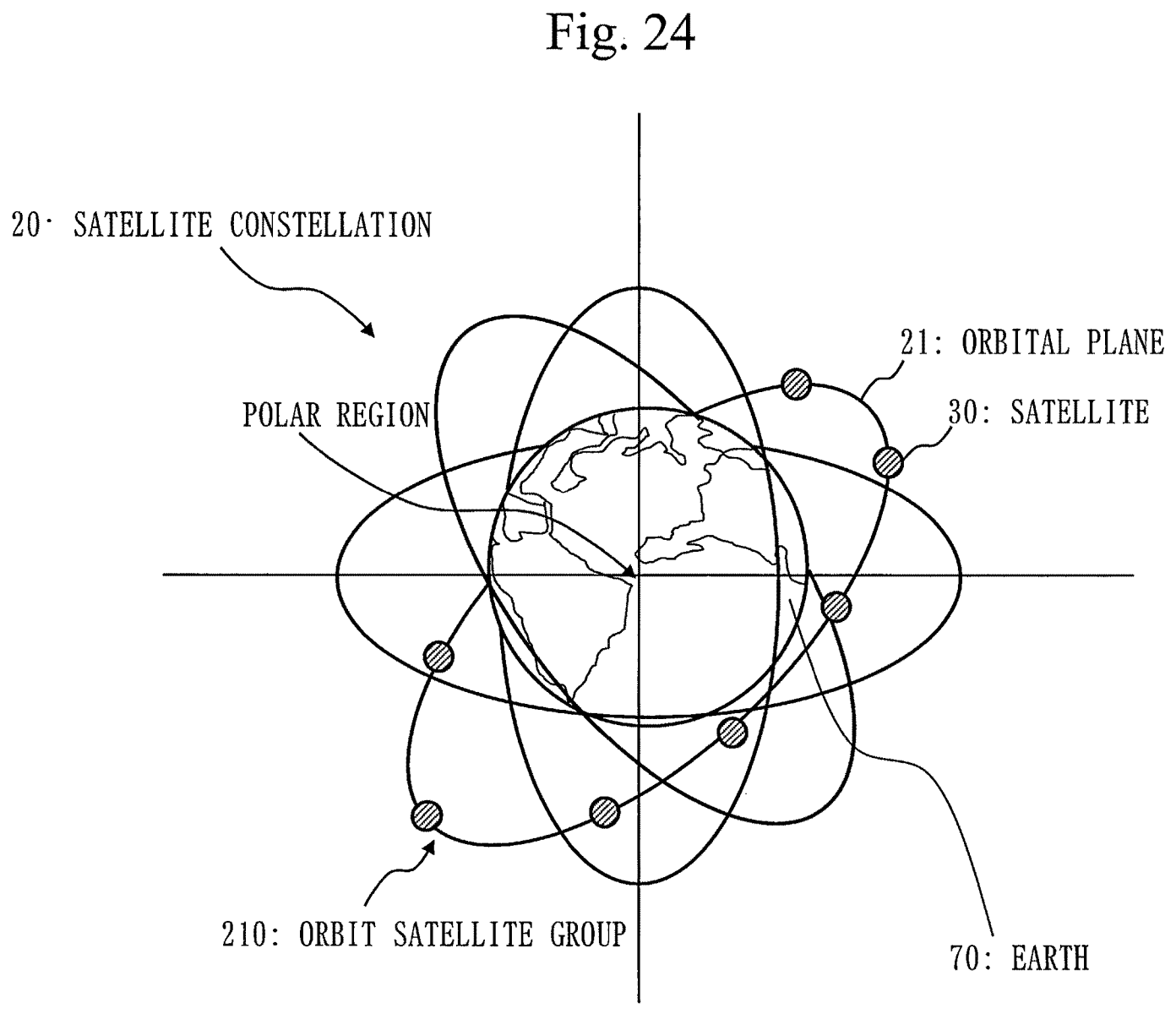

FIG. 24 is a diagram illustrating an example of the satellite constellation 20 according to this embodiment.

The satellite constellation forming system 100 forms a satellite constellation 20 having a plurality of orbital planes 21 with mutually different normal directions. In each of the orbital planes 21, a plurality of satellites 30 fly as an orbit satellite group 210. Each satellite in the orbit satellite group 210 is equipped with the propulsion device 33 that changes the velocity of each satellite in the orbit satellite group 210. FIG. 24 illustrates a state in which a plurality of satellites 30 are flying as an orbit satellite group 210, using one orbital plane 21 as an example. In each of the orbital planes 21, an orbit satellite group 210 is flying similarly.

The configuration of each satellite 30 in the orbit satellite group 210 has been described in FIG. 7.

In this embodiment, the satellite constellation forming unit 110 causes the propulsion devices 33 of the satellites in the orbit satellite group 210 to operate in synchronization, for each orbital plane of the plurality of orbital planes.

The satellite constellation forming unit 110 causes each satellite in the orbit satellite group 210 in the first orbital plane 21 of the plurality of orbital planes to perform an acceleration and deceleration process of repeating operation of accelerating for a first time period T1 and then decelerating for the first time period T1. The satellite constellation forming unit 110 causes each satellite in the orbit satellite group 210 in the first orbital plane 21 to perform the acceleration and deceleration process, and also causes each satellite in the orbit satellite group 210 in an orbital plane adjacent to the first orbital plane to start the acceleration and deceleration process after a delay of a second time period T2 from the time point when the acceleration and deceleration process is started in the first orbital plane, and this is repeated for each satellite in the plurality of orbital planes.

The satellite constellation forming unit 110 sets the first time period T1 and the second time period T2 so that an altitude profile of orbital altitudes, in which relative altitude differences between adjacent orbital planes in the plurality of orbital planes are arranged sequentially, is sinusoidal.

The satellite constellation forming unit 110 calculates a value resulting from dividing the doubled first time period T1 by the number of orbital planes, N, of the plurality of orbital planes, as the second time period T2.

*Description of Operation*

Operation of the satellite constellation forming system 100 according to this embodiment will be described.

The satellite constellation forming system 100 according to this embodiment forms a satellite constellation 20 having N orbital planes 21 with mutually different normal directions. A plurality of satellites 30 flying in the same orbital plane are an orbit satellite group 210.

The satellite constellation forming unit 110 causes the satellites 30 in the same orbital plane to operate the respective propulsion devices 33 in synchronization.

It is assumed that the satellite constellation 20 according to this embodiment is composed of N orbital planes: the first orbital plane, the second orbital plane, the third orbital plane, . . . , the Nth orbital plane.

The satellite constellation forming unit 110 causes the satellites 30 in the first orbital plane to repeat operation of accelerating for the first time period T1 and then decelerating for the first time period T1. After a delay of a second time period with respect to the first orbital plane, the satellite constellation forming unit 110 causes the satellites in the second orbital plane, which is adjacent to the first orbital plane, to repeat operation of accelerating and decelerating similarly to the operation of the first orbital plane. The satellite constellation forming unit 110 sets the first time period T1 and the second time period T2 so that the altitude profile of orbital altitudes, in which relative altitude differences between adjacent orbital planes in the N orbital planes 21 are arranged sequentially, is approximately sinusoidal. Specifically, the altitude profile is those illustrated in FIG. 12 and FIGS. 16 to 19.

The propulsion device 33 of each satellite 30 in the first orbital plane repeats the acceleration and deceleration process of operating toward acceleration for about the first time period T1 and then operating toward deceleration for the first time period T1. The propulsion device 33 of each satellite 30 in the second orbital plane adjacent to the first orbital plane repeats the acceleration and deceleration process of operating toward acceleration for about the first time period T1 and then operating toward deceleration for the first time period T1×2/N with respect to the adjacent first orbital plane. Similarly, the propulsion device 33 of each satellite 30 in the third orbital plane adjacent to the second orbital plane repeats the acceleration and deceleration process of operating toward acceleration for about the first time period T1 and then operating toward deceleration for the first time period T1, after a delay of the time period T1×2/N with respect to the second orbital plane 21. In this way, the same operation is repeated until the Nth orbital plane.

In the satellite constellation forming system 100 according to this embodiment, the first time period T1 and the second time period T2 are set so that the altitude profile of the first orbital plane to the Nth orbital plane is approximately sinusoidal. In the satellite constellation forming system 100 according to this embodiment, by setting T2 to roughly T1×2/N, the altitude profile of the N orbital planes becomes approximately sinusoidal.

*Description of Effects of this Embodiment*

In the satellite constellation forming system 100 according to this embodiment, the altitudes of the N orbital planes are varied. Since the orbital planes at different altitudes have no intersections between them, there is no risk of a collision between satellites. Orbital planes with the matching altitudes have intersections between them, but each orbital plane has only a maximum of one orbital plane with which a match in altitude may occur. Thus, it is easy to avoid a collision by arranging that satellite passage timings do not coincide with each other at the intersections.

The rotation speeds of orbital planes with different orbital altitudes are different in an azimuth direction, so that the relative angles between the orbital planes gradually change. However, since the high and low relationship of the altitudes is switched sinusoidally, the average relative angle is maintained as a result. Therefore, in the satellite constellation forming system 100 according to this embodiment, it is not necessary to intentionally maintain the relative angles of the orbital planes by adjusting the optimum orbital inclination for each orbital altitude.

The satellite ground speeds are different in orbital planes at different orbital altitudes, so that the relative positional relationship between satellites flying in adjacent orbits gradually changes. However, in the satellite constellation forming system 100 according to this embodiment, the high and low relationship of the altitudes is switched sinusoidally, so that the average relative positional relationship is maintained as a result. Therefore, with the satellite constellation forming system 100 according to this embodiment, a service can be continued without switching communication partner satellites between adjacent orbits.

In the satellite constellation forming system 100 according to this embodiment, the relative positional relationship can be controlled without depending on orbital position accuracy and measurement accuracy of each satellite. Therefore, with the satellite constellation forming system 100 according to this embodiment, a collision can be avoided without separation by a large distance including an error component and a margin. Since the relative altitude differences may be small, there is an effect that propellant can be saved and the altitudes can be slowly changed. As a result, with the satellite constellation forming system 100 according to this embodiment, a large number of satellites in all orbital planes can be controlled by programs, allowing the system to be realized as an automated system.

Embodiment 4

In this embodiment, additions to Embodiment 3 will be mainly described. Components that are substantially the same as those in Embodiments 1 to 3 are denoted by the same reference signs, and description thereof may be omitted.

*Description of Configurations*

In this embodiment, the ground facility 701 for the satellite constellation forming system 100 for forming the satellite constellation 20 described in Embodiment 3 will be described.

The configurations of the satellite constellation forming system 100, the satellite constellation 20, the ground facility 701, and the satellite 30 are substantially the same as those in Embodiment 1.

*Description of Functions*

The communication device 950 of the ground facility 701 transmits and receives signals for tracking and controlling each satellite in the orbit satellite group 210 of each of the orbital planes 21 in the satellite constellation 20.

The orbit control command generation unit 510 of the ground facility 701 generates an orbit control command 51 to cause the propulsion devices of the satellites in the orbit satellite group 210 to operate in synchronization, for each orbital plane of the plurality of orbital planes. The orbit control command 51 causes each satellite in the orbit satellite group of the first orbital plane of the plurality of orbital planes to perform the acceleration and deceleration process of repeating operation of accelerating for the first time period T1 and then decelerating for the first time period T1. The orbit control command 51 causes each satellite in the orbit satellite group 210 in an orbital plane adjacent to the first orbital plane to start the acceleration and deceleration process after a delay of the second time period T2 from the time point when the acceleration and deceleration process is started in the first orbital plane. The orbit control command generation unit 510 generates the orbit control command 51 to cause each satellite in the plurality of orbital planes to repeat the above process.

The communication device 950 of the ground facility 701 transmits the orbit control command 51 to each satellite in the orbit satellite group 210 in each of the orbital planes.

*Description of Operation*

As described in Embodiment 1, the ground facility 701 controls a large number of satellites in all orbital planes by programs. Specifically, this is as described below.

The ground facility 701 measures time-dependent orbital positions of all the satellites 30. The time-dependent orbital positions may be measured using a positioning satellite signal receiving device mounted on each satellite 30 as measuring means. Specifically, a Global Positioning System (GPS) receiver is mounted on each satellite, and time and position information are transmitted to the ground as telemetry data. Monitoring the trend of this will result in measurement of time-dependent orbital positions.

Alternatively, ranging measurement from the ground may be used. Alternatively, the satellite orbital period may be measured to analyze and figure out the satellite ground speed or orbital altitude.

The ground facility 701 launches satellites into orbit so that the satellites in the same orbital planes are placed at approximately equal intervals, and then causes the satellites to fly at the same altitude and the same orbital inclination. As a result, the satellites in the same orbital plane fly in synchronization while maintaining the same phase angle.

The ground facility 701 transmits, to each satellite 30, an instruction to operate the propulsion device on condition that satellite passage timings do not coincide with each other at intersections of two orbital planes when the altitudes of the orbital planes are switched. When the altitudes of different orbits are to be switched, if satellites are flying in the same orbital plane at equal intervals and the same number of satellites are flying at equal intervals in an adjacent orbital plane so that the positions of the satellites are not aligned with the positions of the satellite in the other orbital plane, and the phases are different, the altitudes of the satellites can be switched without colliding with each other.

Specifically, the orbit control command generation unit 510 of the ground facility 701 transmits, to each satellite 30, an orbit control command 51 to operate the propulsion device 33 on condition that satellite passage timings do not coincide with each other at intersections of two orbital planes when the altitudes of the orbital planes are switched.

The ground facility 701 measures a relative angle in the azimuth direction, which depends on passage of time in the orbital planes. As measurement means, the flying positions in the orbital planes may be monitored according to passage of time.

The relative angle between the orbital planes changes in a time period of about T1, but it is possible to determine whether the angle between the orbital planes is uniform by comparing average values over a sufficiently long period of time. Therefore, if they are not uniform, instructions are given to the satellites in the orbital planes so as to adjust the thrust of the propulsion device 33 of each satellite 30 to make a minor adjustment to the orbital altitude so that the relative angle between the orbital planes becomes uniform.

Specifically, the orbit control command generation unit 510 of the ground facility 701 transmits, to each satellite 30, the orbit control command 51 to adjust the thrust of the propulsion device 33 of each satellite 30 so as to make a minor adjustment to the orbital altitude so that the relative angle between the orbital planes becomes uniform.

When out-of-synchronization behavior is detected among the satellites due to a cause such as a failure of an individual satellite, the ground facility issues an alarm and implements a human-induced measure only for the relevant satellite.
* Description of Effects of this Embodiment*

With the satellite constellation forming system 100 according to this embodiment, the ground facility 701 can be automated and labor can be saved. The ground facility 701 monitors transitions in the relative positional relationship of a group of satellites in the same orbital plane, the relative relationship between orbital planes, and the altitudes. The ground facility 701 gradually reduces the output of the propulsion device while maintaining the condition for avoiding a collision. As a result, the altitude difference between the highest altitude and the lowest altitude among different orbital planes is reduced, and changes in the relative angle between orbital planes and differences in the satellite ground speeds are also reduced. Therefore, the satellite constellation forming system 100 according to this embodiment allows for the altitudes to be slowly changed sinusoidally, so that the risk of a collision can be reduced and the amount of propellant consumed can also be reduced.

Embodiment 5

The satellite constellation forming system 100 according to this embodiment forms the satellite constellation 20 having N orbital planes with mutually different normal directions, where N is a natural number. Each orbital plane of the N orbital planes is an elliptical orbit with the same eccentricity and the same major axis. Furthermore, in this embodiment, the satellite constellation forming unit 110 forms the satellite constellation 20 in which each orbital plane of the N orbital planes is a polar orbit with an orbital inclination of about 90 degrees.

The satellite constellation forming unit 110 forms the satellite constellation 20 in which the elevation direction of the major axis of each orbital plane of the N orbital planes has a relative angle of 360/N degrees with respect to each other, and the azimuth direction of each orbital plane of the N orbital planes has a relative angle of 180/N degrees with respect to each other.

The ground facility 701 transmits an orbit control command 51 to satellites 30 constituting the satellite constellation having orbital planes with mutually different normal directions. As described above, the ground facility 701 includes the communication device 950 that transmits and receives signals for tracking and controlling the satellites 30. The orbit control command generation unit 510 of the ground facility 701 generates the orbit control command 51 to form the satellite constellation 20 in which each orbital plane of the orbital planes with mutually different normal directions is an elliptical orbit with the same eccentricity and the same major axis. Furthermore, this orbit control command 51 controls the orbits of the satellites 30 so that the elevation direction of the major axis of each of the orbital planes has a crossing angle or a predetermined relative angle with respect to each other, and the azimuth direction of each of the orbital planes has a crossing angle or a predetermined relative angle with respect to each other. More specifically, this is as described below.

In order to realize the functions of the satellite constellation forming unit 110 described above, the orbit control command generation unit 510 of the ground facility 701 generates the orbit control command 51 to be transmitted to the satellites 30. Specifically, the orbit control command generation unit 510 generates the orbit control command 51 to form the satellite constellation 20 in which each orbital plane of the N orbital planes is a polar orbit with an orbital inclination of 90 degrees, and each orbital plane of the N orbital planes is an elliptical orbit with the same eccentricity and the same major axis. Furthermore, this orbit control command 51 forms the satellite constellation 20 in which the elevation direction of the major axis of each orbital plane of the N orbital planes has a relative angle of 360/N degrees with respect to each other, and the azimuth direction of each orbital plane of the N orbital planes has a relative angle of 180/N degrees with respect to each other. The communication device 950 of the ground facility 701 transmits the orbit control command 51 to each satellite 30. That is, the communication device 950 and the orbit control command generation unit 510 are examples of the satellite constellation forming unit 110.

The satellite constellation forming unit 110 generates parameters for forming a satellite constellation 20. The satellite constellation 20 has N orbital planes with mutually different normal directions, and each orbital plane of the N orbital planes is an elliptical orbit with the same eccentricity and the same major axis. In the satellite constellation 20, each orbital plane of the N orbital planes is a polar orbit with an orbital inclination of 90 degrees.

The satellite constellation forming unit 110 forms the satellite constellation 20 in which the elevation direction of the major axis of each orbital plane of the N orbital planes has a relative angle of 360/N degrees with respect to each other, and the azimuth direction of each orbital plane of the N orbital planes has a relative angle of 180/N degrees with respect to each other. More specifically, the orbit control command generation unit 510 of the ground facility 701 generates an orbit control command 51 to be transmitted to each satellite 30 in order to form the satellite constellation 20 described above. The orbit control command generation unit 510 generates the orbit control command 51 so that the elevation direction of the major axis of each of the orbital planes has a relative angle of 360/N degrees with respect to each other, and the azimuth direction of each of the orbital planes has a relative angle of 180/N degrees with respect to each other.

The satellite constellation forming unit 110 delivers the parameters for forming the satellite constellation 20 to each satellite 30.

Specifically, the communication device 950 of the ground facility 701 transmits the orbit control command 51 generated in order to form the satellite constellation 20 described above to each satellite 30.

Each satellite 30 controls the orbit and attitude in accordance with the parameters delivered from the satellite constellation forming unit 110. Specifically, the satellite communication device 32 of each satellite 30 receives the orbit control command 51 transmitted from the ground facility 701, and transmits it to the satellite control device 31. The satellite control device 31 of each satellite 30 controls the propulsion device 33 and the attitude control device 34 based on the orbit control command 51. Each satellite 30 controls the orbit in accordance with the orbit control command 51, thereby forming the satellite constellation 20.

Specific examples of the satellite constellation 20 according to this embodiment will be described below. In the satellite constellation 20 according to this embodiment, all orbital planes are elliptical orbits with the same eccentricity and the same major axis. The elevation direction angles of the major axes of the elliptical orbits have a relative angle of approximately 360/N degrees, and the azimuth directions have a relative angle of approximately 180/N degrees.

Figure 25:
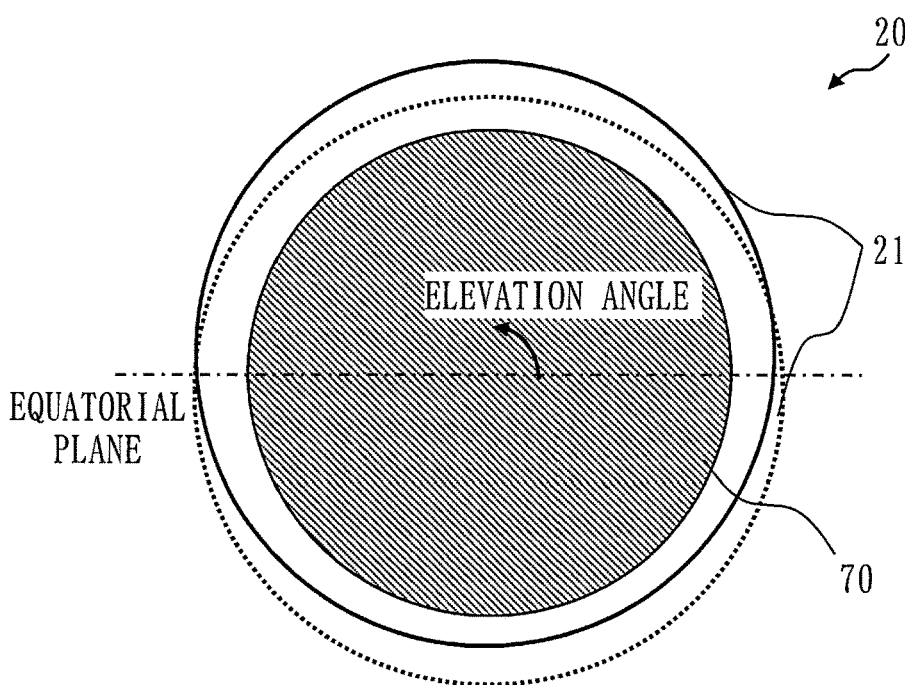
FIG. 25 is a diagram illustrating an example of two orbital planes in which elevation angles of elliptical orbits differ by 180 degrees in a satellite constellation according to Embodiment 5.

FIG. 25 is a diagram illustrating an example of two orbital planes 21 in which the elevation angles of elliptical orbits differ by 180 degrees in the satellite constellation 20 according to this embodiment.

In FIG. 25, the elevation direction of the major axis of each of the two orbital planes 21 has a relative angle of 180 (=360/2) degrees with respect to each other.

Figure 26:
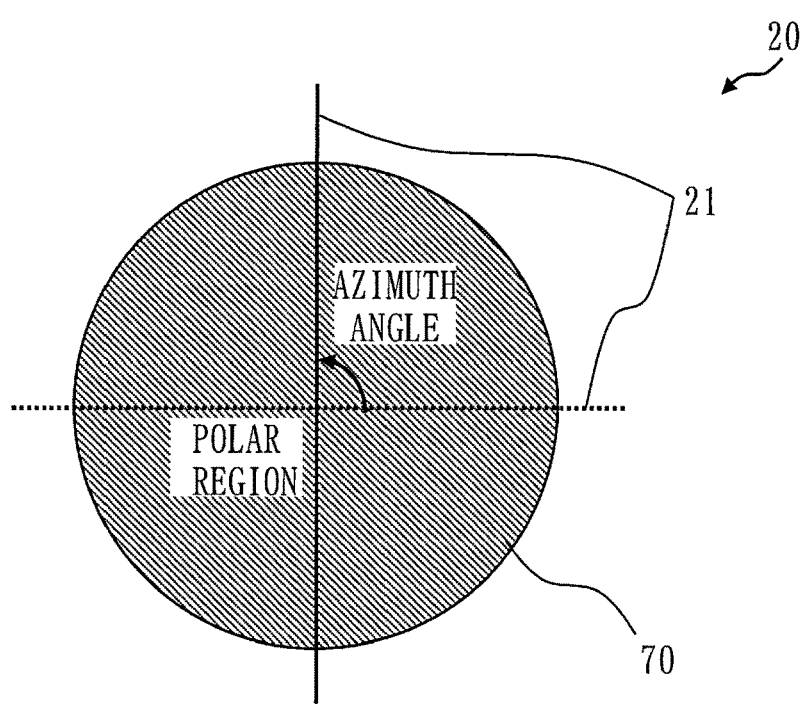
FIG. 26 is a diagram illustrating an example of two orbital planes in which azimuth angles differ by 90 degrees in a satellite constellation according to Embodiment 5.

FIG. 26 is a diagram illustrating an example of two orbital planes 21 in which the azimuth angles differ by 90 degrees in the satellite constellation 20 according to this embodiment.

In FIG. 26, the azimuth direction of each of the two orbital planes 21 has a relative angle of 90 (=180/2) degrees with respect to each other.

Figure 27:
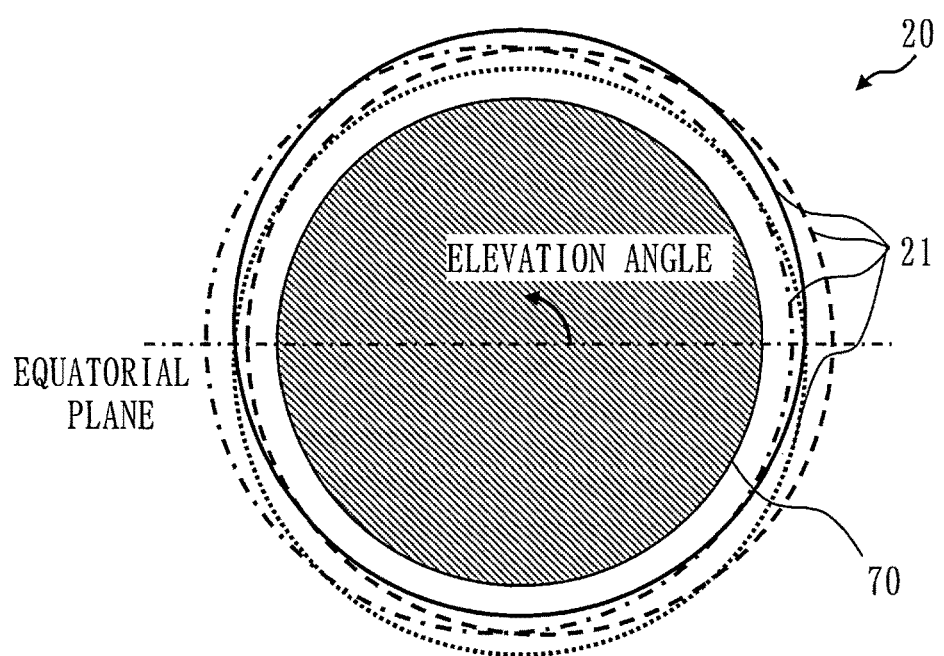
FIG. 27 is a diagram illustrating an example of four orbital planes in which elevation angles of elliptical orbits differ by 90 degrees in a satellite constellation according to Embodiment 5.

FIG. 27 is a diagram illustrating an example of four orbital planes 21 in which the elevation angles of elliptical orbits differ by 90 degrees in the satellite constellation 20 according to this embodiment.

In FIG. 27, the elevation angle of the major axis of each of the four orbital planes 21 has a relative angle of 90 (=360/4) degrees with respect to each other.

Figure 28:
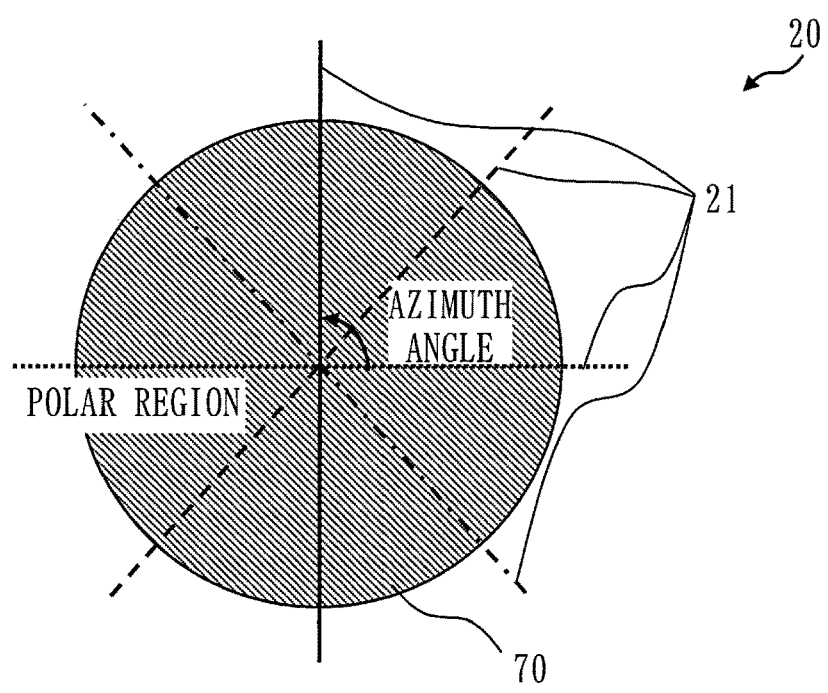
FIG. 28 is a diagram illustrating an example of four orbital planes in which azimuth angles differ by 45 degrees in a satellite constellation according to Embodiment 5.

FIG. 28 is a diagram illustrating an example of four orbital planes 21 in which the azimuth angles differ by 45 degrees in the satellite constellation 20 according to this embodiment.

In FIG. 28, the azimuth direction of each of the four orbital planes 21 has a relative angle of 45 (=180/4) degrees with respect to each other.

Figure 29:
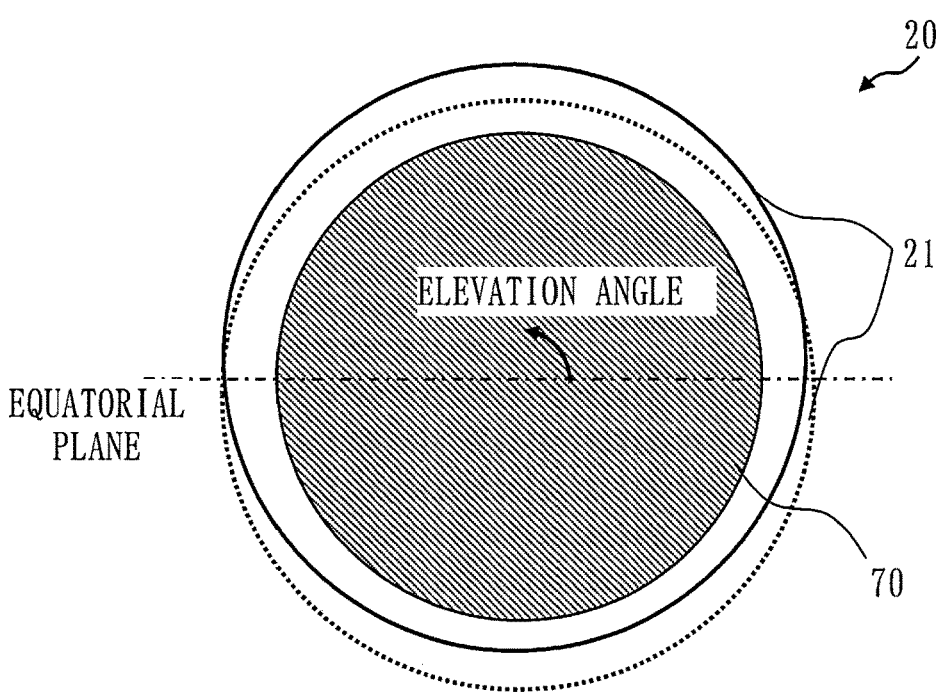
FIG. 29 is a diagram illustrating an example of two orbital planes in which elevation angles of elliptical orbits differ by 180 degrees in a satellite constellation according to Embodiment 5.

FIG. 29 is a diagram illustrating an example of two orbital planes in which the elevation angles of elliptical orbits differ by 180 degrees in the satellite constellation according to this embodiment.

Figure 30:
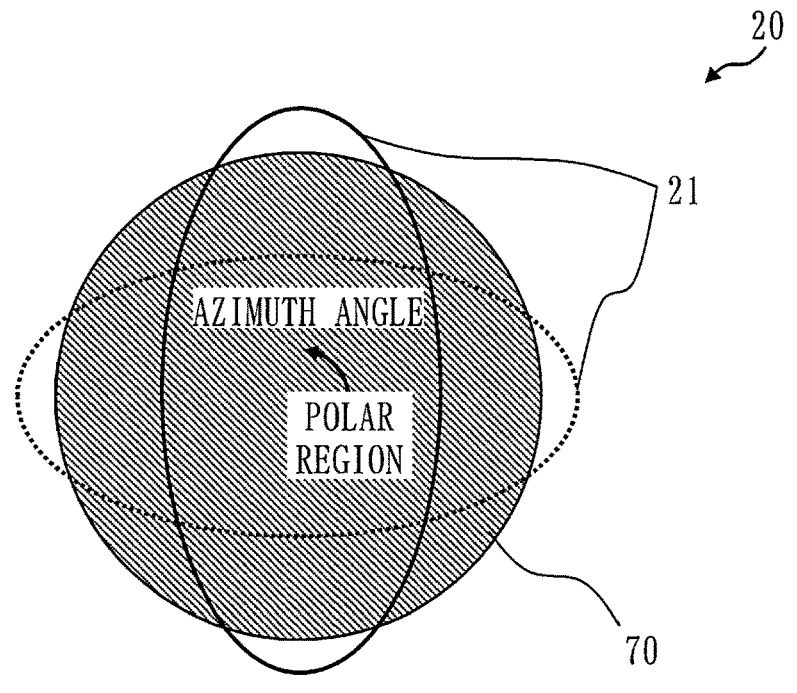
FIG. 30 is a diagram illustrating an example of two orbital planes in which azimuth angles differ by 90 degrees in a satellite constellation according to Embodiment 5.

FIG. 30 is a diagram illustrating an example of two orbital planes in which the azimuth angles differ by 90 degrees in the satellite constellation according to this embodiment.

Figure 31:
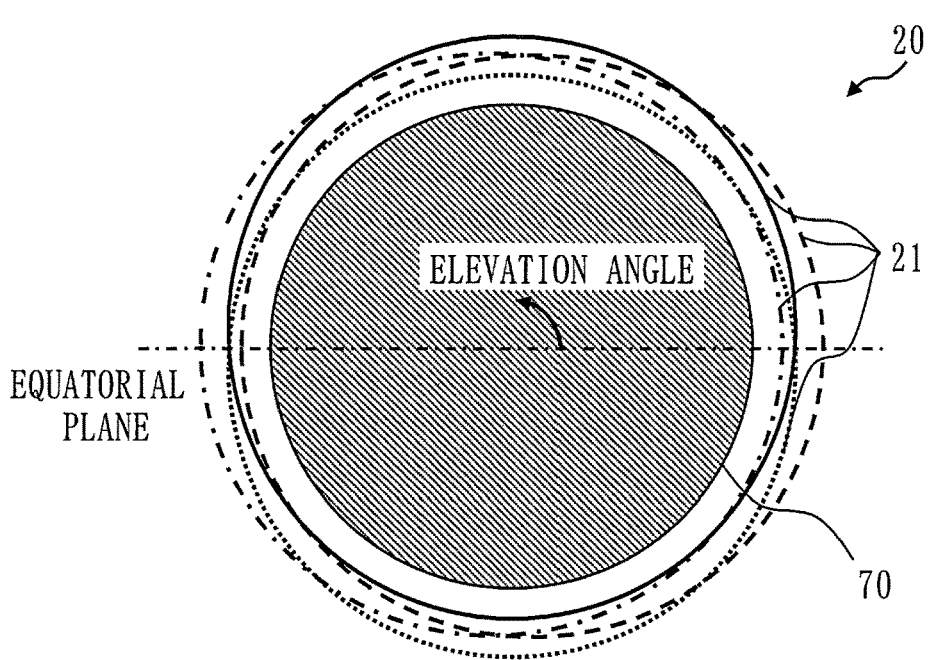
FIG. 31 is a diagram illustrating an example of four orbital planes in which elevation angles of elliptical orbits differ by 90 degrees in a satellite constellation according to Embodiment 5.

FIG. 31 is a diagram illustrating an example of four orbital planes in which the elevation angles of elliptical orbits differ by 90 degrees in the satellite constellation according to this embodiment.

Figure 32:
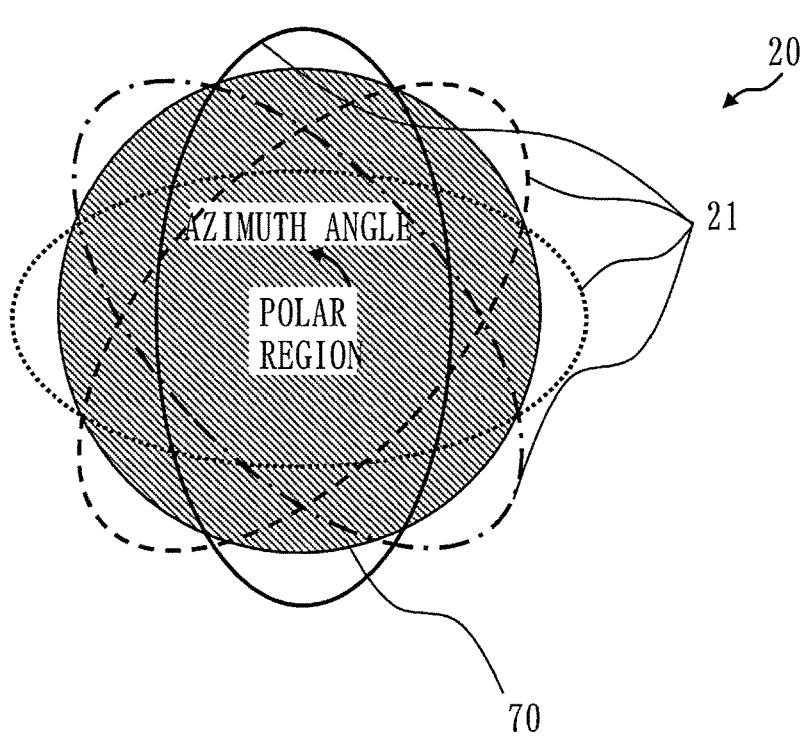
FIG. 32 is a diagram illustrating an example of four orbital planes in which azimuth angles differ by 45 degrees in a satellite constellation according to Embodiment 5.

FIG. 32 is a diagram illustrating an example of four orbital planes in which the azimuth angles differ by 45 degrees in the satellite constellation according to this embodiment.

Figure 33:
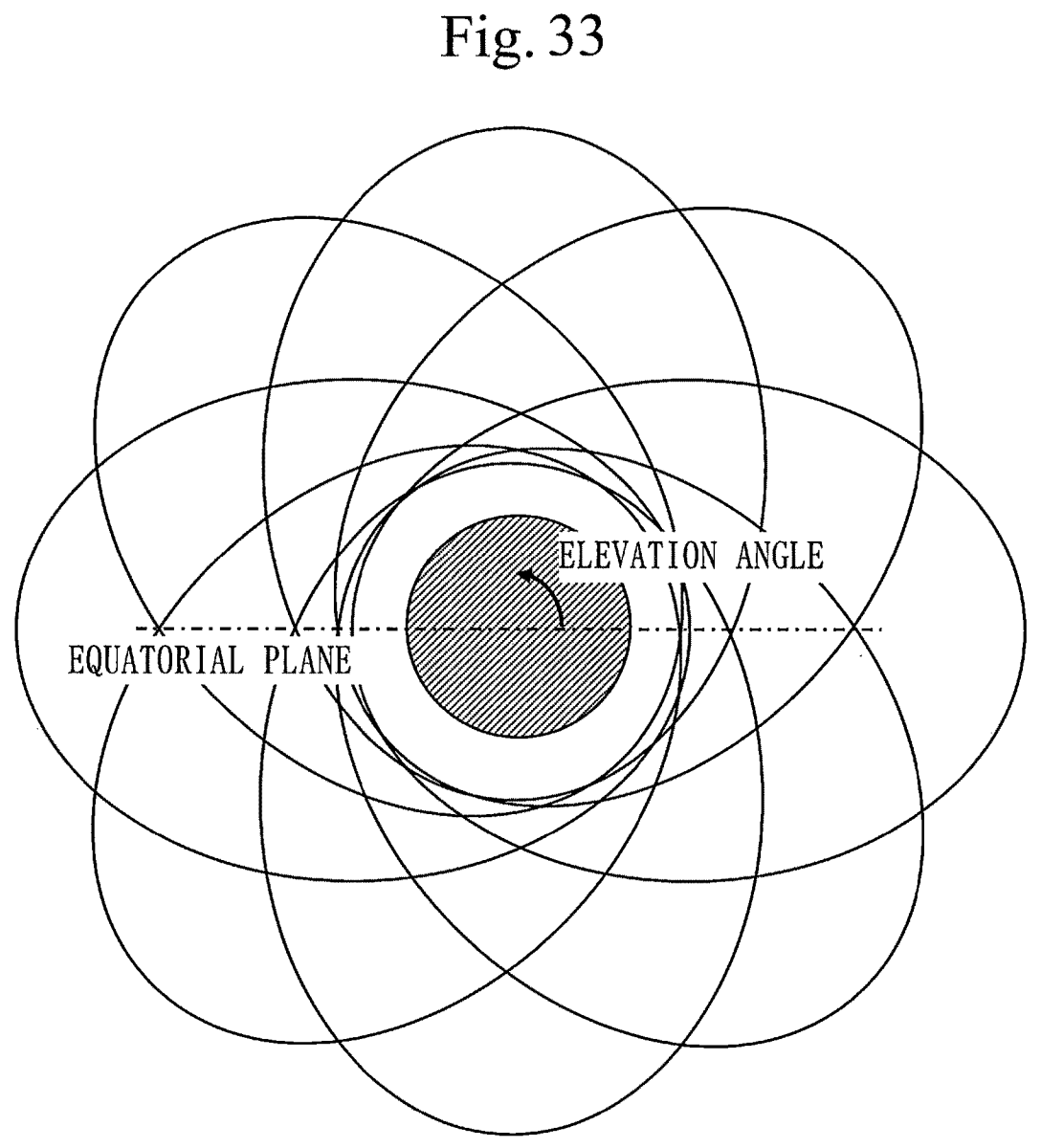

FIG. 33 is a diagram illustrating an example of eight orbital planes that are arranged by sequentially arranging adjacent major axes in a satellite constellation according to this embodiment.

*Description of Effects of this Embodiment*

According to the satellite constellation forming system 100 of this embodiment, any given two orbital planes have no intersection between them, so that there is no risk of a collision. Although the major axis of each elliptical orbit rotates in each orbital plane with passage of time, all the elliptical orbits have the same eccentricity and the same major axis, causing them to rotate in synchronization, so that the relative relationship is maintained.

In the Embodiments 1 to 5 above, satellite constellation forming systems such as the following have been described.

Example 5-1 of the Satellite Constellation Forming System

A satellite constellation forming system forms a satellite constellation which is composed of a satellite group and in which the satellite group cooperatively provides a service, and the satellite constellation has a plurality of orbital planes in each of which a plurality of satellites fly at a same nominal orbital altitude.

A satellite constellation forming unit continues providing the service while avoiding a collision between satellites by both or one of control of an orbital altitude and control of a passage timing of a satellite group flying in a region where the plurality of orbital planes intersect.

Example 5-2 of the Satellite Constellation Forming System

A satellite constellation forming system forms a satellite constellation which is composed of a satellite group and in which the satellite group cooperatively provides a service, and the satellite constellation has a plurality of orbital planes in each of which a plurality of satellites fly at a same nominal orbital altitude.

A satellite constellation forming unit forms the satellite constellation in which orbital altitudes of the plurality of orbital planes are mutually different, and each orbital plane has an orbital inclination such that orbital periods of the plurality of orbital planes are equal to each other. In the satellite constellation, relative altitude differences between adjacent orbital planes in the plurality of orbital planes are sequentially arranged to be sinusoidal. The satellite constellation forming unit sequentially changes an orbital altitude of each orbital plane of the plurality of orbital planes while maintaining a sinusoidal arrangement of the relative altitude differences between adjacent orbital planes in the plurality of orbital planes. In a combination of any two orbital planes of the plurality of orbital planes, the satellite constellation forming unit gradually changes an orbital altitude of at least one of the two orbital planes from a state in which in a vicinity of an intersection of the two orbital planes, satellite passage timings of passage of satellites flying in the two orbital planes do not coincide between the two orbital planes, while maintaining the state in which the satellite passage timings do not coincide.

Example 5-3 of the Satellite Constellation Forming System

A satellite constellation forming system forms a satellite constellation having a plurality of orbital planes in each of which a plurality of satellites fly as an orbit satellite group, and the plurality of orbital planes have mutually different normal directions. In the satellite constellation, each of the plurality of satellites in the orbit satellite group includes a propulsion device to change velocity of each of the plurality of satellites in the orbit satellite group.

A satellite constellation forming unit causes propulsion devices of satellites in the orbit satellite group to operate in synchronization within each orbital plane of the plurality of orbital planes. The satellite constellation forming unit causes each satellite in an orbit satellite group in a first orbital plane of the plurality of orbital planes to perform an acceleration and deceleration process of repeating operation of accelerating for a first time period and then decelerating for the first time period, and causes each satellite in an orbit satellite group in an orbital plane adjacent to the first orbital plane to start the acceleration and deceleration process after a delay of a second time period from a time point when the acceleration and deceleration process is started in the first orbital plane, repeatedly for each of the plurality of orbital planes. In a combination of any two orbital planes of the plurality of orbital planes, the satellite constellation forming unit gradually changes an orbital altitude of at least one of the two orbital planes from a state in which in a vicinity of an intersection of the two orbital planes, satellite passage timings of passage of satellites flying in the two orbital planes do not coincide between the two orbital planes, while maintaining the state in which the satellite passage timings do not coincide.

Example 5-4 of the Satellite Constellation Forming System

A satellite constellation forming system forms a satellite constellation having a plurality of orbital planes in each of which a plurality of satellites fly as an orbit satellite group, and the plurality of orbital planes have mutually different normal directions. In the satellite constellation, each of the plurality of satellites in the orbit satellite group includes a propulsion device to change velocity of each of the plurality of satellites in the orbit satellite group, the satellite constellation being formed at an orbital altitude at which atmospheric drag affects each of the plurality of satellites in the orbit satellite group.

A satellite constellation forming unit causes propulsion devices of satellites in the orbit satellite group to operate in synchronization within each orbital plane of the plurality of orbital planes. The satellite constellation forming unit causes each satellite in an orbit satellite group in a first orbital plane of the plurality of orbital planes to perform an acceleration and deceleration process utilizing atmospheric drag of repeating operation of accelerating for a first time period, then stopping acceleration, and after an altitude of each satellite returns to a previous altitude due to atmospheric drag, accelerating for the first time period, and causes each satellite in an orbit satellite group in an orbital plane adjacent to the first orbital plane to start the acceleration and deceleration process utilizing atmospheric drag after a delay of a second time period from a time point when the acceleration and deceleration process utilizing atmospheric drag is started in the first orbital plane, repeatedly for each of the plurality of orbital planes. In a combination of any two orbital planes of the plurality of orbital planes, the satellite constellation forming unit gradually changes an orbital altitude of at least one of the two orbital planes from a state in which in a vicinity of an intersection of the two orbital planes, satellite passage timings of satellites flying in the two orbital planes do not coincide between the two orbital planes, while maintaining the state in which the satellite passage timings do not coincide.

Example 5-5 of the Satellite Constellation Forming System

A satellite constellation forming system forms a satellite constellation having N orbital planes (N being a natural number) with mutually different normal directions.

A satellite constellation forming unit forms the satellite constellation in which each orbital plane of the N orbital planes is an elliptical orbit with a same eccentricity and a same major axis, an elevation direction of a major axis of each orbital plane of the N orbital planes has a relative angle of 360/N degrees with respect to each other, and an azimuth direction of each orbital plane of the N orbital planes has a relative angle of 180/N degrees with respect to each other. In a combination of any two orbital planes of the N orbital planes, the satellite constellation forming unit gradually changes an orbital altitude of at least one of the two orbital planes from a state in which in a vicinity of an intersection of the two orbital planes, satellite passage timings of satellites flying in the two orbital planes do not coincide between the two orbital planes, while maintaining the state in which the satellite passage timings do not coincide.

Example 5-6 of the Satellite Constellation Forming System

A satellite constellation forming system forms a satellite constellation which is composed of a satellite group and in which the satellite group cooperatively provides a service, and the satellite constellation has a plurality of orbital planes in each of which a plurality of satellites fly at a same nominal orbital altitude.

A satellite constellation forming unit continues providing the service while avoiding a collision by both or one of control of an orbit and control of a passage timing of the satellite group after a collision with a space object during orbital descent, a rocket being launched, a satellite during orbital transfer, or debris is foreseen.

Other Examples

A mega-constellation business device is a business device to manage a mega-constellation composed of 100 or more satellites. The mega-constellation business device forms the satellite constellation forming system according to any one of Example 5-1 to Example 5-6 of the satellite constellation forming system above.

A satellite constellation constitutes the satellite constellation forming system according to any one of Example 5-1 to Example 5-6 of the satellite constellation forming system above.

A satellite constitutes the satellite constellation forming system according to any one of Example 5-1 to Example 5-6 of the satellite constellation forming system above.

Embodiment 6

FIG. 34 is a configuration diagram illustrating an example of a space traffic management system 500 and an example of a space traffic management device 700 according to this embodiment.

The space traffic management system 500 includes the space traffic management device 700. The space traffic management system 500 is referred to also as a space object intrusion alert system. The space traffic management device 700 is referred to also as a space object intrusion alert device.

The space traffic management system 500 includes a plurality of space traffic management devices 700 that are respectively installed in business devices of a plurality of management business operators that manage space objects flying in space. The space traffic management system 500 includes a plurality of space traffic management devices that perform flight safety management for space objects. The plurality of space traffic management devices 700 are mutually connected with communication lines.

Each of the space traffic management devices 700 communicates with other management business devices 40. Each of the space traffic management devices 700 may be installed in the ground facility 701. Each of the space traffic management devices 700 may be installed in the satellite constellation forming system 100. Each of the space traffic management devices 700 may be installed in a management business device 40 (also referred to as a business device).

For example, a mega-constellation business device 41 has the space traffic management device 700 that is compatible with the space traffic management device 700 included in each of the business devices that manage space objects. The space traffic management device 700 of the mega-constellation business device 41 may be connected, through the space traffic management device 700, to the space traffic management system 500 in which the space traffic management devices 700 of the other business devices are connected with communication lines.

The management business device 40 provides information related to a space object 60 such as an artificial satellite or debris. The management business device 40 is a computer of a business operator that collects information related to a space object 60 such as an artificial satellite or debris.

The management business device 40 includes devices such as the mega-constellation business device 41, an LEO constellation business device 42, a satellite business device 43, an orbital transfer business device 44, a debris removal business device 45, a rocket launch business device 46, and an SSA business device 47. SSA is an abbreviation for Space Situational Awareness. LEO is an abbreviation for Low Earth Orbit.

The mega-constellation business device 41 is a computer of a mega-constellation business operator that conducts a large-scale satellite constellation, that is, mega-constellation business. The mega-constellation business device 41 is a business device that manages a satellite constellation composed of 100 or more satellites, for example.

The LEO constellation business device 42 is a computer of an LEO constellation business operator that conducts a low Earth orbit constellation, that is, LEO constellation business.

The satellite business device 43 is a computer of a satellite business operator that handles one to several satellites.

The orbital transfer business device 44 is a computer of an orbital transfer business operator that performs a space object intrusion alert for satellites.

The debris removal business device 45 is a computer of a debris removal business operator that conducts a business to retrieve debris.

The rocket launch business device 46 is a computer of a rocket launch business operator that conducts a rocket launch business.

The SSA business device 47 is a computer of an SSA business operator that conducts an SSA business, that is, a space situational awareness business.

The management business device 40 may be any other device, provided that it is a device that collects information related to a space object such as an artificial satellite or debris and provides the collected information to the space traffic management system 500. When the space traffic management device 700 is installed on an SSA public server, the space traffic management device 700 may be configured to function as the SSA public server.

Information that is provided from the management business device 40 to the space traffic management device 700 will be described in detail later.

The space traffic management device 700 includes a processor 910 and also includes other hardware components such as a memory 921, an auxiliary storage device 922, an input interface 930, an output interface 940, and a communication device 950. The processor 910 is connected with other hardware components via signal lines and controls these other hardware components.

The space traffic management device 700 includes a space object management unit 710 and a storage unit 720 as an example of functional elements. In the storage unit 720, orbit forecast information 501 is stored.

The functions of the space object management unit 710 are realized by software. The storage unit 720 is provided in the memory 921. Alternatively, the storage unit 720 may be provided in the auxiliary storage device 922. The storage unit 720 may also be divided and provided in the memory 921 and the auxiliary storage device 922.

For example, the space traffic management device 700 realizes a space object intrusion alert function. However, as will be described later, the space traffic management device 700 has various functions other than the space object intrusion alert function.

The processor 910 is a device that executes a space traffic management program. The space traffic management program is a program that realizes the functions of the constituent elements of the space traffic management device 700 and the space traffic management system 500.

FIG. 35 is a diagram illustrating an example of the orbit forecast information 501 according to this embodiment.

The space traffic management device 700 stores, in the storage unit 720, the orbit forecast information 501 in which forecast values of orbits of space objects 60 are set. For example, the space traffic management device 700 may acquire forecast values of the orbit of each of the space objects 60 from the management business device 40 used by a management business operator that manages the space objects 60 and store them as the orbit forecast information 501. Alternatively, the space traffic management device 700 may acquire the orbit forecast information 501 in which forecast values of the orbit of each of the space objects 60 are set from the management business operator and store it in the storage unit 720.

The management business operator is a business operator that manages the space objects 60 that fly in space, such as a satellite constellation, various types of satellites, a rocket, and debris. As described above, the management business device 40 used by each management business operator is a computer, such as the mega-constellation business device 41, the LEO constellation business device 42, the satellite business device 43, the orbital transfer business device 44, the debris removal business device 45, the rocket launch business device 46, and the SSA business device 47.

The orbit forecast information 501 includes satellite orbit forecast information 52 and debris orbit forecast information 53. In the satellite orbit forecast information 52, forecast values of orbits of satellites are set. In the debris orbit forecast information 53, forecast values of orbits of debris are set. In this embodiment, it is arranged that the satellite orbit forecast information 52 and the debris orbit forecast information 53 are included in the orbit forecast information 501. However, the satellite orbit forecast information 52 and the debris orbit forecast information 53 may be stored in the storage unit 720 as separate pieces of information.

In the orbit forecast information 501, information such as a space object identifier (ID) 511, a forecast epoch 512, forecast orbital elements 513, and a forecast error 514 is set, for example.

The space object ID 511 is an identifier that identifies a space object 60. In FIG. 35, a satellite ID and a debris ID are set as the space object ID 511. Specifically, a space object is an object such as a rocket to be launched into outer space, an artificial satellite, a space station, a debris removal satellite, a planetary space probe, or a satellite or rocket that has become debris after completing a mission.

The forecast epoch 512 is an epoch that is forecast for the orbit of each of the space objects.

The forecast orbital elements 513 are orbital elements that identify the orbit of each of the space objects. The forecast orbital elements 513 are orbital elements that are forecast for the orbit of each of the space objects. In FIG. 35, the six Keplerian elements are set as the forecast orbital elements 513.

The forecast error 514 is an error that is forecast for the orbit of each of the space objects. In the forecast error 514, a traveling direction error, an orthogonal direction error, and a basis for the error are set. In this way, the forecast error 514 explicitly indicates the amount of error included in a record value together with the basis. The basis for the amount of error includes at least one or all of means for measurement, the content of data processing performed as means for improving the precision of location coordinate information, and a result of statistical evaluation on past data.

In the orbit forecast information 501 according to this embodiment, the forecast epoch 512 and the forecast orbital elements 513 are set for the space object 60. Using the forecast epoch 512 and the forecast orbital elements 513, the time and location coordinates of the space object 60 in the near future can be obtained. For example, the time and location coordinates of the space object 60 in the near future may be set in the orbit forecast information 501.

The orbit forecast information 501 thus includes information on the orbit of each space object including the epoch and orbital elements or the time and location coordinates, and explicitly indicates forecast values of the space object 60 in the near future.

A different example of the space traffic management device 700 and the space traffic management system 500 will now be described. The hardware configuration of the space traffic management device 700 is as described above.

A plurality of space traffic management devices 700 provided in the space traffic management system 500 are mutually connected with communication lines. The space traffic management devices 700 are respectively provided in each of a plurality of management business devices 40. In the following, the management business device 40 may be called simply as the business device.

The space traffic management device 700 includes a space information recorder 101, a danger alert device 102, a danger analysis device 103 to analyze the orbit of a space object, a danger avoidance action assistance device 104, and a security device 105.

The space information recorder 101 records orbit information of space objects. A specific example of the space information recorder 101 is the orbit forecast information 501 of FIG. 35.

The danger alert device 102 notifies a danger of proximity or collision with a space object.

The danger analysis device 103 analyzes the orbit of a space object.

The danger avoidance action assistance device 104 indicates responsibility assignment for an avoidance action for a space object.

The security device 105 prevents information tampering.

The space information recorder 101 includes space object IDs that identify space objects, orbit information, and disclosure condition information, and also includes business device IDs that identify business devices and disclosure condition information.

The plurality of space traffic management devices 700 are compatible in terms of data formats, and share the space object IDs and the business device IDs. Orbit information corresponding to a space object ID is shared between business devices that satisfy disclosure condition information.

FIG. 36 is a diagram illustrating an example of the space traffic management system 500 according to this embodiment.

In FIG. 36, a detailed configuration of the space traffic management device 700 is omitted.

Figure 37:
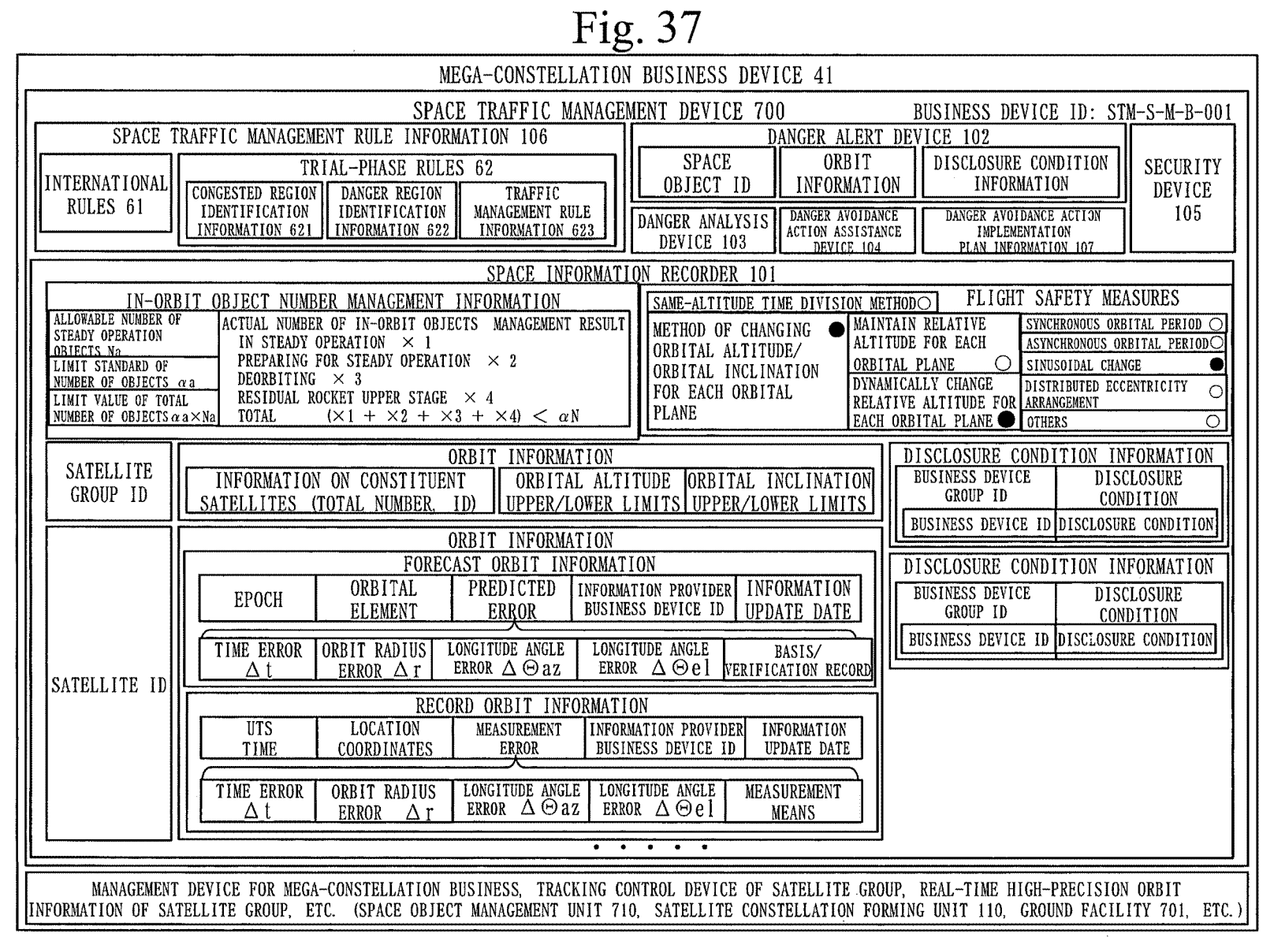

FIG. 37 is a diagram illustrating a detailed example of the space traffic management device 700 according to this embodiment. FIG. 38 is a diagram illustrating a detailed example of the space information recorder 101 of the space traffic management device 700 according to this embodiment.

The detailed configuration of the space information recorder 101 of FIG. 38 is information omitted in the space information recorder 101 of FIG. 37.

Each of the space traffic management devices 700 includes space traffic management rule information 106, the danger alert device 102, and danger avoidance action implementation plan information 107.

The space traffic management rule information 106 includes international rules 61 that are acknowledged internationally in accordance with the space law and trial-phase rules 62 before being acknowledged internationally.

The trial-phase rules 62 include all or at least one of congested region identification information 621 that identifies a congested region, danger region identification information 622 that identifies a danger region where congested regions intersect, and traffic management rule information 623 in danger regions.

In this embodiment, space traffic management rule information is shared on the basis of the effects of information sharing between management business operators of space objects described in Embodiment 1. By this information sharing, securement of flight safety in design and operation under normal conditions are realized.

In addition, by making it a rule to perform a notification when danger is foreseen and sharing danger avoidance action implementation plan information, there is an effect that danger is avoided and space traffic safety is realized.

<Congested Region Identification Information 621>

Figure 39:
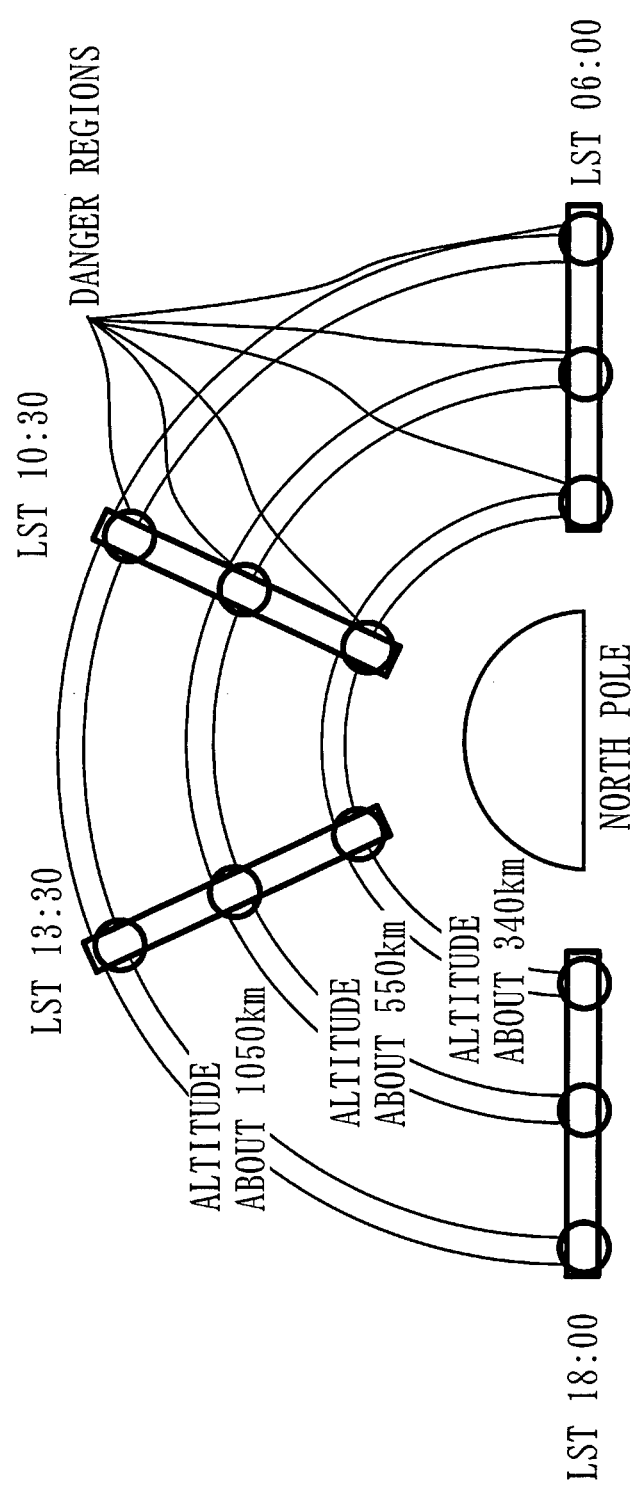
FIG. 39 is a diagram illustrating an example of congested region identification information according to Embodiment 6.
Figure 40:
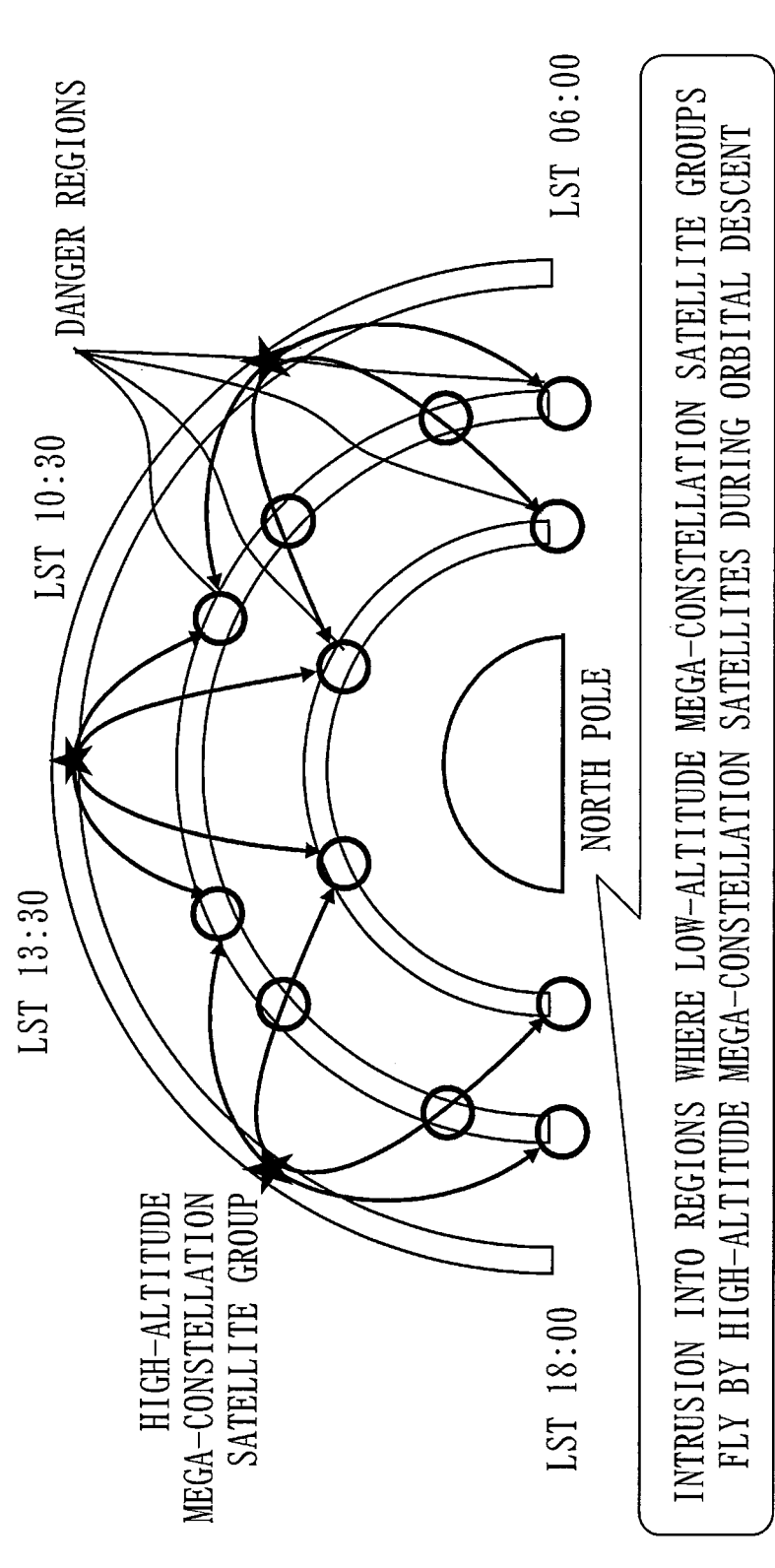
FIG. 40 is a diagram illustrating an example of danger region identification information according to Embodiment 6.

FIG. 39 is a diagram illustrating an example of the congested region identification information 621 according to this embodiment.

The congested region identification information 621 includes the following regions.

A region in the vicinity of sun-synchronous orbit LST 10:30 and at orbital altitudes of 500 km to 1000 km A region in the vicinity of sun-synchronous orbit LST 13:30 and at orbital altitudes of 500 km to 1000 km A region in the vicinity of sun-synchronous orbit LST 06:00 and at orbital altitudes of 500 km to 1000 km A region in the vicinity of sun-synchronous orbit LST 18:00 and at orbital altitudes of 500 km to 1000 km A region at latitudes of 80 and more degrees north and at orbital altitudes of 500 km to 1000 km A region at latitudes of 80 and more degrees south and at orbital altitudes of 500 km to 1000 km Each orbital altitude region where a mega-constellation satellite group that realizes a specific service by a satellite group of 500 or more satellites with the same nominal orbital altitude and flying at orbital altitudes of 100 km or higher and less than 2000 km <Danger Region Identification Information 622>

FIGS. 40, 41, 42, and 43 are diagrams illustrating examples of the danger region identification information 622 according to this embodiment.

The danger region identification information 622 is a region where congested regions intersect. The danger region identification information 622 includes a region where any one of the following regions intersects with each orbital altitude region where a mega-constellation satellite group that realizes a specific service by a satellite group of 1000 or more satellites with the same nominal orbital altitude and flying at orbital altitudes of 500 km or higher and less than 1000 km.

A region in the vicinity of sun-synchronous orbit LST 10:30 and at orbital altitudes of 500 km to 1000 km A region in the vicinity of sun-synchronous orbit LST 13:30 and at orbital altitudes of 500 km to 1000 km A region in the vicinity of sun-synchronous orbit LST 06:00 and at orbital altitudes of 500 km to 1000 km A region in the vicinity of sun-synchronous orbit LST 18:00 and at orbital altitudes of 500 km to 1000 km Example A of the Traffic Management Rule Information 623

Example A of the traffic management rule information 623 in danger regions includes the following rules.

A rule that all satellites in a mega-constellation satellite group that realizes a specific service maintain the orbital altitude in steady operation at the nominal orbital altitude Ha±ΔHa km.

A rule that sun-synchronous orbit satellites in steady operation are prohibited from intruding into the nominal orbital altitude Ha±ΔHa km.

Note that ΔHa is 2 to 10.

The nominal orbital altitude Ha km at which a mega-constellation satellite group flies is a region where satellite groups fly in a crisscross manner at about 0±40 degrees from the central latitude, which is assumed to be above the equator, that is, at approximately latitudes of 40 degrees north to 40 degrees south. Intrusion into this region by a sun-synchronous satellite causes a high risk collision and is dangerous. Therefore, taking into consideration variation from the nominal orbital altitude Ha km and the distribution of satellite groups, ±Δ Ha km is specified as a region within which the mega-constellation side is responsible to maintain the orbital altitude, and sun-synchronous satellites are prohibited from intruding into this region. This is treated as a rule for allowing safe flight by eliminating a region where congested regions intersect.

Example B of the Traffic Management Rule Information 623

Example B of the traffic management rule information 623 in danger regions includes the following rules.

A rule that all satellites in a mega-constellation satellite group that realizes a specific service maintain the orbital altitude in steady operation at the nominal orbital altitude Ha±Δ2 km, where the nominal orbital altitude Ha is 500 km to 1000 km.

A rule that sun-synchronous orbit satellites are prohibited from intruding into the nominal orbital altitude Ha±2 km in steady operation.

According to Example B of the traffic management rule information 623, there is an effect that a collision between a mega-constellation satellite group and a sun-synchronous satellite group in steady operation state can be avoided.

Example C of the Traffic Management Rule Information 623

Example C of the traffic management rule information in danger regions includes the following rules.

A rule stipulating that a business operator of a space object that is forecast to pass through the region of the nominal orbital altitude Ha±ΔHa km disclose danger region intrusion notice information to a danger alert device.

A rule stipulating that a business operator that manages a satellite group with the nominal orbital altitude Ha disclose collision avoidance action implementation plan information.

According to Example C of the traffic management rule information 623, the rule that danger region intrusion notice information be disclosed to a danger alert device is applied, and the rule that a mega-constellation business operator disclose collision avoidance action implementation plan information is applied. Therefore, there is an effect that information can be shared reliably and flight safety can be secured.

In Embodiments 1 to 6, the mega-constellation business device such as the following has been described.

Example 6-1 of the Mega-Constellation Business Device

Example 6-1 of the mega-constellation business device includes the space object management unit 710 that manages a satellite group so as to cause a plurality of satellites with normal vectors that are same and flying at the same orbital altitude to fly while maintaining a relative phase angle that causes the plurality of satellites to be spaced approximately evenly in an orbital plane. The space object management unit 710 is realized by a processor installed in the mega-constellation business device.

Example 6-2 of the Mega-Constellation Business Device

Example 6-2 of the mega-constellation business device includes the space object management unit 710 that manages a satellite group so as to cause satellites in orbital planes with different normal vectors to adopt mutually different orbital altitudes.

Example 6-3 of the Mega-Constellation Business Device

Example 6-3 of the mega-constellation business device includes a space traffic management device to, in a process of causing a satellite in a mega-constellation satellite group to deorbit and make an atmospheric entry, cause the satellite to perform a collision avoidance operation during orbital descent before the satellite intrudes into any one of a region in a vicinity of sun-synchronous orbit LST 10:30 and at orbital altitudes of 500 km to 1000 km, a region in a vicinity of sun-synchronous orbit LST 13:30 and at orbital altitudes of 500 km to 1000 km, a region in a vicinity of sun-synchronous orbit LST 06:00 and at orbital altitudes of 500 km to 1000 km, a region in a vicinity of sun-synchronous orbit LST 18:00 and at orbital altitudes of 500 km to 1000 km, a region at latitudes of 80 and more degrees north and at orbital altitudes of 500 km to 1000 km, and a region at latitudes of 80 and more degrees south and at orbital altitudes of 500 km to 1000 km.

In Embodiments 1 to 6 above, the ground facility such as the following has been described.

Example 6-4 of the Ground Facility

Example 6-4 of the ground facility is the ground facility of a satellite constellation forming system composed of a plurality of orbital planes with different normal directions.

The ground facility includes a communication device to transmit and receive signals for tracking and controlling each satellite of a satellite group constituting a satellite constellation. The ground facility includes an orbit control command generation unit to generate an orbit control command to, from a state in which in a vicinity of an intersection of any two orbital planes, satellite passage timings of passage of satellites flying in the two orbital planes do not coincide between the two orbital planes, gradually change an orbital altitude of at least one of the two orbital planes while maintaining the state in which the satellite passage timings do not coincide. The communication device transmits the orbit control command to each satellite.

Example 6-5 of the Ground Facility

Example 6-5 of the ground facility includes a communication device to transmit and receive signals for tracking and controlling a satellite in a satellite constellation, an orbit control command transmission unit to transmit an orbit control command, and an analytical prediction unit to predict an orbit through which the satellite after receiving a deorbit command will pass. Example 6-5 of the ground facility transmits the orbit control command to cause the satellite that has reached an end of design life to deorbit by operating a propulsion device included in the satellite.

When it has been determined by the analytical prediction unit that the satellite will pass through an orbital plane of the satellite constellation, the orbit control command transmission unit transmits the orbit control command to perform a collision avoidance operation during orbital descent to avoid a risk of collision by shifting a congested orbit passage timing or an orbital plane by raising or lowering an orbital altitude by increasing or decreasing a satellite velocity by an orbit control device included in the satellite, or changing an orbital inclination by applying acceleration in an out-of-plane direction of the orbital plane by a jet from a propulsor in a direction approximately orthogonal to a satellite traveling direction.

Example 6-6 of the Space Traffic Management Device of the Mega-Constellation Business Device The mega-constellation business device includes a space traffic management device that is compatible with space traffic management devices respectively included in a plurality of business devices that manage space objects. The mega-constellation business device is connected, through the space traffic management device, to a space traffic management system in which the space traffic management devices included in the plurality of business devices are connected with a communication line.

As illustrated in FIG. 37, the space traffic management device of the mega-constellation business device includes a space information recorder to record orbit information of a satellite. As illustrated in FIG. 37, the space traffic management device of the mega-constellation business device further includes all or at least one of space traffic management rule information, flight safety measure information, a danger analysis device, a danger alert device, a danger avoidance action assistance device, danger avoidance action implementation plan information, and security management information.

The space traffic management rule information includes rule information indicating a rule that a plurality of satellites with normal vectors that are same and flying at the same orbital altitude fly while maintaining a relative phase angle that causes the plurality of satellites to be spaced approximately evenly in an orbital plane, and rule information that satellites in orbital planes with different normal vectors adopt mutually different orbital altitudes.

The space traffic management rule information includes congested region identification information that identifies, as congested regions, a region in a vicinity of sun-synchronous orbit LST 10:30 and at orbital altitudes of 500 km to 1000 km, a region in a vicinity of sun-synchronous orbit LST 13:30 and at orbital altitudes of 500 km to 1000 km, a region in a vicinity of sun-synchronous orbit LST 06:00 and at orbital altitudes of 500 km to 1000 km, a region in a vicinity of sun-synchronous orbit LST 18:00 and at orbital altitudes of 500 km to 1000 km, a region at latitudes of 80 and more degrees north and at orbital altitudes of 500 km to 1000 km, a region at latitudes of 80 and more degrees south and at orbital altitudes of 500 km to 1000 km, and an orbital altitude region where a plurality of mega-constellation satellite groups fly;

rule information that a business operator that manages a satellite flying in any of the congested regions disclose satellite information; and rule information that business operators that manage space objects flying in any of the congested regions mutually exchange information regarding a flight safety measure.

The space traffic management rule information includes rule information that in a process of causing a satellite in a mega-constellation satellite group to deorbit and make an atmospheric entry, the satellite be caused to perform a collision avoidance operation during orbital descent before the satellite intrudes into any one of a region in a vicinity of sun-synchronous orbit LST 10:30 and at orbital altitudes of 500 km to 1000 km, a region in a vicinity of sun-synchronous orbit LST 13:30 and at orbital altitudes of 500 km to 1000 km, a region in a vicinity of sun-synchronous orbit LST 06:00 and at orbital altitudes of 500 km to 1000 km, a region in a vicinity of sun-synchronous orbit LST 18:00 and at orbital altitudes of 500 km to 1000 km, a region at latitudes of 80 and more degrees north and at orbital altitudes of 500 km to 1000 km, and a region at latitudes of 80 and more degrees south and at orbital altitudes of 500 km to 1000 km.

The space traffic management device includes flight safety measure information for a satellite group with the same nominal altitude.

FIG. 44 is a diagram representing elimination of a congested danger region by even phase arrangement according to this embodiment.

The flight safety measure information includes a measure in which a plurality of satellites having normal vectors that are same and flying at the same orbital altitude fly while maintaining a relative phase angle that causes the plurality of satellites to be spaced approximately evenly in an orbital plane.

As illustrated in FIG. 44, satellites flying in the same orbital plane at the same orbital altitude can avoid a collision by flying in synchronization. However, if satellites managed by different business operators are made to fly without managing a relative phase angle, there is a risk of collision.

According to the space traffic management device, using the space traffic management rules, satellites flying in the same orbital plane are identified and satellites flying at the same orbital altitude fly while maintaining a relative phase angle that causes the satellites to be spaced approximately evenly in the orbital plane. By this, there is an effect that a collision can be avoided.

The flight safety measure information includes a measure of eliminating an intersection of orbits so as to secure passive safety, as a flight safety measure for a satellite group with the same nominal altitude.

The flight safety measure information includes measure information that satellites in orbital planes with different normal vectors adopt mutually different orbital altitudes.

The mega-constellation business device includes a technique of the satellite constellation forming system described in any one of Embodiments 1 to 4 as a technique by which satellites in orbital planes with different normal vectors adopt mutually different orbital altitudes.

The space traffic management device includes flight safety measure information that while a satellite managed by the business device is in a process of deorbiting and making an atmospheric entry, the satellite perform a collision avoidance operation during orbital descent before intruding into any one of a region in a vicinity of sun-synchronous orbit LST 10:30 and at orbital altitudes of 500 km to 1000 km, a region in a vicinity of sun-synchronous orbit LST 13:30 and at orbital altitudes of 500 km to 1000 km, a region in a vicinity of sun-synchronous orbit LST 06:00 and at orbital altitudes of 500 km to 1000 km, a region in a vicinity of sun-synchronous orbit LST 18:00 and at orbital altitudes of 500 km to 1000 km, a region at latitudes of 80 and more degrees north and at orbital altitudes of 500 km to 1000 km, and a region at latitudes of 80 and more degrees south and at orbital altitudes of 500 km to 1000 km.

As flight safety measure information for satellites flying in a region in a vicinity of sun-synchronous orbit LST 10:30 and at orbital altitudes of 500 km to 1000 km, a region in a vicinity of sun-synchronous orbit LST 13:30 and at orbital altitudes of 500 km to 1000 km, a region in a vicinity of sun-synchronous orbit LST 06:00 and at orbital altitudes of 500 km to 1000 km, a region in a vicinity of sun-synchronous orbit LST 18:00 and at orbital altitudes of 500 km to 1000 km, a region at latitudes of 80 and more degrees north and at orbital altitudes of 500 km to 1000 km, an altitude region at latitudes of 80 and more degrees south and at orbital altitudes of 500 km to 1000 km, and an altitude region where a mega-constellation satellite group flies, the mega-constellation business device includes all or at least one of intra-orbital-plane synchronous control information, passage timing management information, and collision avoidance action plan information on each of which agreement has been reached with a business operator that manages a satellite flying in the same orbital plane, at the same orbital altitude, or in a neighborhood region.

The space traffic management device includes the space object management unit 710 that executes a flight safety measure.

When a failure has occurred in a satellite managed by the mega-constellation business device, the mega-constellation business device causes a debris removal business device to execute a collision avoidance operation during orbital descent.

With the emergence of a mega-constellation composed of several thousands to several tens of thousands of satellites, there is an increasing risk of collision between satellites flying at the same orbital altitude in orbital planes with mutually different normal directions.

In many cases, a collision avoidance measure of arranging that passage timings do not coincide in an orbit intersection region of the same orbital altitude is adopted, but a problem of this method is that there is a high risk of collision when artificial control is lost.

Another problem is that there is a risk of colliding sideways at a high speed at a mid-latitude intersection of an inclined orbit satellite group, so that an automatic collision avoidance operation is difficult.

In a mega-constellation in which a large number of satellites fly at the same orbital altitude, a problem is that when a collision accident occurs, there is a high probability that a chain-reaction collision will occur.

As means for solving these problems, effective means is to operate by adopting mutually different orbital altitudes in orbital planes with different normal directions. In case of loss of artificial control, if there is no intersection of orbital planes, the probability of collision is zero, so that there is an effect that passive safety can be secured.

There is also an effect that the probability of chain-reaction collision is drastically reduced even if debris is scattered due to an in-orbit collision accident.

As an implementation method for eliminating intersections by changing the altitude for each of orbital planes with different normal directions, an effective method is that the orbital planes maintain mutually different altitudes. However, if the orbital inclinations are the same, the orbital periods of orbital planes are different in different orbital planes. Thus, a problem is that the relative angle between orbital planes cannot be maintained.

As a method for resolving this, if an optimum orbital inclination is set for each orbital plane so as to maintain the relative relationship of orbital planes, there is an effect that passive safety can be secured and synchronization of the orbital planes can be maintained.

However, in this case the satellite ground speed differs between the orbital planes, so that a problem may arise depending on the content of a service, such as inter-satellite communication between adjacent orbits.

Therefore, by arranging that the orbital planes have mutually different altitudes and then further changing the altitudes dynamically so that the orbital planes have the same average altitude, it is possible to secure passive safety and achieve the same orbital-plane revolution and satellite ground speed on average.

As means for dynamically changing the altitude, a method of repeating acceleration and deceleration by a propulsion device and a method of adopting an elliptical orbit with a minute eccentricity are effective.

Since the probability of occurrence of intersections between different orbital planes is drastically reduced by these methods, there is an effect that the probability of collision is drastically reduced. However, there is still a possibility that an intersection may occur between orbital planes that vary dynamically, so that a problem is that a risk of collision remains if satellite passage timings happen to coincide between the orbital planes at this intersection.

Therefore, by shifting satellite passage timings at an intersection of orbital planes that happens to occur due to dynamic changing of the altitudes, there is an effect that a collision within the mega-constellation system can be eliminated.

An intersection of orbital planes that occurs exceptionally can be predicted in advance by the ground facility, so that means of transmitting, from the ground facility, an orbit control command to shift a passage timing is effective.

Furthermore, with the sophistication of an orbit control device that is installed in a satellite, it is possible to predict an intersection of orbital planes in advance by on-board automatic control in the satellite and perform orbit control to shift a passage timing.

In Embodiments 1 to 6 above, each unit of the satellite constellation forming system and the space traffic management system has been described as an independent functional block. However, the configurations of the satellite constellation forming system and the space traffic management system may be different from the configurations described in the above embodiments. The functional blocks of each of the satellite constellation forming system and the space traffic management system may be arranged in any configuration, provided that the functions described in the above embodiments can be realized. Each of the satellite constellation forming system and the space traffic management system may be a single device or a system composed of a plurality of devices.

Portions of Embodiments 1 to 6 may be implemented in combination. Alternatively, one portion of these embodiments may be implemented. These embodiments may be implemented as a whole or partially in any combination.

That is, in Embodiments 1 to 6, each embodiment may be freely combined, or any constituent element of each embodiment may be modified. Alternatively, in each embodiment, any constituent element may be omitted.

The embodiments described above are essentially preferable examples and are not intended to limit the scope of the present disclosure, the scope of applications of the present disclosure, and the scope of uses of the present disclosure. The embodiments described above can be modified in various ways as necessary.

REFERENCE SIGNS LIST

20: satellite constellation; 21, 21*a*, 21*b*: orbital plane; 30, 30*a*, 30*b*: satellite; 31: satellite control device; 32: satellite communication device; 33: propulsion device; 34: attitude control device; 35: power supply device; 51: orbit control command; 70: Earth; 100: satellite constellation forming system; 110: satellite constellation forming unit; 210: orbit satellite group; 300: satellite group; 701: ground facility; 510: orbit control command generation unit; 520: analytical prediction unit; 40: management business device; 41: mega-constellation business device; 42: LEO constellation business device; 43: satellite business device; 44: orbital transfer business device; 45: debris removal business device; 46:

rocket launch business device; 47: SSA business device; 501: orbit forecast information; 52: satellite orbit forecast information; 53: debris orbit forecast information; 511: space object ID; 512: forecast epoch; 513: forecast orbital elements; 514: forecast error; 60: space object; 700: space traffic management device; 710: space object management unit; 720: storage unit; 101: space information recorder; 102: danger alert device; 103: danger analysis device; 104: danger avoidance action assistance device; 105: security device; 106: space traffic management rule information; 107: danger avoidance action implementation plan information; 61: international rules; 62: trial-phase rules; 621: congested region identification information; 622: danger region identification information; 623: traffic management rule information; 121: in-orbit object number management information; 112: flight safety measure information; 910: processor; 921: memory; 922: auxiliary storage device; 930: input interface; 940: output interface; 950: communication device.

The invention claimed is:

1. A mega-constellation business device to manage a satellite constellation composed of 100 or more satellites, the mega-constellation business device comprising:

a space traffic management device that is compatible with space traffic management devices respectively included in a plurality of business devices that manage space objects, and including circuitry connected, through the space traffic management device, to a space traffic management system in which the space traffic management devices included in the plurality of business devices are connected with a communication line, wherein the space traffic management device includes at least space traffic management rule information including international phase rules corresponding to internationally acknowledged satellites, trial-phase rules corresponding to satellites that are not internationally acknowledged, and flight safety measure information to cause a plurality of satellites flying in a same orbital plane at a same nominal altitude to fly evenly spaced apart while maintaining a relative phase angle to avoid collision.

2. The mega-constellation business device according to claim 1, wherein the space traffic management device includes a space information recorder to record orbit information of a satellite, and wherein the space traffic management device further includes all or at least one of a danger analysis device, a danger alert device, a danger avoidance action assistance device, danger avoidance action implementation plan information, and security management information.

3. The mega-constellation business device according to claim 1, wherein the flight safety measure information further includes a measure of eliminating an intersection of orbits so as to secure passive safety, as a flight safety measure for a satellite group with a same nominal altitude.

4. The mega-constellation business device according to claim 1, wherein the mega-constellation business device includes, as the flight safety measure information, flight safety measure information that while a satellite managed by the business device is in a process of deorbiting and making an atmospheric entry, the satellite perform a collision avoidance operation during orbital descent before intruding into any one of a region in a vicinity of sun-synchronous orbit LST 10:30 and at orbital altitudes of 500 km to 1000 km, a region in a vicinity of sun-synchronous orbit LST 13:30 and at orbital altitudes of 500 km to 1000 km, a region in a vicinity of sun-synchronous orbit LST 06:00 and at orbital altitudes of 500 km to 1000 km, a region in a vicinity of sun-synchronous orbit LST 18:00 and at orbital altitudes of 500 km to 1000 km, a region at latitudes of 80 and more degrees north and at orbital altitudes of 500 km to 1000 km, and a region at latitudes of 80 and more degrees south and at orbital altitudes of 500 km to 1000 km.

5. The mega-constellation business device according to claim 1, wherein as flight safety measure information for satellites flying in a region in a vicinity of sun-synchronous orbit LST 10:30 and at orbital altitudes of 500 km to 1000 km, a region in a vicinity of sun-synchronous orbit LST 13:30 and at orbital altitudes of 500 km to 1000 km, a region in a vicinity of sun-synchronous orbit LST 06:00 and at orbital altitudes of 500 km to 1000 km, a region in a vicinity of sun-synchronous orbit LST 18:00 and at orbital altitudes of 500 km to 1000 km, a region at latitudes of 80 and more degrees north and at orbital altitudes of 500 km to 1000 km, a region at latitudes of 80 and more degrees south and at orbital altitudes of 500 km to 1000 km, and an altitude region where a mega-constellation satellite group flies, the mega-constellation business device includes all or at least one of intra-orbital-plane synchronous control information, passage timing management information, and collision avoidance action plan information on which agreement has been reached with a business operator that manages a satellite flying in a same orbital plane, at a same orbital altitude, or in a neighborhood region.

6. A mega-constellation business device comprising processing circuitry to execute a flight safety measure based on the flight safety measure information included in the mega-constellation business device according to claim 1.

7. The mega-constellation business device according to claim 1, wherein the trial-phase rules include all or at least one of the congested region identification information that identifies a congested region, danger region identification information that identifies a danger region where congested regions intersect, and traffic management rule information in danger regions.

* * * * *